(12) United States Patent
Kavaipatti Anantharamakrishnan et al.

(10) Patent No.: US 12,007,940 B2
(45) Date of Patent: *Jun. 11, 2024

(54) CONTAINER DATA MOVER FOR MIGRATING DATA BETWEEN DISTRIBUTED DATA STORAGE SYSTEMS INTEGRATED WITH APPLICATION ORCHESTRATORS

(71) Applicant: Commvault Systems, Inc., Tinton Falls, NJ (US)

(72) Inventors: Srividhya Kavaipatti Anantharamakrishnan, Santa Clara, CA (US); Lásaro Camargos, Uberlandia (BR); Abhijith Shenoy, Sunnyvale, CA (US); Xiangyu Wang, Fremont, CA (US); Avinash Lakshman, Fremont, CA (US); Srinivas Lakshman, San Jose, CA (US)

(73) Assignee: Commvault Systems, Inc., Tinton Falls, NJ (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/702,644

(22) Filed: Mar. 23, 2022

(65) Prior Publication Data

US 2022/0214997 A1 Jul. 7, 2022

Related U.S. Application Data

(63) Continuation of application No. 17/179,160, filed on Feb. 18, 2021, now Pat. No. 11,314,687.

(Continued)

(51) Int. Cl.
*G06F 16/11* (2019.01)
*G06F 16/182* (2019.01)

(52) U.S. Cl.
CPC ......... *G06F 16/119* (2019.01); *G06F 16/125* (2019.01); *G06F 16/128* (2019.01); *G06F 16/182* (2019.01)

(58) Field of Classification Search
CPC .... G06F 16/119; G06F 16/182; G06F 16/125; G06F 16/128
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 B1 | 3/1988 |
| EP | 0405926 B1 | 1/1991 |

(Continued)

OTHER PUBLICATIONS

PTAB-IPR2021-00674—('723) POPR Final, filed Jul. 8, 2021, in 70 pages.

(Continued)

*Primary Examiner* — Van H Oberly
(74) *Attorney, Agent, or Firm* — Commvault Systems, Inc.

(57) ABSTRACT

A distributed data storage system comprises features for integration with application orchestrators such as Kubernetes, and includes a proprietary Container Storage Interface (CSI) driver. Features include setting snapshot scheduling and retention policies, and a "container data mover" that replicates data from a source to a distinct destination distributed data storage system. The migration may be configured one-to-one, one-to-many, unidirectional, and/or bi-directional. Metadata-based snapshots and metadata-based changed block tracking identify payload data to move from (Continued)

source to destination within application orchestrator frameworks at both ends. Payload data is migrated from source to destination using different techniques than those used for migrating metadata, e.g., kernel-to-kernel for copying payload data versus ordinary metadata writes. An illustrative barrier logic ensures that the migration follows a controlled progression of operations.

20 Claims, 24 Drawing Sheets

Related U.S. Application Data

(60) Provisional application No. 63/082,631, filed on Sep. 24, 2020.

(56) References Cited

U.S. PATENT DOCUMENTS

| | | | |
|---|---|---|---|
| 4,283,787 A | | 8/1981 | Chambers |
| 4,417,321 A | | 11/1983 | Chang et al. |
| 4,641,274 A | | 2/1987 | Swank |
| 4,654,819 A | | 3/1987 | Stiffler et al. |
| 4,686,620 A | | 8/1987 | Ng |
| 4,912,637 A | | 3/1990 | Sheedy et al. |
| 4,995,035 A | | 2/1991 | Cole |
| 5,005,122 A | | 4/1991 | Griffin |
| 5,093,912 A | | 3/1992 | Dong et al. |
| 5,133,065 A | | 7/1992 | Cheffetz et al. |
| 5,193,154 A | | 3/1993 | Kitajima et al. |
| 5,212,772 A | | 5/1993 | Masters |
| 5,226,157 A | | 7/1993 | Nakano et al. |
| 5,239,647 A | | 8/1993 | Anglin et al. |
| 5,241,668 A | | 8/1993 | Eastridge et al. |
| 5,241,670 A | | 8/1993 | Eastridge et al. |
| 5,253,342 A | * | 10/1993 | Blount .............. G06F 15/17375 709/232 |
| 5,276,860 A | | 1/1994 | Fortier et al. |
| 5,276,867 A | | 1/1994 | Kenley et al. |
| 5,287,500 A | | 2/1994 | Stoppani, Jr. |
| 5,301,286 A | | 4/1994 | Rajani |
| 5,321,816 A | | 6/1994 | Rogan et al. |
| 5,333,315 A | | 7/1994 | Saether et al. |
| 5,347,653 A | | 9/1994 | Flynn et al. |
| 5,410,700 A | | 4/1995 | Fecteau et al. |
| 5,420,996 A | | 5/1995 | Aoyagi |
| 5,448,724 A | | 9/1995 | Hayashi et al. |
| 5,454,099 A | | 9/1995 | Myers et al. |
| 5,491,810 A | | 2/1996 | Allen |
| 5,495,607 A | | 2/1996 | Pisello et al. |
| 5,504,873 A | | 4/1996 | Martin et al. |
| 5,544,345 A | | 8/1996 | Carpenter et al. |
| 5,544,347 A | | 8/1996 | Yanai et al. |
| 5,559,957 A | | 9/1996 | Balk |
| 5,559,991 A | | 9/1996 | Kanfi |
| 5,619,644 A | | 4/1997 | Crockett et al. |
| 5,638,509 A | | 6/1997 | Dunphy et al. |
| 5,642,496 A | | 6/1997 | Kanfi |
| 5,664,204 A | | 9/1997 | Wang |
| 5,673,381 A | | 9/1997 | Huai et al. |
| 5,699,361 A | | 12/1997 | Ding et al. |
| 5,729,743 A | | 3/1998 | Squibb |
| 5,751,997 A | | 5/1998 | Kullick et al. |
| 5,758,359 A | | 5/1998 | Saxon |
| 5,761,677 A | | 6/1998 | Senator et al. |
| 5,764,972 A | | 6/1998 | Crouse et al. |
| 5,778,395 A | | 7/1998 | Whiting et al. |
| 5,812,398 A | | 9/1998 | Nielsen |
| 5,813,009 A | | 9/1998 | Johnson et al. |
| 5,813,017 A | | 9/1998 | Morris |
| 5,875,478 A | | 2/1999 | Blumenau |
| 5,887,134 A | | 3/1999 | Ebrahim |
| 5,901,327 A | | 5/1999 | Ofek |
| 5,924,102 A | | 7/1999 | Perks |
| 5,950,205 A | | 9/1999 | Aviani, Jr. |
| 5,974,563 A | | 10/1999 | Beeler, Jr. |
| 6,021,415 A | | 2/2000 | Cannon et al. |
| 6,026,414 A | | 2/2000 | Anglin |
| 6,052,735 A | | 4/2000 | Ulrich et al. |
| 6,076,148 A | | 6/2000 | Kedem et al. |
| 6,094,416 A | | 7/2000 | Ying |
| 6,131,095 A | | 10/2000 | Low et al. |
| 6,131,190 A | | 10/2000 | Sidwell |
| 6,148,412 A | | 11/2000 | Cannon et al. |
| 6,154,787 A | | 11/2000 | Urevig et al. |
| 6,161,111 A | | 12/2000 | Mutalik et al. |
| 6,167,402 A | | 12/2000 | Yeager |
| 6,212,512 B1 | | 4/2001 | Barney et al. |
| 6,260,069 B1 | | 7/2001 | Anglin |
| 6,269,431 B1 | | 7/2001 | Dunham |
| 6,275,953 B1 | | 8/2001 | Vahalia et al. |
| 6,301,592 B1 | | 10/2001 | Aoyama et al. |
| 6,324,581 B1 | | 11/2001 | Xu et al. |
| 6,327,590 B1 | | 12/2001 | Chidlovskii et al. |
| 6,328,766 B1 | | 12/2001 | Long |
| 6,330,570 B1 | | 12/2001 | Crighton et al. |
| 6,330,642 B1 | | 12/2001 | Carteau |
| 6,343,324 B1 | | 1/2002 | Hubis et al. |
| RE37,601 E | | 3/2002 | Eastridge et al. |
| 6,356,801 B1 | | 3/2002 | Goodman et al. |
| 6,389,432 B1 | | 5/2002 | Pothapragada et al. |
| 6,418,478 B1 | | 7/2002 | Ignatius et al. |
| 6,421,711 B1 | | 7/2002 | Blumenau et al. |
| 6,487,561 B1 | | 11/2002 | Ofek et al. |
| 6,519,679 B2 | | 2/2003 | Devireddy et al. |
| 6,538,669 B1 | | 3/2003 | Lagueux, Jr. et al. |
| 6,542,972 B2 | | 4/2003 | Ignatius et al. |
| 6,564,228 B1 | | 5/2003 | O'Connor |
| 6,658,436 B2 | | 12/2003 | Oshinsky et al. |
| 6,658,526 B2 | | 12/2003 | Nguyen et al. |
| 6,721,767 B2 | | 4/2004 | DeMeno et al. |
| 6,760,723 B2 | | 7/2004 | Oshinsky et al. |
| 6,941,429 B1 | | 9/2005 | Kamvysselis et al. |
| 6,959,327 B1 | | 10/2005 | Vogl |
| 6,973,555 B2 | | 12/2005 | Fujiwara |
| 7,000,238 B2 | | 2/2006 | Nadler |
| 7,003,641 B2 | | 2/2006 | Prahlad |
| 7,035,880 B1 | | 4/2006 | Crescenti |
| 7,079,341 B2 | | 7/2006 | Kistler et al. |
| 7,096,418 B1 | | 8/2006 | Singhal |
| 7,107,298 B2 | | 9/2006 | Prahlad |
| 7,130,272 B1 | | 10/2006 | Gai et al. |
| 7,130,970 B2 | | 10/2006 | Devassy |
| 7,143,203 B1 | | 11/2006 | Altmejd |
| 7,162,496 B2 | | 1/2007 | Amarendran et al. |
| 7,174,433 B2 | | 2/2007 | Kottomtharayil et al. |
| 7,225,220 B2 | | 5/2007 | Gonzalez et al. |
| 7,246,207 B2 | | 7/2007 | Kottomtharayil |
| 7,260,633 B2 | | 8/2007 | Lette |
| 7,315,923 B2 | | 1/2008 | Retnamma et al. |
| 7,334,144 B1 | | 2/2008 | Schlumberger |
| 7,340,616 B2 | | 3/2008 | Rothman et al. |
| 7,343,356 B2 | | 3/2008 | Prahlad |
| 7,343,453 B2 | | 3/2008 | Prahlad |
| 7,346,623 B2 | | 3/2008 | Prahlad et al. |
| 7,346,751 B2 | | 3/2008 | Prahlad |
| 7,366,846 B2 | | 4/2008 | Boyd et al. |
| 7,386,744 B2 | | 6/2008 | Barr |
| 7,389,311 B1 | | 6/2008 | Crescenti et al. |
| 7,395,282 B1 | | 7/2008 | Crescenti |
| 7,440,982 B2 | | 10/2008 | Lu |
| 7,448,079 B2 | | 11/2008 | Tremain |
| 7,454,569 B2 | | 11/2008 | Kavuri |
| 7,472,079 B2 | | 12/2008 | Fellenstein |
| 7,483,895 B2 | | 1/2009 | Hysom |
| 7,490,207 B2 | | 2/2009 | Amarendran et al. |
| 7,500,053 B1 | | 3/2009 | Kavuri |
| 7,502,820 B2 | | 3/2009 | Manders |
| 7,516,346 B2 | | 4/2009 | Pinheiro et al. |
| 7,516,348 B1 | | 4/2009 | Ofer |
| 7,526,798 B2 | | 4/2009 | Chao |
| 7,529,782 B2 | | 5/2009 | Prahlad et al. |
| 7,536,291 B1 | | 5/2009 | Vijayan Retnamma et al. |

(56) References Cited

U.S. PATENT DOCUMENTS

| | | |
|---|---|---|
| 7,543,125 B2 | 6/2009 | Gokhale |
| 7,546,324 B2 | 6/2009 | Prahlad et al. |
| 7,546,475 B2 | 6/2009 | Mayo et al. |
| 7,568,080 B2 | 7/2009 | Prahlad et al. |
| 7,584,227 B2 | 9/2009 | Gokhale et al. |
| 7,587,570 B2 | 9/2009 | Sarkar et al. |
| 7,603,386 B2 | 10/2009 | Amarendran et al. |
| 7,606,844 B2 | 10/2009 | Kottomtharayil |
| 7,613,752 B2 | 11/2009 | Prahlad |
| 7,617,191 B2 | 11/2009 | Wilbrink et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil |
| 7,627,827 B2 | 12/2009 | Taylor et al. |
| 7,631,351 B2 | 12/2009 | Erofeev |
| 7,636,743 B2 | 12/2009 | Erofeev |
| 7,651,593 B2 | 1/2010 | Prahlad |
| 7,653,668 B1 | 1/2010 | Shelat |
| 7,657,550 B2 | 2/2010 | Prahlad |
| 7,660,807 B2 | 2/2010 | Prahlad |
| 7,661,028 B2 | 2/2010 | Erofeev |
| 7,668,884 B2 | 2/2010 | Prahlad |
| 7,685,269 B1 | 3/2010 | Thrasher et al. |
| 7,694,070 B2 | 4/2010 | Mogi |
| 7,734,669 B2 | 6/2010 | Kottomtharayil et al. |
| 7,739,541 B1 * | 6/2010 | Rao ............... G06F 11/1425 714/13 |
| 7,739,548 B2 | 6/2010 | Goodrum et al. |
| 7,747,579 B2 | 6/2010 | Prahlad et al. |
| 7,761,736 B2 | 7/2010 | Nguyen et al. |
| 7,765,167 B2 | 7/2010 | Prahlad |
| 7,769,616 B2 | 8/2010 | Ollivier |
| 7,778,984 B2 | 8/2010 | Zhang |
| 7,792,789 B2 | 9/2010 | Prahlad |
| 7,797,453 B2 | 9/2010 | Meier et al. |
| 7,801,864 B2 | 9/2010 | Prahlad |
| 7,809,914 B2 | 10/2010 | Kottomtharayil |
| 7,814,149 B1 | 10/2010 | Stringham |
| 7,814,351 B2 | 10/2010 | Redlich et al. |
| 7,818,082 B2 | 10/2010 | Roumeliotis et al. |
| 7,822,967 B2 | 10/2010 | Fung |
| 7,840,537 B2 | 11/2010 | Gokhale |
| 7,882,077 B2 | 2/2011 | Gokhale |
| 7,899,788 B2 | 3/2011 | Chadhok et al. |
| 7,917,438 B2 | 3/2011 | Kenedy et al. |
| 7,975,061 B1 | 7/2011 | Gokhale et al. |
| 7,979,389 B2 | 7/2011 | Prahlad et al. |
| 7,996,270 B2 | 8/2011 | Sundaresan |
| 8,001,277 B2 | 8/2011 | Mega |
| 8,037,028 B2 | 10/2011 | Prahlad |
| 8,065,166 B2 | 11/2011 | Maresh |
| 8,108,427 B2 | 1/2012 | Prahlad |
| 8,112,605 B2 | 2/2012 | Kavuri |
| 8,134,727 B1 | 3/2012 | Shmunis |
| 8,140,786 B2 | 3/2012 | Bunte |
| 8,140,794 B2 | 3/2012 | Prahlad et al. |
| 8,156,086 B2 | 4/2012 | Lu et al. |
| 8,170,995 B2 | 5/2012 | Prahlad et al. |
| 8,219,524 B2 | 7/2012 | Gokhale |
| 8,229,954 B2 | 7/2012 | Kottomtharayil |
| 8,230,195 B2 | 7/2012 | Amarendran et al. |
| 8,266,406 B2 | 9/2012 | Kavuri |
| 8,285,681 B2 | 10/2012 | Prahlad |
| 8,296,534 B1 | 10/2012 | Gupta et al. |
| 8,307,177 B2 | 11/2012 | Prahlad et al. |
| 8,316,091 B2 | 11/2012 | Hirvela et al. |
| 8,321,688 B2 | 11/2012 | Auradkar |
| 8,352,608 B1 | 1/2013 | Keagy et al. |
| 8,364,652 B2 | 1/2013 | Vijayan et al. |
| 8,364,802 B1 | 1/2013 | Keagy et al. |
| 8,370,307 B2 | 2/2013 | Wolfe |
| 8,370,542 B2 | 2/2013 | Lu et al. |
| 8,396,838 B2 | 3/2013 | Brockway et al. |
| 8,407,190 B2 | 3/2013 | Prahlad |
| 8,417,697 B2 | 4/2013 | Ghemawat et al. |
| 8,429,630 B2 | 4/2013 | Nickolov |
| 8,433,682 B2 | 4/2013 | Ngo |
| 8,434,131 B2 | 4/2013 | Varadharajan et al. |
| 8,510,573 B2 | 8/2013 | Muller |
| 8,527,549 B2 | 9/2013 | Cidon |
| 8,566,362 B2 | 10/2013 | Mason et al. |
| 8,578,120 B2 | 11/2013 | Attarde et al. |
| 8,595,191 B2 | 11/2013 | Prahlad et al. |
| 8,612,439 B2 | 12/2013 | Prahlad et al. |
| 8,626,741 B2 | 1/2014 | Vijakumar et al. |
| 8,635,184 B2 | 1/2014 | Hsu et al. |
| 8,660,038 B1 | 2/2014 | Pascazio |
| 8,674,823 B1 | 3/2014 | Contrario et al. |
| 8,683,103 B2 | 3/2014 | Ripberger |
| 8,700,754 B2 | 4/2014 | Riley |
| 8,706,867 B2 | 4/2014 | Vijayan |
| 8,707,070 B2 | 4/2014 | Muller |
| 8,719,767 B2 | 5/2014 | Bansod |
| 8,769,048 B2 | 7/2014 | Kottomtharayil |
| 8,780,400 B2 | 7/2014 | Shmunis |
| 8,799,242 B2 | 8/2014 | Leonard et al. |
| 8,805,971 B1 | 8/2014 | Roth et al. |
| 8,849,761 B2 | 9/2014 | Prahlad |
| 8,849,955 B2 | 9/2014 | Prahlad |
| 8,924,511 B2 | 12/2014 | Brand |
| 8,950,009 B2 | 2/2015 | Vijayan et al. |
| 8,954,446 B2 | 2/2015 | Vijayan et al. |
| 8,959,299 B2 | 2/2015 | Ngo et al. |
| 9,020,900 B2 | 4/2015 | Vijayan et al. |
| 9,021,282 B2 | 4/2015 | Muller |
| 9,021,307 B1 | 4/2015 | Parameswaran et al. |
| 9,098,495 B2 | 8/2015 | Gokhale |
| 9,116,633 B2 | 8/2015 | Sancheti et al. |
| 9,189,170 B2 | 11/2015 | Kripalani et al. |
| 9,195,636 B2 | 11/2015 | Smith |
| 9,239,687 B2 | 1/2016 | Vijayan et al. |
| 9,262,496 B2 | 2/2016 | Kumarasamy et al. |
| 9,286,110 B2 | 3/2016 | Mitkar et al. |
| 9,298,715 B2 | 3/2016 | Kumarasamy et al. |
| 9,311,121 B2 | 4/2016 | Deshpande et al. |
| 9,342,537 B2 | 5/2016 | Kumarasamy et al. |
| 9,378,035 B2 | 6/2016 | Kripalani |
| 9,411,534 B2 | 8/2016 | Lakshman et al. |
| 9,424,151 B2 | 8/2016 | Lakshman et al. |
| 9,448,731 B2 | 9/2016 | Nallathambi et al. |
| 9,451,023 B2 | 9/2016 | Sancheti et al. |
| 9,454,537 B2 | 9/2016 | Prahlad et al. |
| 9,461,881 B2 | 10/2016 | Kumarasamy et al. |
| 9,471,578 B2 | 10/2016 | Nallathambi et al. |
| 9,483,205 B2 | 11/2016 | Lakshman et al. |
| 9,495,404 B2 | 11/2016 | Kumarasamy et al. |
| 9,558,085 B2 | 1/2017 | Lakshman |
| 9,633,033 B2 | 4/2017 | Vijayan et al. |
| 9,639,274 B2 | 5/2017 | Maranna |
| 9,639,426 B2 | 5/2017 | Pawar et al. |
| 9,641,388 B2 | 5/2017 | Kripalani et al. |
| 9,710,465 B2 | 7/2017 | Dornemann et al. |
| 9,774,672 B2 | 9/2017 | Nallathambi et al. |
| 9,798,489 B2 | 10/2017 | Lakshman et al. |
| 9,864,530 B2 | 1/2018 | Lakshman |
| 9,875,063 B2 | 1/2018 | Lakshman |
| 9,886,346 B2 | 2/2018 | Kumarasamy et al. |
| 9,959,333 B2 | 5/2018 | Kumarasamy |
| 9,983,936 B2 | 5/2018 | Dornemann et al. |
| 10,042,716 B2 | 8/2018 | Nallathambi et al. |
| 10,067,722 B2 | 9/2018 | Lakshman |
| 10,084,873 B2 | 9/2018 | Dornemann |
| 10,162,528 B2 | 12/2018 | Sancheti et al. |
| 10,210,048 B2 | 2/2019 | Sancheti et al. |
| 10,228,962 B2 | 3/2019 | Dornemann et al. |
| 10,248,174 B2 | 4/2019 | Lakshman et al. |
| 10,248,657 B2 | 4/2019 | Prahlad et al. |
| 10,264,074 B2 | 4/2019 | Vijayan et al. |
| 10,296,368 B2 | 5/2019 | Dornemann et al. |
| 10,310,953 B2 | 6/2019 | Vijayan et al. |
| 10,311,150 B2 | 6/2019 | Bansod et al. |
| 10,346,259 B2 | 7/2019 | Gokhale et al. |
| 10,379,598 B2 | 8/2019 | Muller |
| 10,387,266 B2 | 8/2019 | Kumarasamy et al. |

(56) References Cited

U.S. PATENT DOCUMENTS

| | | |
|---|---|---|
| 10,417,102 B2 | 9/2019 | Sanakkayala et al. |
| 10,592,153 B1 | 3/2020 | Subramaniam et al. |
| 10,592,350 B2 | 3/2020 | Dornemann |
| 10,613,939 B2 | 4/2020 | Mitkar et al. |
| 10,664,352 B2 | 5/2020 | Rana |
| 10,678,758 B2 | 6/2020 | Dornemann |
| 10,684,924 B2 | 6/2020 | Kilaru et al. |
| 10,691,187 B2 | 6/2020 | Lakshman et al. |
| 10,691,666 B1 | 6/2020 | McDowell et al. |
| 10,732,885 B2 | 8/2020 | Gutta |
| 10,740,193 B2 | 8/2020 | Dhatrak |
| 10,740,300 B1 | 8/2020 | Lakshman et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,776,329 B2 | 9/2020 | Rao et al. |
| 10,795,577 B2 | 10/2020 | Lakshman et al. |
| 10,846,024 B2 | 11/2020 | Lakshman et al. |
| 10,848,468 B1 | 11/2020 | Lakshman et al. |
| 10,853,195 B2 | 12/2020 | Ashraf et al. |
| 10,877,928 B2 | 12/2020 | Nagrale et al. |
| 10,891,198 B2 | 1/2021 | Nara et al. |
| 10,917,471 B1 | 2/2021 | Karumbunathan et al. |
| 10,949,308 B2 | 3/2021 | Lyer et al. |
| 11,099,956 B1 | 8/2021 | Polimera et al. |
| 11,106,632 B2 | 8/2021 | Bangalore et al. |
| 11,113,246 B2 | 9/2021 | Mitkar et al. |
| 11,327,663 B2 | 5/2022 | Bhagi |
| 11,340,672 B2 | 5/2022 | Lakshman |
| 11,442,896 B2 | 9/2022 | Agrawal |
| 11,570,243 B2 | 1/2023 | Camargos et al. |
| 11,789,830 B2 | 10/2023 | Jain |
| 2002/0035511 A1 | 3/2002 | Haji et al. |
| 2002/0083079 A1 | 6/2002 | Meier et al. |
| 2002/0095609 A1 | 7/2002 | Tokunaga |
| 2002/0129047 A1 | 9/2002 | Cane et al. |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg et al. |
| 2004/0210724 A1 | 10/2004 | Koning et al. |
| 2005/0076251 A1 | 4/2005 | Barr et al. |
| 2005/0251522 A1 | 11/2005 | Clark |
| 2005/0268121 A1 | 12/2005 | Rothman et al. |
| 2005/0289414 A1 | 12/2005 | Adya et al. |
| 2006/0058994 A1 | 3/2006 | Ravi et al. |
| 2006/0101174 A1 | 5/2006 | Kanamaru et al. |
| 2006/0190775 A1 | 8/2006 | Aggarwal et al. |
| 2006/0206507 A1 | 9/2006 | Dahbour |
| 2006/0224846 A1 | 10/2006 | Amarendran et al. |
| 2006/0236073 A1 | 10/2006 | Soules et al. |
| 2006/0242356 A1 | 10/2006 | Mogi et al. |
| 2006/0245411 A1 | 11/2006 | Chen et al. |
| 2006/0251067 A1 | 11/2006 | Desanti et al. |
| 2007/0073970 A1 | 3/2007 | Yamazaki et al. |
| 2007/0079156 A1 | 4/2007 | Fujimoto |
| 2007/0101173 A1 | 5/2007 | Fung |
| 2007/0168606 A1 | 7/2007 | Takai et al. |
| 2007/0234302 A1 | 10/2007 | Suzuki et al. |
| 2008/0005168 A1 | 1/2008 | Huff et al. |
| 2008/0010521 A1 | 1/2008 | Goodrum et al. |
| 2008/0147460 A1 | 6/2008 | Ollivier |
| 2008/0162592 A1 | 7/2008 | Huang et al. |
| 2008/0183891 A1 | 7/2008 | Ni et al. |
| 2008/0228771 A1 | 9/2008 | Prahlad et al. |
| 2008/0244032 A1 | 10/2008 | Gilson et al. |
| 2008/0244177 A1 | 10/2008 | Crescenti et al. |
| 2008/0256384 A1 | 10/2008 | Branson et al. |
| 2008/0270461 A1 | 10/2008 | Gordon et al. |
| 2008/0301479 A1 | 12/2008 | Wood |
| 2009/0077443 A1 | 3/2009 | Nguyen et al. |
| 2009/0198677 A1 | 8/2009 | Sheehy et al. |
| 2009/0198825 A1 | 8/2009 | Miller et al. |
| 2009/0210464 A1 | 8/2009 | Chiang-Lin |
| 2009/0268903 A1 | 10/2009 | Bojinov et al. |
| 2009/0282020 A1 | 11/2009 | McSheffrey et al. |
| 2009/0287665 A1 | 11/2009 | Prahlad et al. |
| 2009/0319534 A1 | 12/2009 | Gokhale |
| 2009/0327477 A1 | 12/2009 | Madison, Jr. et al. |
| 2010/0023722 A1 | 1/2010 | Tabbara et al. |
| 2010/0064033 A1 | 3/2010 | Travostino et al. |
| 2010/0070448 A1 | 3/2010 | Omoigui |
| 2010/0070466 A1 | 3/2010 | Prahlad et al. |
| 2010/0070474 A1 | 3/2010 | Lad |
| 2010/0070725 A1 | 3/2010 | Prahlad et al. |
| 2010/0082672 A1 | 4/2010 | Kottomtharayil et al. |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0190478 A1 | 7/2010 | Brewer et al. |
| 2010/0235333 A1 | 9/2010 | Bates et al. |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0332401 A1 | 12/2010 | Prahlad et al. |
| 2010/0333116 A1 | 12/2010 | Prahlad et al. |
| 2011/0010518 A1 | 1/2011 | Kavuri et al. |
| 2011/0022642 A1 | 1/2011 | DeMilo et al. |
| 2011/0040824 A1 | 2/2011 | Harm |
| 2011/0055161 A1 | 3/2011 | Wolfe |
| 2011/0191544 A1 | 8/2011 | Naga et al. |
| 2011/0276713 A1 | 11/2011 | Brand |
| 2011/0277027 A1 | 11/2011 | Hayton et al. |
| 2012/0054626 A1 | 3/2012 | Odenheimer |
| 2012/0084262 A1 | 4/2012 | Dwarampudi et al. |
| 2012/0110186 A1 | 5/2012 | Kapur et al. |
| 2012/0131645 A1 | 5/2012 | Harm |
| 2012/0150818 A1 | 6/2012 | Retnamma et al. |
| 2012/0240183 A1 | 9/2012 | Sinha |
| 2013/0007245 A1 | 1/2013 | Malik et al. |
| 2013/0035795 A1 | 2/2013 | Pfeiffer et al. |
| 2013/0036092 A1 | 2/2013 | Lafont et al. |
| 2013/0125198 A1 | 5/2013 | Ferguson et al. |
| 2013/0238572 A1 | 9/2013 | Prahlad et al. |
| 2013/0238969 A1 | 9/2013 | Smith et al. |
| 2013/0262385 A1 | 10/2013 | Vibhor et al. |
| 2013/0262615 A1* | 10/2013 | Ankireddypalle .... G06F 3/0635 709/213 |
| 2013/0297902 A1 | 11/2013 | Collins et al. |
| 2013/0326279 A1 | 12/2013 | Chavda et al. |
| 2014/0052706 A1 | 2/2014 | Misra |
| 2014/0189432 A1 | 7/2014 | Gokhale et al. |
| 2014/0196038 A1 | 7/2014 | Kottomtharayil et al. |
| 2014/0201140 A1 | 7/2014 | Vibhor et al. |
| 2014/0201157 A1 | 7/2014 | Pawar et al. |
| 2014/0283010 A1 | 9/2014 | Rutkowski et al. |
| 2014/0310706 A1 | 10/2014 | Bruso et al. |
| 2014/0380014 A1 | 12/2014 | Moyer |
| 2015/0074536 A1 | 3/2015 | Varadharajan et al. |
| 2015/0113055 A1 | 4/2015 | Vijayan et al. |
| 2015/0127967 A1 | 5/2015 | Dutton et al. |
| 2015/0198995 A1 | 7/2015 | Muller et al. |
| 2016/0042090 A1 | 2/2016 | Mitkar et al. |
| 2016/0100013 A1 | 4/2016 | Vijayan et al. |
| 2016/0142485 A1 | 5/2016 | Mitkar et al. |
| 2016/0350302 A1 | 12/2016 | Lakshman |
| 2016/0350391 A1 | 12/2016 | Vijayan et al. |
| 2017/0039218 A1 | 2/2017 | Prahlad et al. |
| 2017/0126807 A1 | 5/2017 | Vijayan et al. |
| 2017/0168903 A1 | 6/2017 | Dornemann et al. |
| 2017/0185488 A1 | 6/2017 | Kumarasamy et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0302588 A1 | 10/2017 | Mihailovici et al. |
| 2018/0048556 A1* | 2/2018 | Chen ..................... H04L 45/06 |
| 2018/0276085 A1 | 9/2018 | Mitkar et al. |
| 2018/0285202 A1 | 10/2018 | Bhagi et al. |
| 2018/0285205 A1 | 10/2018 | Mehta et al. |
| 2018/0285383 A1 | 10/2018 | Nara et al. |
| 2018/0375938 A1 | 12/2018 | Vijayan et al. |
| 2019/0050421 A1 | 2/2019 | Saxena |

(56) References Cited

U.S. PATENT DOCUMENTS

| | | | |
|---|---|---|---|
| 2019/0068464 | A1* | 2/2019 | Bernat ............... H04L 41/5025 |
| 2019/0109713 | A1* | 4/2019 | Clark ................... G06F 16/182 |
| 2019/0179805 | A1 | 6/2019 | Prahlad et al. |
| 2019/0182325 | A1 | 6/2019 | Vijayan et al. |
| 2019/0278662 | A1 | 9/2019 | Nagrale et al. |
| 2019/0303246 | A1 | 10/2019 | Gokhale et al. |
| 2019/0332294 | A1 | 10/2019 | Kilari |
| 2020/0025004 | A1 | 1/2020 | Dunnigan et al. |
| 2020/0034248 | A1 | 1/2020 | Nara et al. |
| 2020/0073574 | A1 | 3/2020 | Pradhan |
| 2020/0233845 | A1 | 7/2020 | Dornemann et al. |
| 2020/0241613 | A1 | 7/2020 | Lakshman et al. |
| 2020/0278915 | A1 | 9/2020 | Degaonkar et al. |
| 2020/0319694 | A1 | 10/2020 | Mohanty et al. |
| 2020/0341871 | A1 | 10/2020 | Shveidel |
| 2020/0349027 | A1 | 11/2020 | Bansod et al. |
| 2020/0394110 | A1 | 12/2020 | Rao et al. |
| 2020/0401489 | A1 | 12/2020 | Mitkar et al. |
| 2021/0034468 | A1 | 2/2021 | Patel |
| 2021/0049079 | A1 | 2/2021 | Kumar et al. |
| 2021/0064484 | A1 | 3/2021 | Dornemann et al. |
| 2021/0075768 | A1 | 3/2021 | Polimera et al. |
| 2021/0089215 | A1 | 3/2021 | Ashraf et al. |
| 2021/0173744 | A1 | 6/2021 | Agrawal et al. |
| 2021/0200648 | A1 | 7/2021 | Clark |
| 2021/0209060 | A1 | 7/2021 | Kottomtharayil et al. |
| 2021/0218636 | A1 | 7/2021 | Parvathamvenkatas et al. |
| 2021/0255771 | A1 | 8/2021 | Kilaru et al. |
| 2021/0271564 | A1 | 9/2021 | Mitkar et al. |
| 2021/0286639 | A1 | 9/2021 | Kumar |
| 2021/0357246 | A1 | 11/2021 | Kumar et al. |
| 2022/0103622 | A1 | 3/2022 | Camargos et al. |
| 2022/0214997 | A1 | 7/2022 | Kavaipatti Anantharamakrishnan et al. |

FOREIGN PATENT DOCUMENTS

| | | |
|---|---|---|
| EP | 0467546 A2 | 1/1992 |
| EP | 0541281 | 5/1993 |
| EP | 0774715 A1 | 5/1997 |
| EP | 0809184 B1 | 11/1997 |
| EP | 0817040 A2 | 1/1998 |
| EP | 0899662 A1 | 3/1999 |
| EP | 0981090 B1 | 2/2000 |
| WO | WO 95/13580 A1 | 5/1995 |
| WO | WO 99/12098 A1 | 3/1999 |
| WO | 2006052872 | 11/2005 |
| WO | WO 2016/004120 A2 | 1/2016 |

OTHER PUBLICATIONS

PTAB-IPR2021-00674—Mar. 31, 2021 723 Petition, filed Mar. 31, 2021, in 87 pages.
PTAB-IPR2021-00674—Mar. 31, 2021 Explanation for Two Petitions, filed Mar. 31, 2021, in 9 pages.
PTAB-IPR2021-00674—Exhibit 1001—U.S. Pat. No. 9,740,723, Issue Date Aug. 22, 2017, in 51 pages.
PTAB-IPR2021-00674—Exhibit 1002—Jagadish Declaration, dated Mar. 31, 2021, in 200 pages.
PTAB-IPR2021-00674—Exhibit 1003—U.S. Pat. No. 9,740,723 file history, Issue Date Aug. 22, 2017, in 594 pages.
PTAB-IPR2021-00674—Exhibit 1004—Virtual Machine Monitors Current Technology and Future Trends, May 2005, in 9 pages.
PTAB-IPR2021-00674—Exhibit 1005—Virtualization Overview, 2005, 11 pages.
PTAB-IPR2021-00674—Exhibit 1006—Let's Get Virtual_Final Stamped, May 14, 2007, in 42 pages.
PTAB-IPR2021-00674—Exhibit 1007—U.S. Pat. No. 8,458,419—Basler, Issue Date Jun. 4, 2013, in 14 pages.
PTAB-IPR2021-00674—Exhibit 1008—US20080244028A1 (Le), Publication Date Oct. 2, 2008, in 22 pages.
PTAB-IPR2021-00674—Exhibit 1009—U.S. Appl. No. 60/920,847 (Le Provisional), filed Mar. 29, 2007, in 70 pages.
PTAB-IPR2021-00674—Exhibit 1010—Discovery Systems in Ubiquitous Computing (Edwards), 2006, in 8 pages.
PTAB-IPR2021-00674—Exhibit 1011—HTTP The Definitive Guide excerpts (Gourley), 2002, in 77 pages.
PTAB-IPR2021-00674—Exhibit 1012—VCB White Paper (Wayback Mar. 21, 2007), retrieved Mar. 21, 2007, Coypyright Date 1998-2006, in 6 pages.
PTAB-IPR2021-00674—Exhibit 1013—Scripting VMware excerpts (Muller), 2006, in 66 pages.
PTAB-IPR2021-00674—Exhibit 1014—Rob's Guide to Using VMWare excerpts (Bastiaansen), Sep. 2005, in 178 pages.
PTAB-IPR2021-00674—Exhibit 1015—Carrier, 2005 in 94 pages.
PTAB-IPR2021-00674—Exhibit 1016—U.S. Pat. No. 7,716,171 (Kryger), Issue Date May 11, 2010, in 18 pages.
PTAB-IPR2021-00674—Exhibit 1017—RFC2609, Jun. 1999, in 33 pages.
PTAB-IPR2021-00674—Exhibit 1018—MS Dictionary excerpt, 2002, in 3 pages.
PTAB-IPR2021-00674—Exhibit 1019—*Commvault* v. *Rubrik* Complaint, Filed Apr. 21, 2020, in 29 pages.
PTAB-IPR2021-00674—Exhibit 1020—*Commvault* v. *Rubrik* Scheduling Order, Filed Feb. 17, 2021, in 15 pages.
PTAB-IPR2021-00674—Exhibit 1021—Duncan Affidavit, Dated Mar. 3, 2021, in 16 pages.
PTAB-IPR2021-00674—Exhibit 1022—Hall-Ellis Declaration, dated Mar. 30, 2021, in 291 pages.
PTAB-IPR2021-00674—Exhibit 1023—Digital_Data_Integrity_2007_Appendix_A_UMCP, 2007, in 24 pages.
PTAB-IPR2021-00674—Exhibit 1024—Rob's Guide—Amazon review (Jan 4, 2007), retrieved Jan. 4, 2007, in 5 pages.
PTAB-IPR2021-00674—Exhibit 2001—esxRanger, 2006, in 102 pages.
PTAB-IPR2021-00674—Exhibit 2002—Want, 1995, in 31 pages.
PTAB-IPR2021-00674—Exhibit 2003—Shea, retrieved Jun. 10, 2021, in 5 pages.
PTAB-IPR2021-00674—Exhibit 2004—Jones Declaration, Dated Jul. 8, 2021, in 36 pages.
PTAB-IPR2021-00674—Exhibit 3001, dated Aug. 30, 2021, in 2 pages.
PTAB-IPR2021-00674—Exhibit IPR2021-00674 Joint Request to Seal Settlement Agreement, dated Aug. 31, 2021, in 4 pages.
PTAB-IPR2021-00674—Joint Motion to Terminate, Filed Aug. 31, 2021, in 7 pages.
PTAB-IPR2021-00674—Response to Notice Ranking Petitions Final, filed Jul. 8, 2021, in 7 pages.
PTAB-IPR2021-00674—Termination Order, filed Sep. 1, 2021, in 4 pages.
Case No. 1:20-cv-00525-MN, Amended Complaint DDE-1-20-cv-00525-15, filed Jul. 27, 2020, in 30 pages.
Case No. 1:20-cv-00525-MN, Complaint DDE-1-20-cv-00525-1, Apr. 21, 2020, in 28 pages.
Case No. 1:20-cv-00525-MN, First Amended Answer DDE-1-20-cv-00525-95, filed Jul. 23, 2021, in 38 pages.
Case No. 1:20-cv-00525-MN, Joint Claim Construction Brief DDE-1-20-cv-00525-107, filed Oct. 1, 2021, in 79 pages.
Case No. 1:20-cv-00525-MN, Joint Claim Construction Brief Exhibits DDE-1-20-cv-00525-107-1, filed Oct. 1, 2021, in 488 pages (in 7 parts).
Case No. 1:20-cv-00525-MN, Oral Order DDE-1-20-cv-00524-78_DDE-1-20-cv-00525-77, dated May 24, 2021, in 1 page.
Case No. 1:20-cv-00525-MN, Oral Order DDE-1-20-cv-00524-86_DDE-1-20-cv-00525-87, dated Jun. 29, 2021, in 1 page.
Case No. 1:20-cv-00525-MN, Order DDE-1-20-cv-00525-38_DDE-1-20-cv-00524-42, filed Feb. 10, 2021, in 4 pages.
Case No. 20-525-MN-CJB, Joint Claim Construction Statement DDE-1-20-cv-00525-119, filed Oct. 29, 2021, in 12 pages.
Case No. 1:20-525-MN-CJB, Farnan Letter DDE-1-20-cv-00525-111, filed Oct. 6, 2021, in 2 pages.
Case No. 1:20-525-MN-CJB, Farnan Letter Exhibit A DDE-1-20-cv-00525-111-1, filed Oct. 6, 2021, in 7 pages.

(56) References Cited

OTHER PUBLICATIONS

Case No. 1:20-cv-00525-CFC-CJB, Joint Appendix of Exhibits 1-6, filed Jan. 13, 2022, in 2 pages.
Case No. 1:20-cv-00525-CFC-CJB, Joint Appendix of Exhibits 1-6, filed Jan. 13, 2022, in 224 pages.
Case No. 1:20-cv-00525-CFC-CJB, Joint Claim Construction Brief On Remaining Disputed Terms, filed Jan. 13, 2022, in 54 pages.
Case No. 120-cv-00525-MN—Stipulation of Dismissal, filed Jan. 27, 2022, in 2 pages.
PTAB-IPR2021-00675—00589 590 675 Termination Order, filed Sep. 1, 2021, in 4 pages.
PTAB-IPR2021-00675—Joint Motion to Terminate, Aug. 31, 2021, in 7 pages.
PTAB-IPR2021-00675—Joint Request to Seal Settlement Agreement, Aug. 31, 2021, in 4 pages.
PTAB-IPR2021-00675—Preliminary Sur-Reply Final, filed Aug. 16, 2021, in 6 pages.
PTAB-IPR2021-00675—Reply to POPR, filed Aug. 9, 2021, in 6 pages.
PTAB-IPR2021-00675—POPR Final, filed Jul. 9, 2021, in 48 pages.
PTAB-IPR2021-00675—Mar. 25, 2021 IPR—Petition—Cls 5 and 21—Final, dated Mar. 25, 2021, in 72 pages.
PTAB-IPR2021-00675—Exhibit 1001—U.S. Pat. No. 10,248,657, issue date Apr. 2, 2019, in 85 pages.
PTAB-IPR2021-00675—Exhibit 1002—Jagadish_Declaration_Final, filed Mar. 24, 2021, in 175 pages.
PTAB-IPR2021-00675—Exhibit 1003—WO2008070688A1 (Bunte), dated Jun. 12, 2008, in 71 pages.
PTAB-IPR2021-00675—Exhibit 1004—US20070156842A1(Vermeulen), Publication Date Jul. 5, 2007, 1 in 69 pages.
PTAB-IPR2021-00675—Exhibit 1005—US20020059317A1(Black), Publication Date May 16, 2002, in 14 pages.
PTAB-IPR2021-00675—Exhibit 1006—US_20080133835 (Zhu), Publication Date Jun. 5, 2008, in 14 pages.
PTAB-IPR2021-00675—Exhibit 1007—Introduction to AWS for Java Developers (Monson-Haefel), Jun. 26, 2007, in 3 pages.
PTAB-IPR2021-00675—Exhibit 1008—U.S. Pat. No. 8,140,786 (Bunte Patent), Issue Date Mar. 20, 2012, in 37 pages.
PTAB-IPR2021-00675—Exhibit 1009—US20060218435A1(Ingen), Publication Date Sep. 28, 2006, in 27 pages.
PTAB-IPR2021-00675—Exhibit 1010—Declaration of Duncan Hall, dated Feb. 18, 2021, in 81 pages.
PTAB-IPR2021-00675—Exhibit 1011—Controlling the Enterprise Information Life Cycle, Jun. 10, 2005 in 7 pages.
PTAB-IPR2021-00675—Exhibit 1012—Deduplication_Stop repeating yourself _ Network World, Sep. 25, 2006, in 6 pages.
PTAB-IPR2021-00675—Exhibit 1013—Lose Unwanted Gigabytes Overnight (McAdams), Feb. 26, 2007 in 5 pages.
PTAB-IPR2021-00675—Exhibit 1014—Data Domain releases DD120 for backup and deduplication _ Network World, Feb. 26, 2008 in 2 pages.
PTAB-IPR2021-00675—Exhibit 1015—PTAB-IPR2021-00675—Exhibit 1015—Hall-Ellis Declaration_Part1, dated Feb. 24, 2021, in 299 pages of Part 1 of 5.
PTAB-IPR2021-00675—Exhibit 1015—Hall-Ellis Declaration_Part2, dated Feb. 24, 2021, in 306 pages of Part 2 of 5.
PTAB-IPR2021-00675—Exhibit 1015—Hall-Ellis Declaration_Part3, dated Feb. 24, 2021, in 272 pages of Part 3 of 5.
PTAB-IPR2021-00675—Exhibit 1015—Hall-Ellis Declaration_Part4, dated Feb. 24, 2021, in 364 pages of Part 4 of 5.
PTAB-IPR2021-00675—Exhibit 1015—Hall-Ellis Declaration_Part5., dated Feb. 24, 2021, in 480 pages of Part 5 of 5.
PTAB-IPR2021-00675—Exhibit 1016—Amazon.com Unveils Data Storage Service_ Computerworld, Mar. 20, 2006 in 4 pages.
PTAB-IPR2021-00675—Exhibit 1017—Amazon Simple Storage Service (Amazon S3)b, Mar. 10, 2008, in 2 pages.
PTAB-IPR2021-00675—Exhibit 1018—How I cut my data center costs by $700,000 _ Computerworld, Mar. 30, 2007 in 4 pages.
PTAB-IPR2021-00675—Exhibit 1019—Microsoft Office Outlook 2003 (Boyce)_Part1, 2004, in 269 pages, Part 1 of 4.
PTAB-IPR2021-00675—Exhibit 1019—Microsoft Office Outlook 2003 (Boyce)_Part2, 2004, in 303 pages, Part 2 of 4.
PTAB-IPR2021-00675—Exhibit 1019—Microsoft Office Outlook 2003 (Boyce)_Part3, 2004, in 274 pages, Part 3 of 4.
PTAB-IPR2021-00675—Exhibit 1019—Microsoft Office Outlook 2003 (Boyce)_Part4, in 220 pages, Part 4 of 4.
PTAB-IPR2021-00675—Exhibit 1020—Finding Similar Files in a Large File System (Udi), Oct. 1993 in 11 pages.
PTAB-IPR2021-00675—Exhibit 1021—Components of Amazon S3, Mar. 1, 2006, in 1 page.
PTAB-IPR2021-00675—Exhibit 1022—Apr. 21, 2020 [1] Complaint, filed Apr. 21, 2020, in 300 pages.
PTAB-IPR2021-00675—Exhibit 1023—Feb. 17, 2021 Scheduling Order Case [dckt 46_0], filed Feb. 17, 2021, in 15 pages.
PTAB-IPR2021-00675—Exhibit 1024—Corporate IT Warms Up to Online Backup Services _ Computerworld, Feb. 4, 2008, in 6 pages.
PTAB-IPR2021-00675—Exhibit 1025—Who Are The Biggest Users of Amazon Web Services Its Not Startups TechCrunch 1, Apr. 21, 2008, in 2 pages.
PTAB-IPR2021-00675—Exhibit 1026—Programming Amazon Web Services (Murty), Mar. 2008, OReilly Media, Inc. in 595 pages.
PTAB-IPR2021-00675—Exhibit 1027—Announcement Lower Data Transfer Costs, posted on Apr. 22, 2008, in 1 page.
PTAB-IPR2021-00675—Exhibit 1028—A Ruby Library for Amazons Simple Storage Services (S3), May 26, 2008, 8 pages.
PTAB-IPR2021-00675—Exhibit 1029—Erlaws. Mar. 7, 2008, in 2 pages.
PTAB-IPR2021-00675—Exhibit 1030—S3Drive—Amazon S3 Filesystem, Jun. 16, 2008, in 1 page.
PTAB-IPR2021-00675—Exhibit 1031—S3Drive—Prerequisites, Jun. 5, 2008, in 1 page.
PTAB-IPR2021-00675—Exhibit 1032—S3Drive Screenshots, Jun. 21, 2008, in 1 page.
PTAB-IPR2021-00675—Exhibit 1033—S3Drive Download, Jun. 5, 2008, 1 page.
PTAB-IPR2021-00675—Exhibit 1034—ElasticDrive, Jun. 11, 2008, in 1 page.
PTAB-IPR2021-00675—Exhibit 1035—Jungle Disk Overview, Jun. 26, 2008, in 1 page.
PTAB-IPR2021-00675—Exhibit 1036—Jungle Disk How It Works, Jun. 26, 2008, in 1 page.
PTAB-IPR2021-00675—Exhibit 1037—Jungle Disk Why Its Better, Jun. 26, 2008, in 1 page.
PTAB-IPR2021-00675—Exhibit 1038—Jungle Disk FAQs, Jun. 26, 2008, in 1 page.
PTAB-IPR2021-00675—Exhibit 1039—IBiz Amazon Integrator, May 17, 2008, in 3 pages.
PTAB-IPR2021-00675—Exhibit 1040—JetS3t, May 29, 2008, in 1 page.
PTAB-IPR2021-00675—Exhibit 1041—SpaceBlock, Jun. 4, 2008, in 2 pages.
PTAB-IPR2021-00675—Exhibit 1042—S3Safe, May 31, 2008, 1 page.
PTAB-IPR2021-00675—Exhibit 1043—Veritas NetBackup, Jun. 22, 2008, in 1 page.
PTAB-IPR2021-00675—Exhibit 1044—Amazon S3 Application Programming Interfaces, Mar. 1, 2006, in 1 page.
PTAB-IPR2021-00675—Exhibit 1045—Bucket Restrictions and Limitations, Mar. 1, 2006, in 1 page.
PTAB-IPR2021-00675—Exhibit 1046—The Archive in the Sky, posted on Jun. 17, 2008, in 2 pages.
PTAB-IPR2021-00675—Exhibit 1047—Market-Oriented Cloud Computing (Buyya), Sep. 25-27, 2008, in 9 pages.
PTAB-IPR2021-00675—Exhibit 1048—Data Domain OpenStorage Software, May 12, 2008, 1 page.
PTAB-IPR2021-00675—Exhibit 1049—Working With Amazon Buckets, Mar. 1, 2006, in 1 page.
PTAB-IPR2021-00675—Exhibit 1050—FH 10248657, Issue Date Apr. 2, 2019, in 677 pages.
PTAB-IPR2021-00675—Exhibit 1051—*CommVault* v. *Cohesity* Complaint, dated Apr. 21, 2020, in 28 pages.

(56) References Cited

OTHER PUBLICATIONS

PTAB-IPR2021-00675—Exhibit 1052—US_2008_0052328_A1 (Widhelm), Publication Date Feb. 28, 2008, in 10 pages.
PTAB-IPR2021-00675—Exhibit 1053—Microsoft Computer Dictionary, 2002, in 12 pages.
PTAB-IPR2021-00675—Exhibit 2001—US20080229037A1, Publication Date Sep. 18, 2008, in 36 pages.
PTAB-IPR2021-00675—Exhibit 2002—Comparison of Exs. 1008, 1003, in 75 pages.
PTAB-IPR2021-00675—Exhibit 3001—Re_ IPR2021-00535, 2021-00589, 2021-00590, 2021-00609, 2021-00673, 2021-00674, 2021-00675, Aug. 30, 2021, in 2 pages.
PTAB-IPR2021-00590—('533) POPR Final, filed Jun. 16, 2021, in 59 pages.
PTAB-IPR2021-00590—Feb. 26 2021 Patent IPR, filed Feb. 26, 2021, in 89 pages.
PTAB-IPR2021-00590—Exhibit 1001—U.S. Pat. No. 7,840,533, Issue Date Nov. 23, 2010, in 16 pages.
PTAB-IPR2021-00590—Exhibit 1002—Chase Declaration (533 Patent IPR), dated Feb. 26, 2021, in 183 pages.
PTAB-IPR2021-00590—Exhibit 1003—OSDI '94 paper, Nov. 1994, 13 pages.
PTAB-IPR2021-00590—Exhibit 1004—U.S. Pat. No. 6,981,114 (Wu), Issue Date Dec. 27. 2005, in 16 pages.
PTAB-IPR2021-00590—Exhibit 1005—US20030061456A1 (Ofek), Issue Date Mar. 27, 2003, in 60 pages.
PTAB-IPR2021-00590—Exhibit 1006—U.S. Pat. No. 5,835,953 (Ohran), Issue Date Nov. 10, 1998, in 33 pages.
PTAB-IPR2021-00590—Exhibit 1007—US20030046270A1 (Leung), Publication Date Mar. 6, 2003, in 27 pages.
PTAB-IPR2021-00590—Exhibit 1008—U.S. Pat. No. 6,473,775 (Kusters), Oct. 29, 2002, in 15 pages.
PTAB-IPR2021-00590—Exhibit 1009—VVM for Windows, Aug. 2002, in 498 pages.
PTAB-IPR2021-00590—Exhibit 1010—U.S. Pat. No. 7,284,104B1, Issue Date Oct. 16, 2007, in 15 pages.
PTAB-IPR2021-00590—Exhibit 1011—MS Computer Dictionary (5th ed) excerpts, 2002, in 5 pages.
PTAB-IPR2021-00590—Exhibit 1012—NetBackup Sys Admin Guide, May 1999, 580 pages.
PTAB-IPR2021-00590—Exhibit 1013—U.S. Pat. No. 7,873,806, Issue Date Jan. 18, 2011, in 27 pages.
PTAB-IPR2021-00590—Exhibit 1014—U.S. Pat. No. 6,9205,37B2, Issue Date Jul. 19, 2005, in 57 pages.
PTAB-IPR2021-00590—Exhibit 1015—Assignment to EMC—Ohran, Date Recorded Nov. 24, 2003, in 6 pages.
PTAB-IPR2021-00590—Exhibit 1016—Assignment Docket—Ohran, Earliest Recordation Date Nov. 8, 1996, in 2 pages.
PTAB-IPR2021-00590—Exhibit 1017—*CommVault v. Rubrik* Complaint, filed on Apr. 21, 2020, in 29 pages.
PTAB-IPR2021-00590—Exhibit 1018—Feb. 17, 2021 (0046) Scheduling Order, filed Feb. 17, 2021, in 15 pages.
PTAB-IPR2021-00590—Exhibit 2001—Jones Declaration, dated Jun. 16, 2021, in 53 pages.
PTAB-IPR2021-00590—Exhibit 2009—590 Declaration, dated Jul. 7, 2021, in 8 pages.
PTAB-IPR2021-00590—Exhibit 3001, dated Aug. 30, 2021, in 2 pages.
PTAB-IPR2021-00590—Joint Motion to Terminate, filed Aug. 31, 2021, in 7 pages.
PTAB-IPR2021-00590—Joint Request to Seal Settlement Agreement, filed Aug. 31, 2021, in 4 pages.
PTAB-IPR2021-00590—Termination Order, filed Sep. 1, 2021, in 4 pages.
Case No. 1-20-cv-00524-MN, Amended_Complaint_DDE-1-20-cv-00524-13, filed Jul. 27, 2020, in 30 pages.
Case No. 1-20-cv-00524-45-MN, Answer to the Amended Complaint, filed Feb. 16, 2021, in 25 pages.
Case No. 1-20-cv-00524-45-MN, Complaint_DDE-1-20-cv-00524-1, filed on Apr. 21, 2020, in 29 pages.
Case No. 1-20-cv-00524-96-MN-CJB, First Amended Answer DDE-1-20-cv-00524-96, filed Jul. 23, 2021, in 41 pages.
Case No. 1-20-cv-00524-96-MN-CJB, Oral Order DDE-1-20-cv-00524-86_DDE-1-20-cv-00525-87, filed Jun. 29, 2021, in 1 page.
Case No. 1-20-cv-00524-96-MN-CJB, Order Dismissing with Prejudice DDE-1-20-cv-00524-101, filed Aug. 31, 2021, in 1 page.
Case No. 1-20-cv-00524-MN, Order_DDE-1-20-cv-00525-38_DDE-1-20-cv-00524-42, filed Feb. 10, 2021, in 4 pages.
Case No. 1:20-cv-00524-MN, Stipulation DDE-1-20-cv-00524-93, filed Jul. 14, 2021, in 3 pages.
Case No. No. 6:21-CV-00634-ADA, Answer WDTX-6-21-cv-00634-19, filed Aug. 27, 2021, in 23 pages.
Case No. 1:21-cv-00537, Complaint WDTX-1-21-cv-00537-1_WDTX-6-21-cv-00634-1, filed Jun. 18, 2021, in 44 pages.
Case No. 6:21-cv-00634-ADA, Order Dismissing with Prejudice WDTX-6-21-cv-00634-22, filed Sep. 1, 2021, in 1 page.
PTAB-IPR2021-00673—('723) POPR Final, filed Jun. 30, 2021, in 70 pages.
PTAB-IPR2021-00673—('723) Sur-Reply Final, filed Aug. 16, 2021, in 7 pages.
PTAB-IPR2021-00673—723 patent IPR—Reply to POPR, filed Aug. 9, 2021, in 6 pages.
PTAB-IPR2021-00673—Mar. 17, 2021_Petition_723, filed Mar. 17, 2021, in 98 pages.
PTAB-IPR2021-00673—Exhibit 1001—U.S. Pat. No. 9,740,723, Issue Date Aug. 22, 2017, in 51 pages.
PTAB-IPR2021-00673—Exhibit 1002—Declaration_Jagadish_EXSRanger, filed Mar. 16, 2021, in 191 pages.
PTAB-IPR2021-00673—Exhibit 1003—FH 9740723, Issue Date Aug. 22, 2017, in 594 pages.
PTAB-IPR2021-00673—Exhibit 1004—esxRangerProfessionalUserManual v.3.1, 2006 in 102 pages.
PTAB-IPR2021-00673—Exhibit 1005—VC_Users_Manual_11_NoRestriction, Copyright date 1998-2004, in 466 pages.
PTAB-IPR2021-00673—Exhibit 1006—U.S. Pat. No. 8,635,429—Naftel, Issue Date Jan. 21, 2014, in 12 pages.
PTAB-IPR2021-00673—Exhibit 1007—US20070288536A1—Sen, Issue Date Dec. 13, 2007, in 12 pages.
PTAB-IPR2021-00673—Exhibit 1008—US20060224846A1—Amarendran, Oct. 5, 2006, in 15 pages.
PTAB-IPR2021-00673—Exhibit 1009—U.S. Pat. No. 8,209,680—Le, Issue Date Jun. 26, 2012, in 55 pages.
PTAB-IPR2021-00673—Exhibit 1010—Virtual Machine Monitors Current Technology and Future Trends, May 2005 in 9 pages.
PTAB-IPR2021-00673—Exhibit 1011—Virtualization Overview, Copyright 2005, VMware, Inc., 11 pages.
PTAB-IPR2021-00673—Exhibit 1012—Let's Get Virtual A Look at Today's Virtual Server, May 14, 2007 in 42 pages.
PTAB-IPR2021-00673—Exhibit 1013—U.S. Pat. No. 8,135,930—Mattox, Issue Date Mar. 13, 2012, in 19 pages.
PTAB-IPR2021-00673—Exhibit 1014—U.S. Pat. No. 8,060,476—Afonso, Issue Date Nov. 15, 2011, in 46 pages.
PTAB-IPR2021-00673—Exhibit 1015—U.S. Pat. No. 7,823,145—Le 145, Issue Date Oct. 26, 2010, in 24 pages.
PTAB-IPR2021-00673—Exhibit 1016—US20080091655A1—Gokhale, Publication Date Apr. 17, 2008, in 14 pages.
PTAB-IPR2021-00673—Exhibit 1017—US20060259908A1—Bayer, Publication Date Nov. 16, 2006, in 8 pages.
PTAB-IPR2021-00673—Exhibit 1018—U.S. Pat. No. 8,037,016—Odulinski, Issue Date Oct. 11, 2011, in 20 pages.
PTAB-IPR2021-00673—Exhibit 1019—U.S. Pat. No. 7,925,850—Waldspurger, Issue Date Apr. 12, 2011, in 23 pages.
PTAB-IPR2021-00673—Exhibit 1020—U.S. Pat. No. 8,191,063—Shingai, May 29, 2012, in 18 pages.
PTAB-IPR2021-00673—Exhibit 1021—U.S. Pat. No. 8,959,509B1—Sobel, Issue Date Feb. 17, 2015, in 9 pages.
PTAB-IPR2021-00673—Exhibit 1022—U.S. Pat. No. 8,458,419—Basler, Issue Date Jun. 4, 2013, in 14 pages.
PTAB-IPR2021-00673—Exhibit 1023—D. Hall_Internet Archive Affidavit & Ex. A, dated Jan. 20, 2021, in 106 pages.
PTAB-IPR2021-00673—Exhibit 1024—esxRangerProfessionalUserManual, 2006, in 103 pages.

(56) References Cited

OTHER PUBLICATIONS

PTAB-IPR2021-00673—Exhibit 1025—D.Hall_Internet Archive Affidavit & Ex. A (source html view), dated Jan. 27, 2021, in 94 pages.
PTAB-IPR2021-00673—Exhibit 1026—Scripting VMware (excerpted) (GMU), 2006, in 19 pages.
PTAB-IPR2021-00673—Exhibit 1027—How to cheat at configuring VMware ESX server (excerpted), 2007, in 16 pages.
PTAB-IPR2021-00673—Exhibit 1028—Robs Guide to Using VMware (excerpted), Sep. 2005 in 28 pages.
PTAB-IPR2021-00673—Exhibit 1029—Hall-Ellis Declaration, dated Feb. 15, 2021, in 55 pages.
PTAB-IPR2021-00673—Exhibit 1030—B. Dowell declaration, dated Oct. 15, 2020, in 3 pages.
PTAB-IPR2021-00673—Exhibit 1031—Vizioncore esxEssentials Review ZDNet, Aug. 21, 2007, in 12 pages.
PTAB-IPR2021-00673—Exhibit 1032—ZDNet Search on_howorth—p. 6 _, printed on Jan. 15, 2021, ZDNet 3 pages.
PTAB-IPR2021-00673—Exhibit 1033—ZDNet_Reviews_ZDNet, printed on Jan. 15, 2021, in 33 pages.
PTAB-IPR2021-00673—Exhibit 1034—Understanding VMware Consolidated Backup, 2007, 11 pages.
PTAB-IPR2021-00673—Exhibit 1035—techtarget.com news links—May 2007, May 20, 2007, in 39 pages.
PTAB-IPR2021-00673—Exhibit 1036—ITPro 2007 Issue 5 (excerpted), Sep.-Oct. 2007 in 11 pages.
PTAB-IPR2021-00673—Exhibit 1037—InfoWorld—Feb. 13, 2006, Feb. 13, 2006, in 17 pages.
PTAB-IPR2021-00673—Exhibit 1038—InfoWorld—Mar. 6, 2006, Mar. 6, 2006, in 18 pages.
PTAB-IPR2021-00673—Exhibit 1039—InfoWorld—Apr. 10, 2006, Apr. 10, 2006, in 18 pages.
PTAB-IPR2021-00673—Exhibit 1040—InfoWorld—Apr. 17, 2006, Apr. 17, 2006, in 4 pages.
PTAB-IPR2021-00673—Exhibit 1041—InfoWorld—May 1, 2006, May 1, 2006, in 15 pages.
PTAB-IPR2021-00673—Exhibit 1042—InfoWorld—Sep. 25, 2006, Sep. 25, 2006, in 19 pages.
PTAB-IPR2021-00673—Exhibit 1043—InfoWorld—Feb. 5, 2007, Feb. 5, 2007, in 22 pages.
PTAB-IPR2021-00673—Exhibit 1044—InfoWorld—Feb. 12, 2007, Feb. 12, 2007, in 20 pages.
PTAB-IPR2021-00673—Exhibit 1045—InformationWeek—Aug. 14, 2006, Aug. 14, 2006, in 17 pages.
PTAB-IPR2021-00673—Exhibit 1046—esxRanger Ably Backs Up VMs, May 2, 2007 in 6 pages.
PTAB-IPR2021-00673—Exhibit 1047—Businesswire—Vizioncore Inc. Releases First Enterprise-Class Hot Backup and Recovery Solution for VMware Infrastructure, Aug. 31, 2006 in 2 pages.
PTAB-IPR2021-00673—Exhibit 1048—Vizioncore Offers Advice to Help Users Understand VCB for VMwar, Jan. 23, 2007 in 3 pages.
PTAB-IPR2021-00673—Exhibit 1049—Dell Power Solutions—Aug. 2007 (excerpted), Aug. 2007 in 21 pages.
PTAB-IPR2021-00673—Exhibit 1050—communities-vmware-t5-VI-VMware-ESX-3-5-Discussions, Jun. 28, 2007, in 2 pages.
PTAB-IPR2021-00673—Exhibit 1051—Distributed_File_System_Virtualization, Jan. 2006, pp. 45-56, in 12 pages.
PTAB-IPR2021-00673—Exhibit 1052—Distributed File System Virtualization article abstract, 2006, in 12 pages.
PTAB-IPR2021-00673—Exhibit 1053—Cluster Computing _ vol. 9, issue 1, Jan. 2006 in 5 pages.
PTAB-IPR2021-00673—Exhibit 1054—redp3939—Server Consolidation with VMware ESX Server, Jan. 12, 2005 in 159 pages.
PTAB-IPR2021-00673—Exhibit 1055—Server Consolidation with VMware ESX Server _ Index Page, Jan. 12, 2005 in 2 pages.
PTAB-IPR2021-00673—Exhibit 1056—Apr. 21, 2020 [1] Complaint, filed Apr. 21, 2020, in 300 pages.
PTAB-IPR2021-00673—Exhibit 1057—Feb. 17, 2021 (0046) Scheduling Order, filed Feb. 17, 2021, in 15 pages.
PTAB-IPR2021-00673—Exhibit 1058—Novell Netware 5.0-5.1 Network Administration (Doering), Copyright 2001 in 40 pages.
PTAB-IPR2021-00673—Exhibit 1059—US20060064555A1 (Prahlad 555), Publication Date Mar. 23, 006, in 33 pages.
PTAB-IPR2021-00673—Exhibit 1060—Carrier Book, 2005 in 94 pages.
PTAB-IPR2021-00673—Exhibit 2001 Jones Declaration, filed Jun. 30, 2021, in 35 pages.
PTAB-IPR2021-00673—Exhibit 2002 VM Backup Guide 3.0.1, updated Nov. 21, 2007, 74 pages.
PTAB-IPR2021-00673—Exhibit 2003 VM Backup Guide 3.5, updated Feb. 21, 2008, 78 pages.
PTAB-IPR2021-00673—Exhibit 3001 Re_ IPR2021-00535, 2021-00589, 2021-00590, 2021-00609, 2021-00673, 2021-00674, 2021-00675, Aug. 30, 2021, in 2 pages.
PTAB-IPR2021-00673—Joint Motion to Terminate, filed Aug. 31, 2021, in 7 pages.
PTAB-IPR2021-00673—Joint Request to Seal Settlement Agreement, filed Aug. 31, 2021, in 4 pages.
PTAB-IPR2021-00673—673 674 Termination Order, Sep. 1, 2021, in 4 pages.
PTAB-IPR2021-00673—Patent Owner Mandatory Notices, filed Apr. 7, 2021, 6 pages.
U.S. Appl. No. 14/723,380, filed May 27, 2015, Lakshman.
U.S. Appl. No. 15/939,186, filed Mar. 28, 2018, Nara et al.
U.S. Appl. No. 16/848,799, filed Apr. 14, 2020, Lakshman et al.
U.S. Appl. No. 16/875,854, filed May 15, 2020, Degaonkar et al.
U.S. Appl. No. 16/907,023, filed Jun. 19, 2020, Owen et al.
U.S. Appl. No. 16/911,291, filed Jun. 24, 2020, Bhagi et al.
U.S. Appl. No. 17/079,023, filed Oct. 23, 2020, Agrawal et al.
U.S. Appl. No. 17/114,296, filed Dec. 7, 2020, Ashraf et al.
U.S. Appl. No. 17/120,555, filed Dec. 14, 2020, Chatterjee et al.
U.S. Appl. No. 17/129,581, filed Dec. 21, 2020, Parvathamvenkatas et al.
U.S. Appl. No. 17/153,667, filed Jan. 20, 2021, Naik et al.
U.S. Appl. No. 17/153,674, filed Jan. 20, 2021, Naik et al.
U.S. Appl. No. 17/165,266, filed Feb. 2, 2021, Nara et al.
U.S. Appl. No. 17/179,160, filed Feb. 18, 2021, Anantharamakrishnan et al.
U.S. Appl. No. 17/336,103, filed Jun. 1, 2021, Vastrad et al.
U.S. Appl. No. 17/354,905, filed Jun. 22, 2021, Rana et al.
U.S. Appl. No. 17/389,204, filed Jul. 29, 2021, Mahajan.
U.S. Appl. No. 17/465,683, filed Sep. 2, 2021, Camargos et al.
U.S. Appl. No. 17/465,722, filed Sep. 2, 2021, Jain et al.
U.S. Appl. No. 17/494,702, filed Oct. 5, 2021, Polimera.
U.S. Appl. No. 17/501,881, filed Oct. 14, 2021, Dornemann.
U.S. Appl. No. 17/508,822, filed Oct. 22, 2021, Mutha.
U.S. Appl. No. 17/526,927, filed Nov. 15, 2021, Kapadia.
U.S. Appl. No. 63/053,414, filed Jul. 17, 2020, Lakshman et al.
U.S. Appl. No. 63/065,722, filed Aug. 14, 2020, Lakshman et al.
U.S. Appl. No. 63/070,162, filed Aug. 25, 2020, Naik et al.
U.S. Appl. No. 63/081,503, filed Sep. 22, 2020, Lakshman et al.
U.S. Appl. No. 63/082,624, filed Sep. 24, 2020, Lakshman et al.
U.S. Appl. No. 63/082,631, filed Sep. 24, 2020, Lakshman et al.
Armstead et al., "Implementation of a Campwide Distributed Mass Storage Service: The Dream vs. Reality," IEEE, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Bates, S et al., "Sharepoint 2007 User's Guide," pp. 1-88, 2007, Springer-Verlag New York, Inc., 104 pages.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chiappetta, Marco, "ESA Enthusiast System Architecture," <http://hothardware.com/Articles/NVIDIA_ESA_Enthusiast_System_Architecture/>, Nov. 5, 2007, 2 pages.

(56) References Cited

OTHER PUBLICATIONS

CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," IEEE, Jun. 12-16, 1994, pp. 124-126.
Gait, J., "The Optical File Cabinet: A Random-Access File System For Write-Once Optical Disks," IEEE Computer, vol. 21, No. 6, pp. 11-22 (Jun. 1988).
Jander, M., "Launching Storage-Area Net," Data Communications, US, McGraw Hill, NY, vol. 27, No. 4 (Mar. 21, 98), pp. 64-72.
Lakshman et al., "Cassandra—A Decentralized Structured Storage System", https://doi.org/10.1145/1773912.1773922, ACM SIGOPS Operating Systems Review, vol. 44, Issue 2, Apr. 2010, pp. 35-40.
Microsoft Corporation, "How NTFS Works," Windows Server TechCenter, updated Mar. 28, 2003, internet accessed Mar. 26, 2008, 26 pages.
Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
Seto, Christ, "Why Deploying on Kubernetes is Like Flying With an Alligator," Cockroach Labs (https://www.cockroachlabs.com/blog/kubernetes-scheduler/), dated Feb. 9, 2021, retrieved on Mar. 8, 2021, in 8 pages.
SwiftStack, Inc., The OpenStack Object Storage System, Feb. 2012, pp. 1-29.
VMware, Inc., "Open Virtual Machine Format,"http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wikipedia, "Cloud computing," <http://en.wikipedia.org/wiki/Cloud_computing>, internet accessed Jul. 8, 2009, 13 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.
International Search Report and Written Opinion for PCT/US2011/054374, dated May 2, 2012, 9 pages.
PTAB-IPR2021-00609—('048) POPR Final, filed Jun. 16, 2021, in 28 pages.
PTAB-IPR2021-00609—Mar. 10, 2021 IPR Petition—pty, Mar. 10, 2021, in 89 pages.
PTAB-IPR2021-00609—Exhibit 1001—U.S. Pat. No. 10,210,048, Issue Date Feb. 19, 2019, in 49 pages.
PTAB-IPR2021-00609—Exhibit 1002—Sandeep Expert Declaration, dated Mar. 10, 2021, in 176 pages.
PTAB-IPR2021-00609—Exhibit 1003—U.S. Pat. No. 9,354,927 (Hiltgen), Issue Date May 31, 2016, in 35 pages.
PTAB-IPR2021-00609—Exhibit 1004—U.S. Pat. No. 8,677,085 (Vaghani), Issue Date Mar. 18, 2014, in 44 pages.
PTAB-IPR2021-00609—Exhibit 1005—U.S. Pat. No. 9,639,428 (Boda), Issue Date May 2, 2017, in 12 pages.
PTAB-IPR2021-00609—Exhibit 1006—US20150212895A1 (Pawar), Publication Date Jul. 30, 2015, in 60 pages.

(56) References Cited

OTHER PUBLICATIONS

PTAB-IPR2021-00609—Exhibit 1007—U.S. Pat. No. 9,665,386 (Bayapuneni), Issue Date May 30, 2017, in 18 pages.
PTAB-IPR2021-00609—Exhibit 1008—Popek and Golberg, Jul. 1974, in 10 pages.
PTAB-IPR2021-00609—Exhibit 1009—Virtualization Essentials—First Edition (2012)—Excerpted, 2012, in 106 pages.
PTAB-IPR2021-00609—Exhibit 1010—Virtual Machine Monitors Current Technology and Future Trends, May 2005, in 9 pages.
PTAB-IPR2021-00609—Exhibit 1011—Virtualization Overview, 2005, in 11 pages.
PTAB-IPR2021-00609—Exhibit 1012—Let's Get Virtual A Look at Today's Virtual Server, May 14, 2007, in 42 pages.
PTAB-IPR2021-00609—Exhibit 1013—Virtual Volumes, Jul. 22, 2016, in 2 pages.
PTAB-IPR2021-00609—Exhibit 1014—Virtual Volumes and the SDDC—Virtual Blocks, Internet Archives on Sep. 29, 2015, in 4 pages.
PTAB-IPR2021-00609—Exhibit 1015—NEC White Paper—VMWare vSphere Virtual Volumes (2015), Internet Archives Dec. 4, 2015 in 13 pages.
PTAB-IPR2021-00609—Exhibit 1016—EMC Storage and Virtual Volumes, Sep. 16, 2015 in 5 pages.
PTAB-IPR2021-00609—Exhibit 1017—U.S. Pat. No. 8,621,460 (Evans), Issue Date Dec. 31, 2013, in 39 pages.
PTAB-IPR2021-00609—Exhibit 1018—U.S. Pat. No. 7,725,671 (Prahlad), Issue Date May 25, 2010, in 48 pages.
PTAB-IPR2021-00609—Exhibit 1019—Assignment—Vaghani to VMWare, Feb. 8, 2012, in 8 pages.
PTAB-IPR2021-00609—Exhibit 1020—Assignment Docket—Vaghani, Nov. 11, 2011, in 1 page.
PTAB-IPR2021-00609—Exhibit 1021—Dive into the VMware ESX Server hypervisor—IBM Developer, Sep. 23, 2011, in 8 pages.
PTAB-IPR2021-00609—Exhibit 1022—MS Computer Dictionary Backup labeled, 2002 in 3 pages.
PTAB-IPR2021-00609—Exhibit 1023—Jul. 7, 2014_VMware vSphere Blog, Jun. 30, 2014, 4 pages.
PTAB-IPR2021-00609—Exhibit 1024—*CommVault* v. *Rubrik* Complaint, filed on Apr. 21, 2020, in 29 pages.
PTAB-IPR2021-00609—Exhibit 1025—*CommVault* v. *Cohesity* Complaint, filed on Apr. 21, 2020, in 28 pages.
PTAB-IPR2021-00609—Exhibit 1026—Feb. 17, 2021 (0046) Scheduling Order, filed on Feb. 17, 2021, in 15 pages.
PTAB-IPR2021-00609—Exhibit 2001—Prosecution History_Part1, Issue Date Feb. 19, 2019, in 300 pages, Part 1 of 2.
PTAB-IPR2021-00609—Exhibit 2001—Prosecution History_Part2, Issue Date Feb. 19, 2019, in 265 pages, Part 2 of 2.
PTAB-IPR2021-00609—Exhibit 2002—Jones Declaration, dated Jun. 16, 2021, in 38 pages.
PTAB-IPR2021-00609—Exhibit 3001—Re_ IPR2021-00535, 2021-00589, 2021-00590, 2021-00609, 2021-00673, 2021-00674, 2021-00675, dated Aug. 30, 2021, in 2 pages.
PTAB-IPR2021-00609—Joint Motion to Terminate. Filed Aug. 31, 2021, in 7 pages.
PTAB-IPR2021-00609—Joint Request to Seal Settlement Agreement, filed Aug. 31, 2021, in 4 pages.
PTAB-IPR2021-00609—Termination Order, Sep. 1, 2021, in 4 pages.
Arneson, David A., "Development of Omniserver," Control Data Corporation, Tenth IEEE Symposium on Mass Storage Systems, May 1990, 'Crisis in Mass Storage' Digest of Papers, pp. 88-93, Monterey, CA.
Huff, KL, "Data Set Usage Sequence Number," IBM Technical Disclosure Bulletin, vol. 24, No. 5, Oct. 1981 New York, US, pp. 2404-2406.
NetApp, StorageGRID 11.3 documentation, "Recovery and Maintenance Guide", published Jan. 2020. Accessed Sep. 2022.
Zhou et al, A highly Reliable Metadata Service for Large-Scale Distributed File systems IEEE.

\* cited by examiner

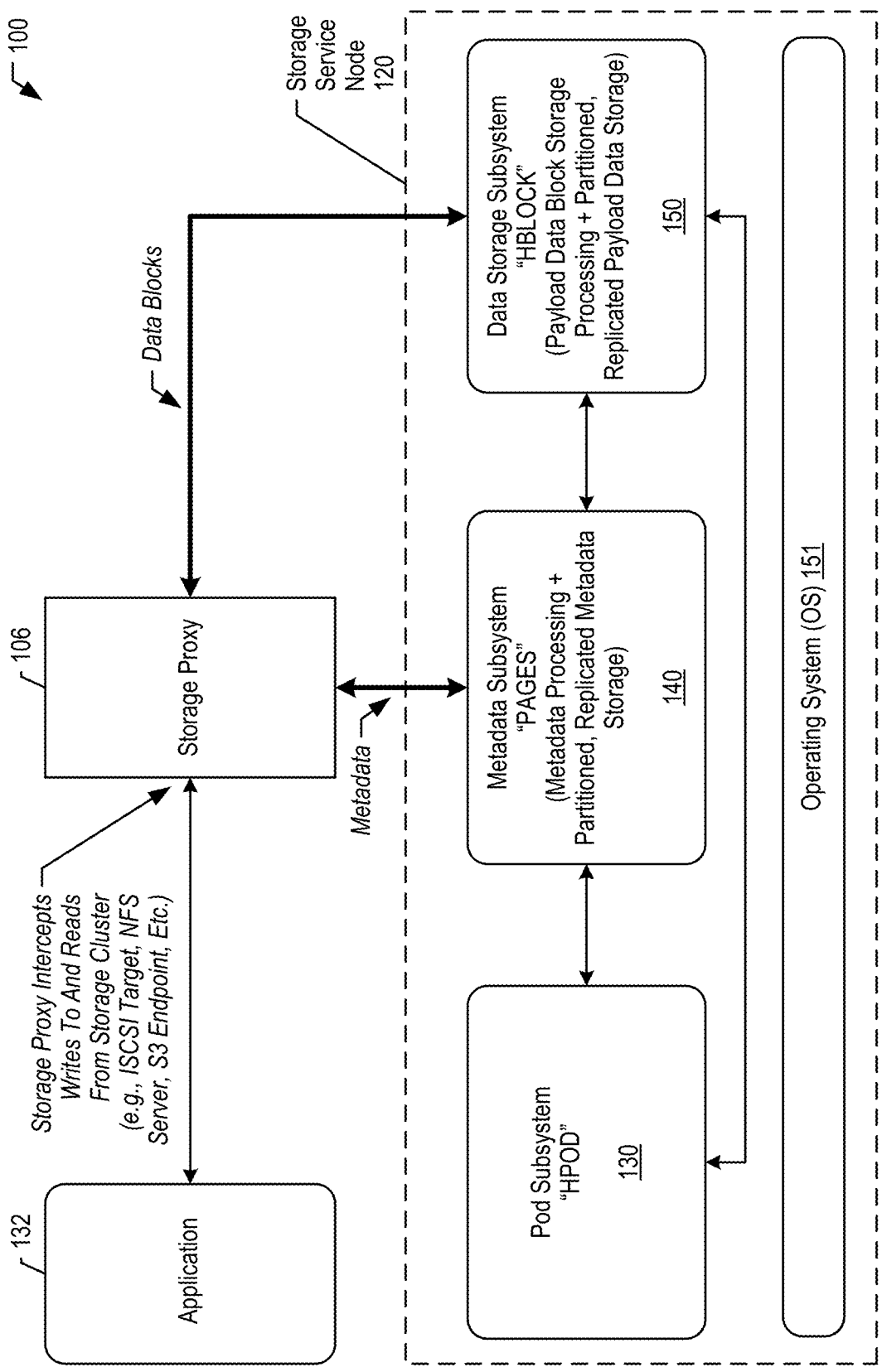
FIG. 1C  Illustrative Storage Service Node Comprising Pod Synchronization Subsys., Metadata Subsys., And Data Storage Subsys.

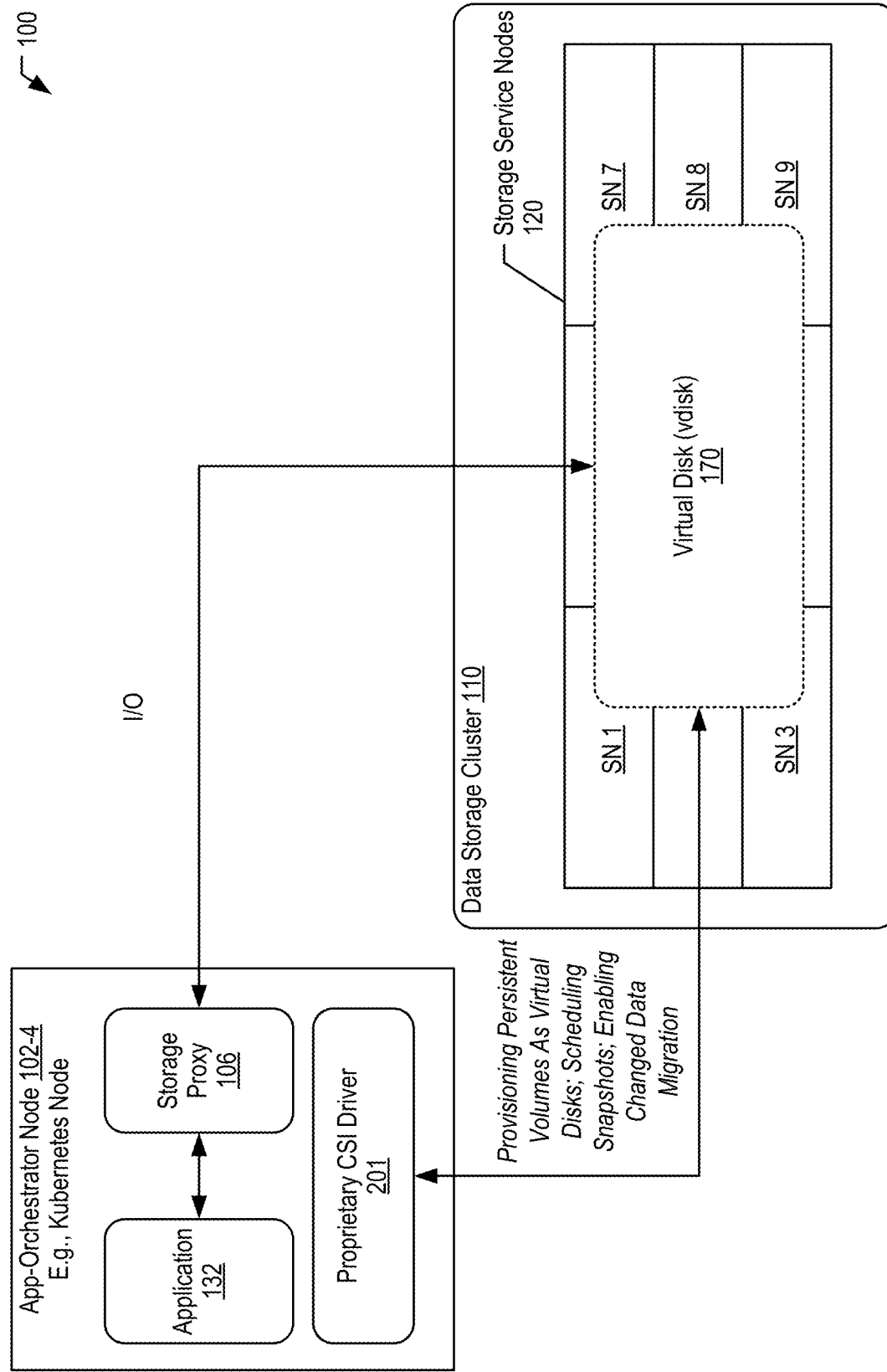
FIG. 2A Provisioning, Scheduling, And Migration Activation Using Proprietary CSI Component Of Distributed Data Storage System

Data Migration Is Configured For CSI Volumes By Following These Steps:
- Create A Migration Location
- Create A Snapshot Schedule (and Snapshot Class)
- Create A Storage Class With Migration Location And Snapshot Schedule
- Create A Persistent Volume Claim Using The Storage Class
- Access The Migrated Persistent Volume On The Target/Destination Cluster

Migration Location CRD

The migration location is implemented as a CustomResourceDefinition (CRD) and is cluster scoped. After the CSI driver has been deployed, verify the existence of the CRD by running the following command:

```
# kubectl get crd migrationlocations.hedvig.io

NAME                          CREATED AT
migrationlocations.hedvig.io  2020-05-17T01:15:16Z
```

A migration location is created by specifying the name of the storage cluster and the seeds, for example:

```
apiVersion: hedvig.io/v1
kind: MigrationLocation
metadata:
  name: ml-hedvig-a
spec:
  hedvig:
    name: "hedvig-a"
    seeds: ["hedvig-a.seed.1", "hedvig-a.seed.2", "hedvig-a.seed.3"]
```

FIG. 2B

Create A Snapshot Schedule And Snapshot Class

The data migration process is snapshot based. create a snapshot schedule for data migration. When a persistent volume snapshot expires, data migration is triggered from the source cluster to one or more migration locations (target/destination clusters).

Example Snapshot Schedule:

```
apiVersion: hedvig.io/v1
kind: SchedulePolicy
metadata:
  name: migration-schedule
  annotations:
    volume.beta.App-Orchestrator.io/storage-provisioner: hedvig.io/provisioner
spec:
  interval:
    period: 1h
    retain: 2h
```

The snapshot scheduler expects a snapshot class with name snc-hedvig-block to be present for creating snapshots of persistent volume claims. A default snapshot class can be created using the following example configuration:

```
apiVersion: snapshot.storage.k8s.io/v1beta1
kind: VolumeSnapshotClass
metadata:
  name: snc-hedvig-block
driver: io.hedvig.csi
deletionPolicy: Delete
```

Snapshot schedules are implemented as a CustomResourceDefinition (CRD) and are created by the CSI controller server. After the CSI driver has been deployed, verify the existence of the CRD by running the following command:

```
# kubectl get crd schedulepolicies.hedvig.io

NAME                         CREATED AT
schedulepolicies.hedvig.io   2020-05-13T20:58:54Z
```

FIG. 2C

Create a Storage Class with Migration Location and Snapshot Schedule

After migration location(s) and snapshot schedule have been created, create a new storage class using the following parameters:

- migrationEnable - Set to "true"
- migrationLocations - Comma-separated list of one or more migration location names
- schedulePolicy - Snapshot schedule name

Storage Class example:

```
apiVersion: storage.k8s.io/v1
kind: StorageClass
metadata:
  name: sc-hedvig-migration
provisioner: io.hedvig.csi
parameters:
  backendType: "hedvig-block"
  migrationEnable: "true"
  migrationLocations: "ml-hedvig-a,ml-hedvig-b"
  schedulePolicy: "migration-schedule"
```

Create a Persistent Volume Claim using the Storage Class

```
apiVersion: v1
kind: PersistentVolumeClaim
metadata:
  name: pvc-migration
  annotations:
    volume.beta.App-Orchestrator.io/storage-class: sc-hedvig-migration
spec:
  accessModes:
    - ReadWriteOnce
  resources:
    requests:
      storage: 10Gi
```

FIG. 2D

Access the Migrated Persistent Volume on the Target (Destination) Cluster

When the migration is successful, the target storage cluster should have a virtual disk with the same name as that in the source storage cluster corresponding to the persistent volume.

Here are the steps to mount the migrated persistent volume on the target App-Orchestrator cluster.

- Register the Migrated Virtual Disk to the App-Orchestrator Cluster
- Create a PersistentVolume
- Create a PersistentVolumeClaim Corresponding to the PersistentVolume
- Snapshot the PersistentVolumeClaim
- Create a Clone from the Volume Snapshot

Register the Migrated Virtual Disk to the App-Orchestrator Cluster

On the target cluster CLI, run the following example command:

```
hedvig-target> addkubevolume -n <virtual-disk-name> -i <kube-cluster-id>
```

```
<virtual-disk-name>  - Refers to the name of the migrated virtual disk
<kube-cluster-id>    - Refers to the id of the target App-Orchestrator cluster
```

FIG. 2E

Create a PersistentVolume corresponding to the migrated virtual disk. For example:
```
apiVersion: v1
kind: PersistentVolume
metadata:
 name: <virtual-disk-name>
spec:
 capacity:
   storage: <virtual-disk-size>
 accessModes:
   - ReadWriteOnce
 csi:
   driver: io.hedvig.csi
   volumeAttributes:
     internalName: <virtual-disk-name>
     name: <virtual-disk-name>
     protocol: block
   volumeHandle: <virtual-disk-name>
   readOnly: false
   fsType: <filesystem-type>
 storageClassName: <storage-class-name>
 volumeMode: Filesystem
```

FIG. 2F

Create a PersistentVolumeClaim corresponding to the PersistentVolume. For example:
```
apiVersion: v1
kind: PersistentVolumeClaim
metadata:
 name: pvc-migrated-volume
 annotations:
   volume.beta.App-Orchestrator.io/storage-class: <storage-class-name>
spec:
 accessModes:
   - ReadWriteOnce
 resources:
  requests:
    storage: <virtual-disk-size>
 volumeName: <virtual-disk-name>
```

FIG. 2G

Create a VolumeSnapshotClass for creating snapshots of persistent volumes:

```
apiVersion: snapshot.storage.k8s.io/v1beta1
kind: VolumeSnapshotClass
metadata:
  name: hedvig-snapshot-class
driver: io.hedvig.csi
deletionPolicy: Delete
```

Create a VolumeSnapshot of an existing persistent volume using this class:

```
apiVersion: snapshot.storage.k8s.io/v1beta1
kind: VolumeSnapshot
metadata:
  name: snapshot-pvc-block
spec:
  VolumeSnapshotClassName: hedvig-snapshot-class
  source:
    persistentVolumeClaimName: pvc-nginx-block
```

Use the volume snapshot to create a new PersistentVolumeClaim:

```
apiVersion: v1
kind: PersistentVolumeClaim
metadata:
  name: pvc-clone
spec:
  storageClassName: sc-hedvig-clone
  dataSource:
    name: snapshot-pvc-block
    kind: VolumeSnapshot
    apiGroup: snapshot.storage.k8s.io
  accessModes:
    - ReadWriteOnce
  resources:
    requests:
      storage: 10Gi
```

FIG. 2H

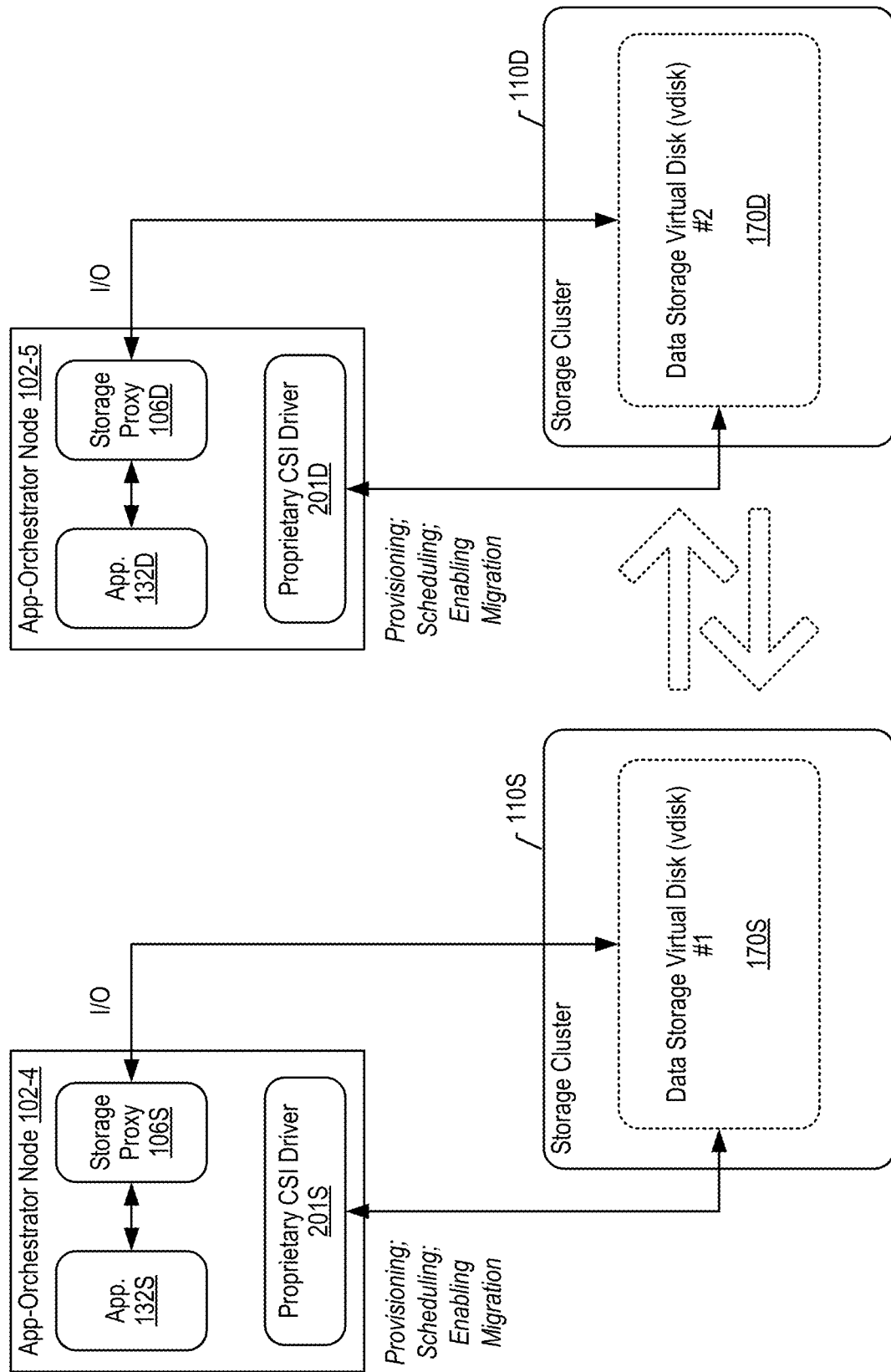
FIG. 3  Vdisk Data On A First Storage Cluster Migrates To Corresponding Vdisk On Another Storage Cluster; And Vice Versa

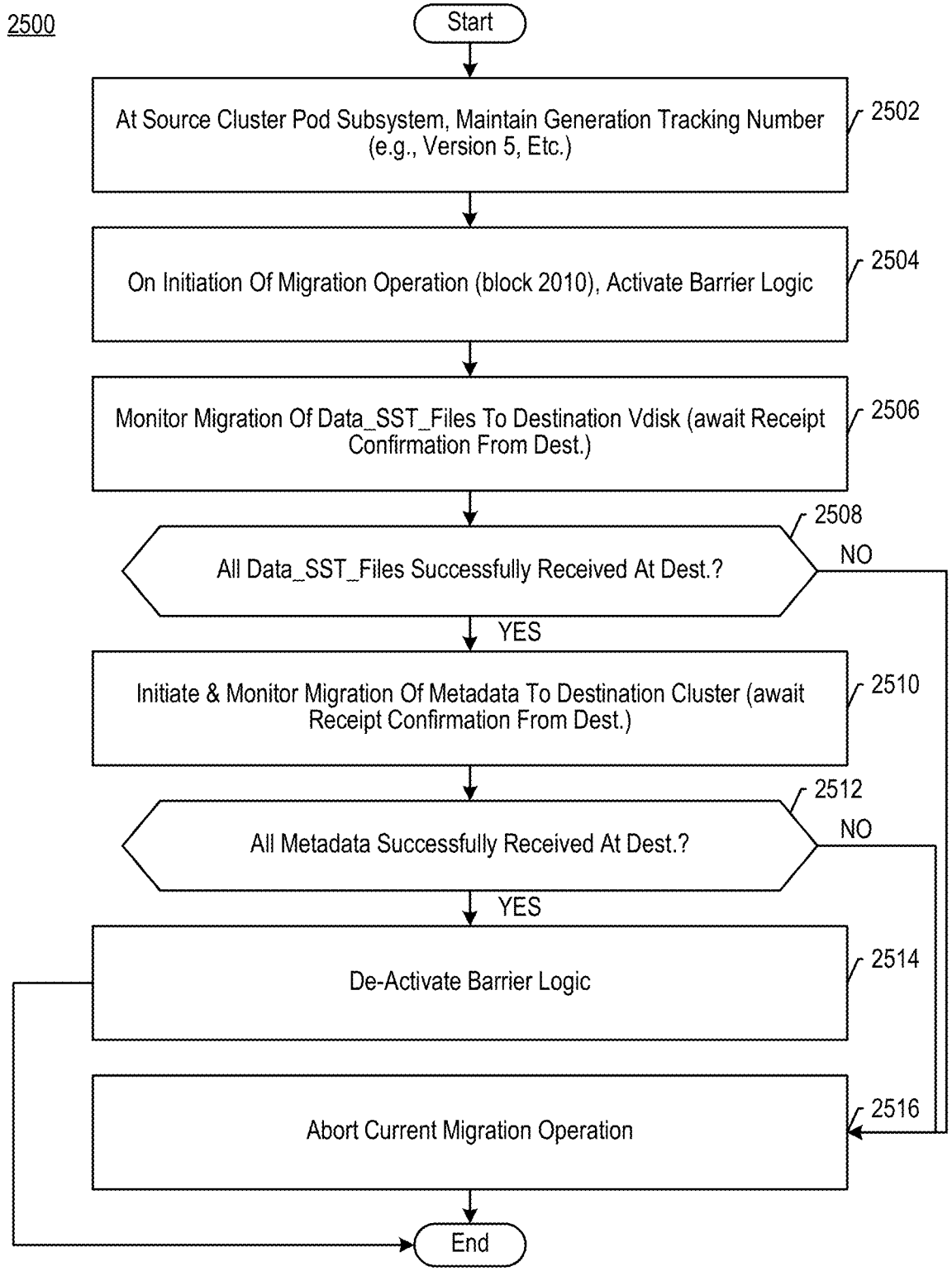
FIG. 12     Illustrative Distributed Barrier Logic Operating At Source Pod Subsystem

CONTAINER DATA MOVER FOR MIGRATING DATA BETWEEN DISTRIBUTED DATA STORAGE SYSTEMS INTEGRATED WITH APPLICATION ORCHESTRATORS

INCORPORATION BY REFERENCE TO ANY PRIORITY APPLICATIONS

This application is a Continuation of U.S. patent application Ser. No. 17/179,160 filed on Feb. 18, 2021, which claims priority to U.S. Provisional Patent Application No. 63/082,631 filed on Sep. 24, 2020, which is incorporated by reference in its entirety, including Appendices, herein. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

SUMMARY

A distributed data storage system comprises features for integration with application orchestrators such as Kubernetes, and includes a proprietary Container Storage Interface (CSI) driver. A number of custom resources are designed and defined to be directly consumed as native by the application orchestrator environment, e.g., Kubernetes and/or containerized applications. Features include setting snapshot scheduling and retention policies, and a "container data mover" that replicates data from a source to a distinct destination distributed data storage system. In the distributed data storage system, data is stored on virtual disks that are partitioned into distinct portions called storage containers. The storage containers may be replicated on a plurality of storage service nodes across the storage system. The illustrative container data mover enables data in these storage containers to migrate efficiently between distinct distributed data storage systems. The migration may be between on-premises and/or public cloud environments, without limitation. The migration may be configured one-to-one, one-to-many, unidirectional, and/or bi-directional. Metadata-based snapshots and metadata-based changed block tracking identify payload data that needs to move from source to destination within the application orchestrator frameworks at both ends. Payload data migrates from source to destination using different techniques than those used for migrating metadata, e.g., kernel-to-kernel for copying payload data versus ordinary writes for metadata. An illustrative barrier logic ensures that the migration follows a controlled progression of operations. Thus, the container data mover feature represents a technological improvement that offers streamlined migration between storage systems.

To enhance the reader's understanding of the present disclosure, the term "metadata" is distinguished from the term "data", even though both data and metadata comprise information stored on the illustrative distributed data storage system. Accordingly, "data" will refer herein to "payload" data, which is typically generated by an application or other data source that uses the distributed data storage system as a data storage resource, e.g., generated by a containerized application orchestrated by Kubernetes or another application orchestrator. Thus, the terms "data", "payload", and "payload data" will be used interchangeably herein. On the other hand, "metadata" will refer to other information in the distributed data storage system, e.g., information about the payload data, about the components hosting the payload data, about other metadata-hosting components, about other components of the distributed data storage system, and also meta-metadata. Finally, the invention is not limited to embodiments that operate within a Kubernetes framework, but most of the examples given herein are Kubernetes-based or Kubernetes-compatible in order enhance the reader's understanding and appreciation of the present disclosure.

BRIEF DESCRIPTION OF THE DRAWINGS

FIG. 1C is a block diagram depicting certain subsystems of the storage service of distributed data storage system 100, according to an illustrative embodiment.

FIG. 2A depicts provisioning, scheduling, and migration activation at the distributed data storage system using a proprietary container storage interface (CSI), according to an illustrative embodiment.

FIG. 2B depicts certain aspects of configuring data migration for CSI volumes including creating a migration location according to an illustrative embodiment.

FIG. 2C depicts certain aspects of creating a snapshot schedule and a snapshot class according to an illustrative embodiment.

FIG. 2D depicts creating a storage class with migration location and snapshot schedule and a new storage class, and creating an illustrative persistent volume claim, according to illustrative embodiments.

FIG. 2E depicts a number of operations to access the migrated persistent volume on the target (destination) storage cluster according to an illustrative embodiment.

FIG. 2F depicts creating an illustrative persistent volume that corresponds to the migrated virtual disk according to an illustrative embodiment.

FIG. 2G depicts creating a persistent volume claim corresponding to the persistent volume in FIG. 2F, according to an illustrative embodiment.

FIG. 2H depicts an illustrative workflow for creating on-demand snapshots, according to an illustrative embodiment.

FIG. 3 depicts a configuration comprising two distributed data storage systems having virtual disks that may migrate between them, according to an illustrative embodiment.

FIG. 12 depicts a flow chart of a method 2500 for performing barrier logic at the source storage cluster, according to an illustrative embodiment.

DETAILED DESCRIPTION

Figure 1A:
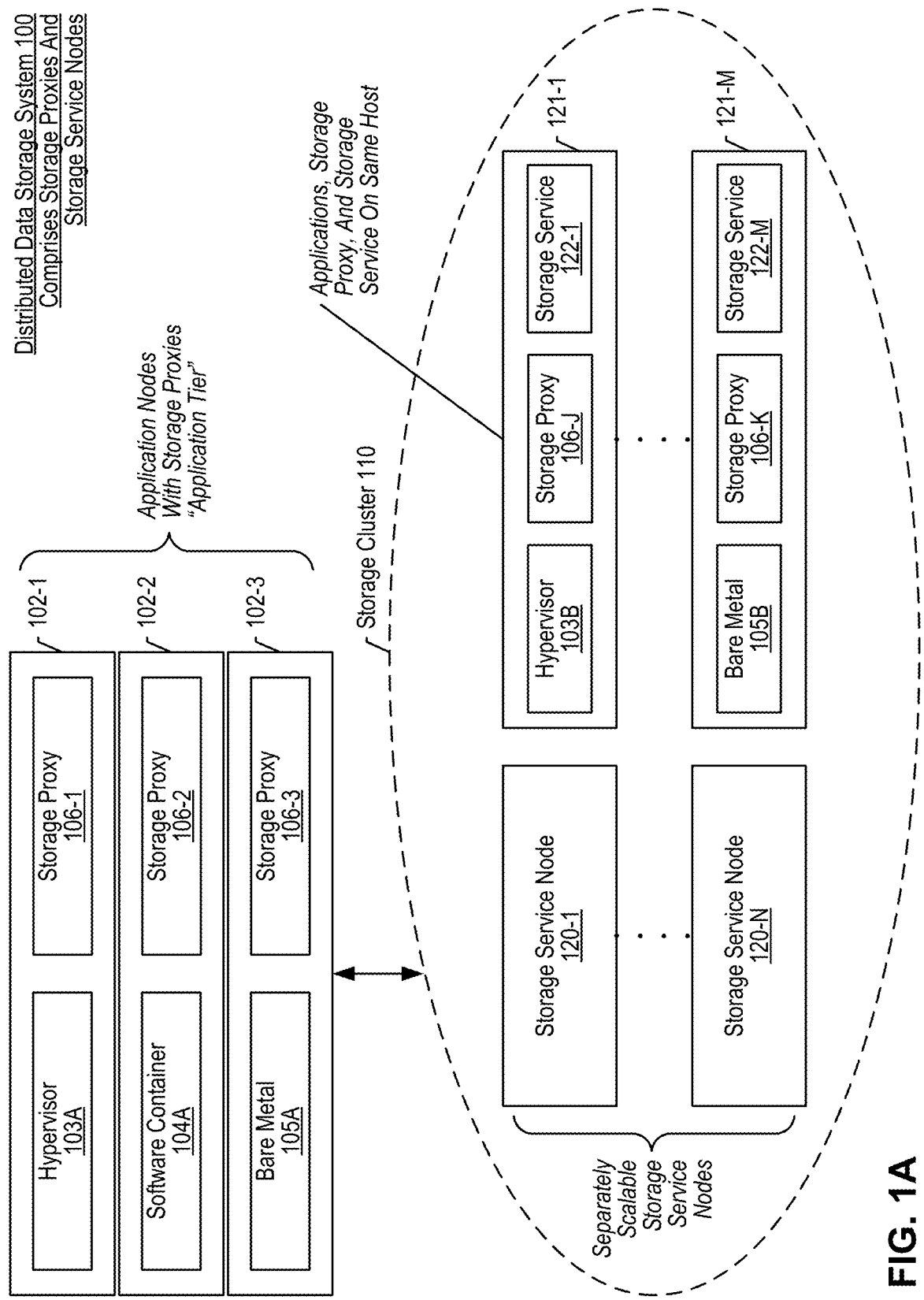
FIG. 1A is a block diagram depicting a distributed data storage system 100 according to an illustrative embodiment.

Detailed descriptions and examples of systems and methods according to one or more illustrative embodiments of the present invention may be found in the section entitled CONTAINER DATA MOVER FOR MIGRATING DATA BETWEEN DISTRIBUTED DATA STORAGE SYSTEMS INTEGRATED WITH APPLICATION ORCHESTRATORS, as well as in the section entitled Example Embodiments, and also in FIGS. 1A-12 herein.

Various embodiments described herein are intimately tied to, enabled by, and would not exist except for, computer technology. For example, data transfers from source to destination storage clusters described herein in reference to various embodiments cannot reasonably be performed by humans alone, without the computer technology upon which they are implemented.

Generally, the systems and associated components described herein may be compatible with and/or provide at least some of the functionality of the systems and corresponding components described in one or more of the following U.S. patents and patent applications assigned to Commvault Systems, Inc., each of which is hereby incorporated by reference in its entirety herein.

| Title | USPTO Ser. No. | U.S. Pat. No. | Filing Date |
| --- | --- | --- | --- |
| Storage System For Provisioning And Storing Data To A Virtual Disk | 14/322813 | 10,067,722 | Jul. 2, 2014 |
| Method For Writing Data To A Virtual Disk Using A Controller Virtual Machine And Different Storage And Communication Protocols | 14/322832 | 9,875,063 | Jul. 2, 2014 |
| Disk Failure Recovery For Virtual Disk With Policies | 14/322850 | 9,424,151 | Jul. 2, 2014 |
| Creating And Reverting To A Snapshot Of A Virtual Disk | 14/322855 | 9,558,085 | Jul. 2, 2014 |
| Cloning A Virtual Disk In A Storage Platform | 14/322867 | 9,798,489 | Jul. 2, 2014 |
| Writing To A Storage Platform Including A Plurality Of Storage Clusters | 14/322868 | 9,483,205 | Jul. 2, 2014 |
| Time Stamp Generation For Virtual Disks | 14/322871 | 9,411,534 | Jul. 2, 2014 |
| Method For Writing Data To Virtual Disk Using A Controller Virtual Machine And Different Storage And Communication Protocols On A Single Storage Platform | 14/684086 | 9,864,530 | Apr. 10, 2015 |
| Dynamically Splitting A Range Of A Node In A Distributed Hash Table | 14/723380 | Abandoned | May 27, 2015 |
| Storage System With Virtual Disks | Pct/Us2015/38687 | Expired | Jun. 30, 2015 |
| Global De-Duplication Of Virtual Disks In A Storage Platform | 15/155838 | 10,846,024 | May 16, 2016 |
| De-Duplication Of Client-Side Data Cache For Virtual Disks | 15/156015 | 10,795,577 | May 16, 2016 |
| Persistent Reservations For Virtual Disk Using Multiple Targets | 15/163446 | 10,248,174 | May 24, 2016 |
| Synchronization Of Metadata In A Distributed Storage System | 15/834921 | 10,740,300 | Dec. 7, 2017 |
| In-Flight Data Encryption/Decryption For A Distributed Storage Platform | 15/912374 | 10,848,468 | Mar. 5, 2018 |
| Persistent Reservations For Virtual Disk Using Multiple Targets | 16/274014 | 10,691,187 | Feb. 12, 2019 |
| Distributed Data Storage System Using Erasure Coding On Storage Nodes Fewer Than Data Plus Parity Fragments | 63/053414 | | Jul. 17, 2020 |
| Distributed Data Storage System Using Erasure Coding On Storage Nodes Fewer Than Data Plus Parity Fragments | 63/065722 | | Aug. 14, 2020 |

-continued

| Title | USPTO Ser. No. | U.S. Pat. No. | Filing Date |
| --- | --- | --- | --- |
| Optimized Deduplication Based On Backup Frequency In A Distributed Data Storage System | 63/070162 | | Aug. 25, 2020 |
| Anti-Entropy-Based Metadata Recovery In A Strongly Consistent Distributed Data Storage System | 63/081,503 | | Sep. 22, 2020 |
| Commissioning And Decommissioning Metadata Nodes In A Running Distributed Data Storage System | 63/082624 | | Sep. 24, 2020 |
| Container Data Mover For Migrating Data Between Distinct Distributed Data Storage Systems Integrated With Application Orchestrators | 63/082631 | | Sep. 24, 2020 |
| Optimized Deduplication Based On Backup Frequency In A Distributed Data Storage System | 17/153667 | | Jan. 20, 2021 |
| Cloud-Based Distributed Data Storage System Using Block-Level Deduplication Based On Backup Frequencies Of Incoming Backup Copies | 17/153674 | | Jan. 20, 2021 |

Distributed Data Storage System

An example embodiment of the disclosed distributed data storage system is the Hedvig Distributed Storage Platform now available from Commvault Systems, Inc. of Tinton Falls, New Jersey, USA, and thus some of the terminology herein originated with the Hedvig product line. The illustrative distributed data storage system comprises a plurality of storage service nodes that form one or more storage clusters. Data reads and writes originating from an application on an application host computing device are intercepted by a storage proxy, which is co-resident with the originating application. The storage proxy performs some pre-processing and analysis functions before making communicative contact with the storage cluster. The system ensures strong consistency of data and metadata written to the storage service nodes.

Terminology for the Distributed Data Storage System

Data and Metadata. To enhance the reader's understanding of the present disclosure, the term "metadata" is distinguished from the term "data" herein, even though both data and metadata comprise information stored on the illustrative distributed data storage system. Accordingly, "data" will refer to "payload" data, which is typically generated by an application or other data source that uses the distributed data storage system for data storage. Thus, the terms "data", "payload", and "payload data" will be used interchangeably herein. On the other hand, "metadata" will refer to other information in the distributed data storage system, e.g., information about the payload data, about the components hosting the payload data, about metadata-hosting components, about other components of the distributed data storage system, and also information about the metadata, i.e., "meta-metadata."

Storage Service, e.g., Hedvig Storage Service. The storage service is a software component that installs on commodity x86 or ARM servers to transform existing server and storage assets into a fully-featured elastic storage cluster. The storage service may deploy to an on-premise infrastructure, to hosted clouds, and/or to public cloud computing environments to create a single system that is implicitly hybrid.

Storage Service Node (or storage node), e.g., Hedvig Storage Server (HSS), comprises both computing and storage resources that collectively provide storage service. The system's storage service nodes collectively form one or more storage clusters. Multiple groups of storage service nodes may be clustered in geographically and/or logically disparate groups, e.g., different cloud computing environments, different data centers, different usage or purpose of a storage cluster, etc., without limitation, and thus the present disclosure may refer to distinct storage clusters in that context. One or more of the following storage service subsystems of the storage service may be instantiated at and may operate on a storage service node: (i) distributed fault-tolerant metadata subsystem providing metadata service, e.g., "Hedvig Pages"; (ii) distributed fault-tolerant data subsystem (or data storage subsystem) providing payload data storage, e.g., "Hedvig HBlock"; and (iii) distributed fault-tolerant pod subsystem for generating and maintaining certain system-level information, e.g., "Hedvig HPod." The system stores payload data on certain dedicated storage resources managed by the data storage subsystem, and stores metadata on other dedicated storage resources managed by the metadata subsystem. Thus, another way to distinguish payload data from metadata in the illustrative system is that payload data is stored in and maintained by the data storage subsystem and metadata is stored in and maintained by the metadata subsystem. The pod subsystem, the metadata subsystem, and the data storage subsystem are all partitioned and replicated across various storage service nodes. These subsystems operate as independent services, they need not be co-located on the same storage service node, and they may communicate with a subsystem on another storage service node as needed.

Replica. The distributed data storage system replicates data and metadata across multiple storage service nodes. A "replica" or "replica node" is a storage service node that hosts a replicated copy of data and/or metadata that is also stored on other replica nodes. Illustratively, metadata uses a replication factor of 3, though the invention is not so limited. Thus, with a replication factor of 3 ("RF3"), each portion of metadata is replicated on three distinct metadata nodes across the storage cluster.

Virtual Disk ("vdisk") and Storage Containers. The virtual disk is the unit of storage made visible by system 100 to applications and/or application nodes. Every virtual disk provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during input/output (I/O) and/or disk rebuilds. Thus, virtual disks are distributed and fault-tolerant.

Storage Pools. Storage pools are logical groupings of physical disks/drives in a storage service node and are configured as the protection unit for disk/drive failures and rebuilds. Within a replica, one or more storage containers are assigned to a storage pool. A typical storage service node will host two to four storage pools.

Metadata Node. An instance of the metadata subsystem executing on a storage service node is referred to as a metadata node that provides "metadata service." The metadata subsystem executing on a storage service node stores metadata at the storage service node. The metadata node communicates with one or more other metadata nodes to provide a system-wide metadata service. The metadata subsystem also communicates with pod and/or data storage subsystems at the same or other storage service nodes. Some metadata nodes are designated owners of certain virtual disks whereas others are replicas but not owners. Owner nodes are invested with certain functionality for managing the owned virtual disk.

Metadata Node Identifier or Storage Identifier (SID) is a unique identifier of the metadata service instance on a storage service node, i.e., the unique system-wide identifier of a metadata node.

Storage Proxy. Each storage proxy is a lightweight software component that deploys at the application tier, i.e., on application servers or hosts. A storage proxy may be implemented as a virtual machine (VM) or as a software container (e.g., Docker), or may run on bare metal to provide storage access to any physical host or VM in the application tier. As noted, the storage proxy intercepts reads and writes issued by applications and directs input/output (I/O) requests to the relevant storage service nodes.

Erasure Coding (EC). In some embodiments, the illustrative distributed data storage system employs erasure coding rather than or in addition to replication. EC is one of the administrable attributes for a virtual disk. The default EC policy is (4,2), but (8,2) and (8,4) are also supported if a sufficient number of storage service nodes are available. The invention is not limited to a particular EC policy unless otherwise noted herein.

Container Data Mover for Migrating Data Between Distributed Data Storage Systems Integrated with Application Orchestrators The illustrative distributed data storage system comprises features for integration with application orchestrators (a/k/a "container orchestrators") such as Kubernetes and Kubernetes-based technologies, and includes an enhanced and proprietary Container Storage Interface (CSI) driver. Payload data and corresponding metadata move efficiently from source to destination within application orchestrator frameworks (e.g., Kubernetes frameworks) at both ends. Application orchestrators such as Kubernetes enable users to build cloud-independent applications. To achieve cloud independence, it is necessary to have cloud-agnostic storage resources to increase availability not only within a single site but also across different physical locations, including the cloud. The illustrative distributed data storage system, using one or more of the capabilities described herein, provides such a cloud-agnostic storage system.

Software Container Ecosystem.

The illustrative distributed data storage system provides native integration with application orchestrators such as Kubernetes and Kubernetes-based technologies, and enables: simplifying workflows via a proprietary Container Storage Interface (CSI); facilitating data management with built-in data protection and cloud data mobility; and securing the data storage environment through automatic snapshotting of persistent volumes. Software containers (or "containerization") are well known in the art, and can be defined as operating system (OS)-level virtualization in which an operating system kernel allows the existence of multiple isolated user space instances. Kubernetes has emerged as a popular standard for container orchestration, and is well known in the art. See, e.g., http://kubernetes.io/.

Storage Container Support.

There is a need for infrastructure that integrates across all types of application orchestrator deployments (e.g., Kubernetes), including cloud-managed and/or self-managed deployments, and delivers seamless migration, data protection, availability, and disaster recovery for the entirety of these containerized environments. Some of the key technological improvements enabled by the illustrative distributed data storage system include without limitation: integrated storage container snapshots that provide point in time protection for stateful container workloads; storage container migration that delivers an efficient and intelligent data movement of unique changes across distinct storage clusters; and integrated policy automation that enables granular control over the frequency of snapshot and migration operations and the targeted environment to which the data is intelligently sent.

Persistent Volumes for Containers.

An enhanced proprietary container storage interface (CSI) driver 201 (see FIG. 2A) enables containerized applications to maintain state by dynamically provisioning and consuming virtual disks (configured in the distributed data storage system) as persistent volumes. The distributed data storage system simplifies existing stateful container workflows with complete storage lifecycle management while operating within the confines of the application/container orchestrator of choice.

Policy Driven Data Placement.

As organizations migrate stateful applications to container ecosystems, it is necessary to effectively manage data owned by different groups within the organizations while adhering to security and compliance policies. Each group might have its preferred choice of container ecosystem as well as a preferred location (on-prem and/or in the cloud) for persistent application data. The self-service, API-driven programmable infrastructure of some application orchestrators such as Kubernetes allows for customization. The illustrative distributed data storage system enables users to specify where they want their persistent application data to reside. By providing data placement as a policy, different groups within an organization can continue to use their existing workflows.

Snapshots and Clones.

Snapshots and clones generated by the illustrative distributed data storage system are seamlessly integrated into application orchestrators through the illustrative proprietary CSI driver. When data is spread across multiple disparate sites, continuous data protection can pose a significant challenge without a uniform data protection scheme. With a single storage fabric that spans multiple sites, data placement policies that are declarative in nature coupled with built-in snapshot capabilities, the illustrative distributed data storage system provides a uniform location-transparent scheme for protecting data.

Continuous Data Protection Using Snapshots.

A snapshot can be defined as the state of a storage volume captured at a given point in time. Persisting point in time states of volumes provide a fast recovery mechanism in the event of failures with the ability to restore known working points in the past. In the distributed data storage system, volume snapshots are space-efficient metadata-based zero-copy snapshots. Every newly created volume (e.g., virtual disk) has a version number and a version tree associated with it. The version number starts with "1" and is incremented on every successful snapshot operation along with an update to the version tree. Every block of data written is versioned with the version number associated with the volume at the time of the corresponding write operation.

As an example to understand how snapshots provide data protection in the distributed data storage system, consider the following sequence of events: a Hedvig volume is provisioned for application data at time t1 (version number: 1); a periodic snapshot is triggered at time t2 (version number: 2); a periodic snapshot is triggered at time t3 (version number: 3); and a ransomware attacks at time t4 after time t3. At t4, any new writes that happen as a part of the ransomware attack are recorded with version number: 3, because that is the currently active version number. By reverting the volume back to the previous version (2), the application can be recovered instantly. The process of reverting a volume to an earlier version is not dependent on the size of the volume or the amount of data it contains. No data of the volume needs to be copied during the snapshot or the revert operation, resulting in a data protection scheme that is simple, fast and operationally inexpensive.

Data Protection for Containerized Applications.

The illustrative proprietary CSI driver 201 (see FIG. 2A) provides users the ability to create on-demand snapshots as well as automated scheduled snapshots of stateful containerized applications. Snapshot management through the proprietary CSI driver is policy-driven, thereby enabling automation to be extended all the way to the data layer. See also FIGS. 2C, 2D, and 2H.

Container Data Mover.

The illustrative container data mover feature enables automated data migration of storage container data between storage clusters. The migration may be implemented across any kind of storage clusters, e.g., on-premises to any other, cloud to any other, public and/or private cloud, etc., without limitation. Thus, the container data mover is widely applicable to many and diverse environments. Even though the distributed data storage system provides a single distributed fabric that can span multiple on-prem and cloud sites, different groups might choose to isolate their data (for example, for compliance, risk mitigation, etc.) within different and distinct storage clusters. The container data mover enables organizations to isolate their application data in different storage clusters and to migrate between them as needed.

Change block tracking is typically used as incremental backup technology, but here it is used for efficiently migrating payload data between storage clusters. Because every block of payload data stored at the source storage cluster carries a version number, change block tracking is native to the illustrative distributed data storage system. Accordingly changed data can be identified by generation number/version and granularly migrated.

The intelligence built into the disclosed Container Data Mover technology leverages the use of kernel-to-kernel copies of payload data between source and destination storage nodes, which provides a fast data transfer channel. Accordingly, changed payload data is moved en masse through kernel-to-kernel copying of payload data files from source to destination, without having to rely on block-by-block application-level reads and writes between storage clusters that are ordinarily performed by the data storage subsystems and/or metadata subsystems at the storage service nodes. Payload data migration is orchestrated through snapshots and versioned change block tracking, which is native to the distributed data storage system. More details are given in FIG. 5 and other figures.

Distributed Barrier.

The illustrative distributed data storage system leverages a novel distributed barrier logic to implement a state machine for data migration. This process involves the following example steps, without limitation:

The data migration job is initiated on a coordinator node on a source storage cluster. The coordinator node is a metadata node that is the designated vdisk owner for the virtual disk being migrated. See also FIG. 5.

The coordinator node gets the latest state information from all nodes involved in the migration, i.e., storage container nodes and replicas.

Data migration to the destination storage cluster happens in a distributed manner with each replica node updating its current state to the barrier logic as the migration progresses. See also FIG. 12.

In case of recoverable errors/failures, replica nodes perform smart retries.

In case of irrecoverable failures, e.g., in the event of network partition, the coordinator node decides the outcome of the migration by reviewing the state machine view and typically aborts the migration operation.

While migration is in progress for a given source volume, the corresponding target (destination) volume is frozen for consumption.

See also FIGS. 7-12. When the migration is complete, migrated volumes contain the most recent point-in-time snapshot received from the corresponding source volumes, including payload data and associated metadata. Applications can then consume the migrated data as clones of migrated volumes on the destination storage cluster.

Policy Driven Container Data Mover.

Data migration can be seamlessly enabled through policies assigned to application orchestrator (e.g., Kubernetes) constructs. Snapshot schedules provided through the proprietary CSI driver are enhanced to configure data migration based on the snapshot retention period. A data migration workflow example for CSI volumes is shown in FIG. 2B with additional examples in FIGS. 2C-2H. More details are given in FIGS. 2A-12.

FIG. 1A is a block diagram depicting a distributed data storage system 100 according to an illustrative embodiment. The figure depicts: a plurality of application nodes 102 that form an "application tier," each application node comprising a storage proxy 106 and one of components 103A, 104A, and 105A; and a storage cluster 110 comprising a plurality of separately scalable storage service nodes 120 and a plurality of specially-equipped compute hosts 121.

Distributed data storage system 100 (or system 100) comprises storage proxies 106 and storage cluster 110. System 100 flexibly leverages both hyperscale and hyperconverged deployment options, sometimes implemented in the same storage cluster 110 as depicted here. Hyperscale deployments scale storage resources independently from the application tier, as shown by storage service nodes 120 (e.g., 120-1 . . . 120-N). In such hyperscale deployments, storage capacity and performance scale out horizontally by adding commodity servers running the illustrative storage service; application nodes (or hosts) 102 scale separately along with storage proxy 106. On the other hand, hyperconverged deployments scale compute and storage in lockstep, with workloads and applications residing on the same physical nodes as payload data, as shown by compute hosts 121. In such hyperconverged deployments, storage proxy 106 and storage service software 122 are packaged and deployed as VMs on a compute host 121 with a hypervisor 103 installed. In some embodiments, system 100 provides plug-ins for hypervisor and virtualization tools, such as VMware vCenter, to provide a single management interface for a hyperconverged solution.

System 100 provides enterprise-grade storage services, including deduplication, compression, snapshots, clones, replication, auto-tiering, multitenancy, and self-healing of both silent corruption and/or disk/node failures to support production storage operations, enterprise service level agreements (SLAs), and/or robust storage for backed up data (secondary copies). Thus, system 100 eliminates the need for enterprises to deploy bolted-on or disparate solutions to deliver a complete set of data services. This simplifies infrastructure and further reduces overall Information Technology (IT) capital expenditures and operating expenses. Enterprise storage capabilities can be configured at the granularity of a virtual disk, providing each data originator, e.g., application, VM, and/or software container, with its own unique storage policy. Every storage feature can be switched on or off to fit the specific needs of any given workload. Thus, the granular provisioning of features empowers administrators to avoid the challenges and compromises of "one size fits all" storage and helps effectively support business SLAs, while decreasing operational costs.

System 100 inherently supports multi-site availability, which removes the need for additional costly disaster recovery solutions. The system provides native high availability storage for applications across geographically dispersed data centers by setting a unique replication policy and replication factor at the virtual disk level.

System 100 comprises a "shared-nothing" distributed computing architecture in which each storage service node is independent and self-sufficient. Thus, system 100 eliminates any single point of failure, allows for self-healing, provides non-disruptive upgrades, and scales indefinitely by adding more storage service nodes. Each storage service node stores and processes metadata and/or payload data, then communicates with other storage service nodes for data/metadata distribution according to the replication factor.

Storage efficiency in the storage cluster is characterized by a number of features, including: thin provisioning, deduplication, compression, compaction, and auto-tiering. Each virtual disk is thinly provisioned by default and does not consume capacity until data is written therein. This space-efficient dynamic storage allocation capability is especially useful in DevOps environments that use Docker, OpenStack, and other cloud platforms where volumes do not support thin provisioning inherently, but can support it using the virtual disks of system 100. System 100 provides inline global deduplication that delivers space savings across the entire storage cluster. Deduplication is administrable at the virtual disk level to optimize I/O and lower the cost of storing data. As writes occur, the system 100 calculates the unique fingerprint of data blocks and replaces redundant data with a small pointer. The deduplication process can be configured to begin at storage proxy 106, improving write performance and eliminating redundant data transfers over the network. System 100 provides inline compression administrable at the virtual disk level to optimize capacity usage. The system stores only compressed data on the storage service nodes. Illustratively, the Snappy compression library is used, but the invention is not limited to this implementation. To improve read performance and optimize storage space, the illustrative system periodically performs garbage collection to compact redundant blocks and generate large sequential chunks of data. The illustrative system balances performance and cost by supporting tiering of data among high-speed SSDs and lower-tier persistent storage technologies.

Application node (or host) 102 (e.g., 102-1, 102-2, 102-3) is any computing device, comprising one or more hardware processors and computer memory for executing computer programs, that generates and/or accesses data stored in storage cluster 110. Application(s) (not shown here but see, e.g., applications 132 in FIG. 1B) executing on an application node 102 use storage cluster 110 as a data storage resource. Application node 102 can take the form of: a bare metal host 105A for applications with storage proxy 106-3; a virtual machine server with hypervisor 103A and storage proxy 106-1; a container host hosting software container 104A and storage proxy 106-2; and/or another computing device configuration equipped with a storage proxy 106.

Hypervisor 103 (e.g., 103A, 103B) is any hypervisor, virtual machine monitor, or virtualizer that creates and runs virtual machines on a virtual machine server or host. Software container 104A is any operating system virtualization software that shares the kernel of the host computing device (e.g., 102, 121) that it runs on and allows multiple isolated user space instances to co-exist. Docker is an example of software container 104A. Bare metal 105A refers to application node 102-3 running as a traditional computing device without virtualization features. Components 103, 104A, and 105A/B are well known in the art.

Storage proxy 106 (e.g., 106-1, 106-2, 106-3, 106-J . . . 106-K) is a lightweight software component that deploys at the application tier, i.e., on application nodes 102 and/or compute hosts 121. A storage proxy may be implemented as a virtual machine 106-1, as a software container (e.g., Docker) 106-2, and/or running on bare metal (e.g., 106-3) to provide storage access to any physical host or VM in the application tier. The storage proxy acts as a gatekeeper for all I/O requests to virtual disks configured at storage cluster 110. It acts as a storage protocol converter, load balances I/O requests to storage service nodes, caches data fingerprints, and performs certain deduplication functions. Storage protocols supported by storage proxy 106 include Internet Small Computer Systems Interface (iSCSI), Network File System (NFS), Server Message Block (SMB2) or Common Internet File System (CIFS), Amazon Simple Storage Service (S3), OpenStack Object Store (Swift), without limitation. The storage proxy runs in user space and can be managed by any virtualization management or orchestration tool. With storage proxies 106 that run in user space, the disclosed solution is compatible with any hypervisor, software container, operating system, or bare metal computing environment at the application node. In some virtualized embodiments where storage proxy 106 is deployed on a virtual machine, the storage proxy may be referred to as a "controller virtual machine" (CVM) in contrast to application-hosting virtual machines that generate data for and access data at the storage cluster.

Storage cluster 110 comprises the actual storage resources of system 100, such as storage service nodes 120 and storage services 122 running on compute hosts 121. In some embodiments, storage cluster 110 is said to comprise compute hosts 121 and/or storage service nodes 120.

Storage service node 120 (e.g., 120-1 . . . 120-N) is any commodity server configured with one or more x86 or ARM hardware processors and with computer memory for executing the illustrative storage service, which is described in more detail in FIG. 1C. Storage service node 120 also comprises storage resources as described in more detail in FIG. 1D. By running the storage service, the commodity server is transformed into a full-featured component of storage cluster 110. System 100 may comprise any number of storage service nodes 120.

Compute host 121 (e.g., 121-1 . . . 121-M) is any computing device, comprising one or more hardware processors and computer memory for executing computer programs, that comprises the functional components of an application node 102 and of a storage service node 120 in a "hyperconverged" configuration. In some embodiments, compute hosts 121 are configured, sometimes in a group, within an appliance such as the Commvault Hyperscale™ X backup appliance from Commvault Systems Inc., of Tinton Falls, New Jersey, USA.

Figure 1B:
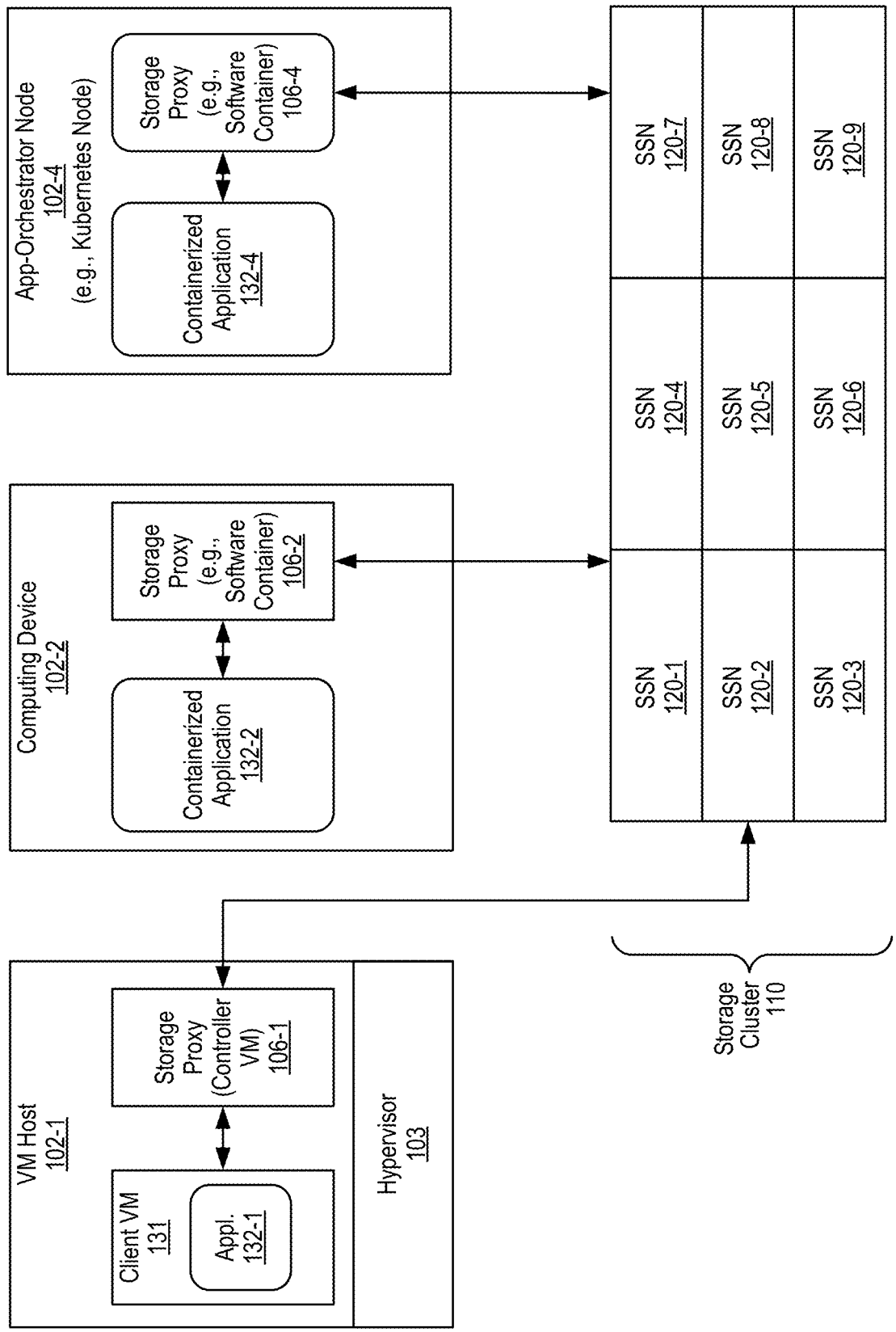
FIG. 1B is a block diagram illustrating some details of the distributed data storage system 100 comprising separately scalable storage service nodes according to an illustrative embodiment.

FIG. 1B is a block diagram illustrating some details of the distributed data storage system 100 comprising separately scalable storage service nodes 120 according to an illustrative embodiment. The figure depicts: application node 102-1 embodied as a VM host and hosting hypervisor 103, storage proxy 106-1 embodied as a controller virtual machine, and client VM 131 hosting application 132-1; application node 102-2 hosting containerized storage proxy 106-2 and containerized application 132-2; application orchestrator node 102-4 comprising containerized application 132-4 and containerized storage proxy 106-4; and storage cluster 110 comprising nine (9) distinct physical storage service nodes 120 (e.g., 120-1 . . . 120-9). Virtual machine hosts, virtual machines, and hypervisors are well known in the art. Application node 102-3, which appears in FIG. 1A, is not shown here for simplicity, but is part of some embodiments.

Application 132 (e.g., 132-1, 132-2, 132-4, etc.) is any software that executes on its underlying host (e.g., 102-1, 102-2, 102-4) and performs a function as a result. The application 132 may generate data and/or need to access data which is stored in system 100. Examples of application 132 include email applications, database management applications, office productivity software, backup software, etc., without limitation.

The bi-directional arrows between each storage proxy 106 and a storage service node 120 depict the fact that communications between applications 132 and storage cluster 110 pass through storage proxies 106, each of which identifies a proper storage service node 120 to communicate with for the present transaction, e.g., storage service node 120-2 for storage proxy 106-1, storage service node 120-4 for storage proxy 106-2, etc.

Application orchestrator node 102-4 is illustratively embodied as a Kubernetes node (a/k/a Kubernetes kubelet) that comprises or hosts one or more containerized applications 132-4 and containerized storage proxy 106-4. See also https://kubernetes.io/docs/reference/command-line-tools-reference/kubelet/ for more details on the Kubernetes kubelet, which is the primary node agent that runs on each Kubernetes node. The Kubernetes kubelet is also known as an "agent" (or "Kubernetes agent") that runs on each Kubernetes node in a Kubernetes cluster. See, e.g., https://kubernetes.io/docs/concepts/overview/components/. Node 102-4 additionally comprises a proprietary CSI driver 201, which is not shown in the present figure and is described in detail in FIG. 2A.

It is noted here that the term "Kubernetes cluster" has a different meaning than the illustrative storage cluster(s) 110 depicted herein. "When you deploy Kubernetes, you get a cluster. A Kubernetes cluster consists of a set of worker machines, called nodes, that run containerized applications. Every [Kubernetes] cluster has at least one worker node." https://kubernetes.io/docs/concepts/overview/components/. Thus, an application orchestrator node 102-4 (e.g., Kubernetes node, Kubernetes worker node), which is part of a Kubernetes cluster, is not to be confused with storage cluster 110, which comprises storage service nodes, such as storage service nodes 120.

FIG. 1C is a block diagram depicting certain subsystems of the storage service of distributed data storage system 100, according to an illustrative embodiment. Depicted here are: storage proxy 106; application 132; and a storage service node 120 comprising a pod subsystem 130 (e.g., Hedvig "HPOD"), a metadata subsystem 140 (e.g., Hedvig "PAGES"), a data storage subsystem 150 (e.g., Hedvig "HBLOCK"); and an operating system (OS) 151. Although storage service node 120 as depicted here comprises an instance of all three storage service subsystems (130, 140, 150), any given storage service node 120 need not comprise all three subsystems. Thus, a subsystem running on a given storage service node may communicate with one or more subsystems on another storage service node as needed to complete a task or workload. Operating system 151 operates on every storage service node and is well known in the art.

Storage proxy 106 intercepts reads and writes issued by applications 132 that are targeted to particular virtual disks configured in storage cluster 110. Storage proxy 106 provides native block, file, and object storage protocol support, as follows:

Block storage—system 100 presents a block-based virtual disk through a storage proxy 106 as a logical unit number (LUN). Access to the LUN, with the properties applied during virtual disk provisioning, such as compression, deduplication and replication, is given to a host as an iSCSI target. After the virtual disk is in use, the storage proxy translates and relays all LUN operations to the underlying storage cluster.

File storage—system 100 presents a file-based virtual disk to one or more storage proxies 106 as an NFS export, which is then consumed by the hypervisor as an NFS datastore. Administrators can then provision VMs on that NFS datastore. The storage proxy acts as an NFS server that traps NFS requests and translates them into the appropriate remote procedure call (RPC) calls to the backend storage service node.

Object storage—buckets created via the Amazon S3 API, or storage containers created via the OpenStack Swift API, are translated via the storage proxies 106 and internally mapped to virtual disks 170. The storage cluster 110 acts as the object (S3/Swift) target, which client applications 132 can utilize to store and access objects.

Storage Proxy 106 comprises one or more caches that enable distributed operations and the performing of storage system operations locally at the application node 102 to accelerate read/write performance and efficiency. An illustrative metacache stores metadata locally at the storage proxy, preferably on SSDs. This cache eliminates the need to traverse the network for metadata lookups, leading to substantial read acceleration. For virtual disks provisioned with client-side caching, an illustrative block cache stores data blocks to local SSD drives to accelerate reads. By returning blocks directly from the storage proxy, read operations avoid network hops when accessing recently used data. For virtual disks provisioned with deduplication, an illustrative dedupe cache resides on local SSD media and stores fingerprint information of certain data blocks written to storage cluster 110. Based on this cache, the storage proxy determines whether data blocks have been previously written and if so, avoids re-writing these data blocks again. Storage proxy 106 first queries the dedupe cache and if the data block is a duplicate, storage proxy 106 updates the metadata subsystem 140 to map the new data block(s) and acknowledges the write to originating application 132. Otherwise, storage proxy 106 queries the metadata subsystem 140 and if the data block was previously written to storage cluster 110, the dedupe cache and the metadata subsystem 140 are updated accordingly, with an acknowledgement to originating application 132. Unique new data blocks are written to the storage cluster as new payload data. More details on reads and writes are given in FIGS. 1E and 1F.

A simplified use case workflow comprises: 1. A virtual disk 170 is administered with storage policies via a web-based user interface, a command line interface, and/or a RESTful API (representational state transfer application programming interface). 2. Block and file virtual disks are attached to a storage proxy 106, which presents the storage resource to application hosts, e.g., 102. For object storage, applications 132 directly interact with the virtual disk via Amazon S3 or OpenStack Swift protocols. 3. Storage proxy 106 intercepts application 132 I/O through the native storage protocol and communicates it to the underlying storage cluster 110 via remote procedure calls (RPCs). 4. The storage service distributes and replicates data throughout the storage cluster based on virtual disk policies. 5. The storage service conducts background processes to auto-tier and balance across racks, data centers, and/or public clouds based on virtual disk policies.

Pod subsystem 130 maintains certain system-wide information for synchronization purposes and comprises processing and tracking resources and locally stored information. A network of pods 130 throughout storage cluster 110, where each pod comprises three nodes, is used for managing transactions for metadata updates, distributed-atomic-counters as a service, tracking system-wide timeframes such as generations and epochs, etc. More details on the pod subsystem may be found in U.S. Pat. No. 9,483,205 B2, which is incorporated by reference in its entirety herein.

Metadata subsystem 140 comprises metadata processing resources and partitioned replicated metadata stored locally at the storage service node. Metadata subsystem 140 receives, processes, and generates metadata. Metadata in system 100 is partitioned and replicated across a plurality of metadata nodes. Typically, metadata subsystem 140 is configured with a replication factor of 3 (RF3), and therefore many of the examples herein will include 3-way replication scenarios, but the invention is not so limited. Each metadata subsystem 140 tracks the state of data storage subsystems 150 and of other metadata subsystems 140 in storage cluster 110 to form a global view of the cluster. Metadata subsystem 140 is responsible for optimal replica assignment and tracks writes in storage cluster 110.

Metadata synchronization logic (or "anti-entropy engine" day is completedAE) not shown here) runs in the metadata subsystem 140. The metadata synchronization logic compares replicas of metadata across metadata nodes and ensures that the replicas agree on a superset of the metadata therein to avoid losing metadata. During storage and compaction of metadata-carrying string-sorted tables (SSTs), a consistent file identification scheme is used across all metadata nodes. When an application node writes to and reads from a virtual disk on the distributed data storage system, metadata is generated and stored in replicas on different metadata nodes. A modified log-structured merge tree is used to store and compact the metadata SST files. A fingerprint file is created for each metadata SST file that includes a start-length-hash value triple for each region of the metadata SST file. To synchronize, fingerprint files of two metadata SST files are compared, and if any hash values are missing from a fingerprint file then key-value-timestamp triples corresponding to these missing hash values are sent to the metadata SST file that is missing them. An example of metadata synchronization logic is described in U.S. Pat. No. 10,740,300, which is incorporated by reference in its entirety herein.

Data storage subsystem 150 receives, processes, and stores payload data written to storage cluster 110. Thus, data storage subsystem 150 is responsible for replicating data to other data storage subsystems 150 on other storage service nodes and striping data within and across storage pools. Data storage subsystem 150 comprises storage processing for payload data blocks (e.g., I/O, compaction, garbage collection, etc.) and stores partitioned replicated payload data at the storage service node.

The bold bi-directional arrows in the present figure show that metadata is communicated between storage proxy 106 and metadata subsystem 140, whereas data blocks are transmitted to/from data storage subsystem 150. Depending on the configuration, metadata subsystem 140 may operate on a first storage service node 120 or storage service 122 and data storage subsystem 150 may operate on another distinct storage service node 120 or storage service 122. See also FIGS. 1E and 1F.

Figure 1D:
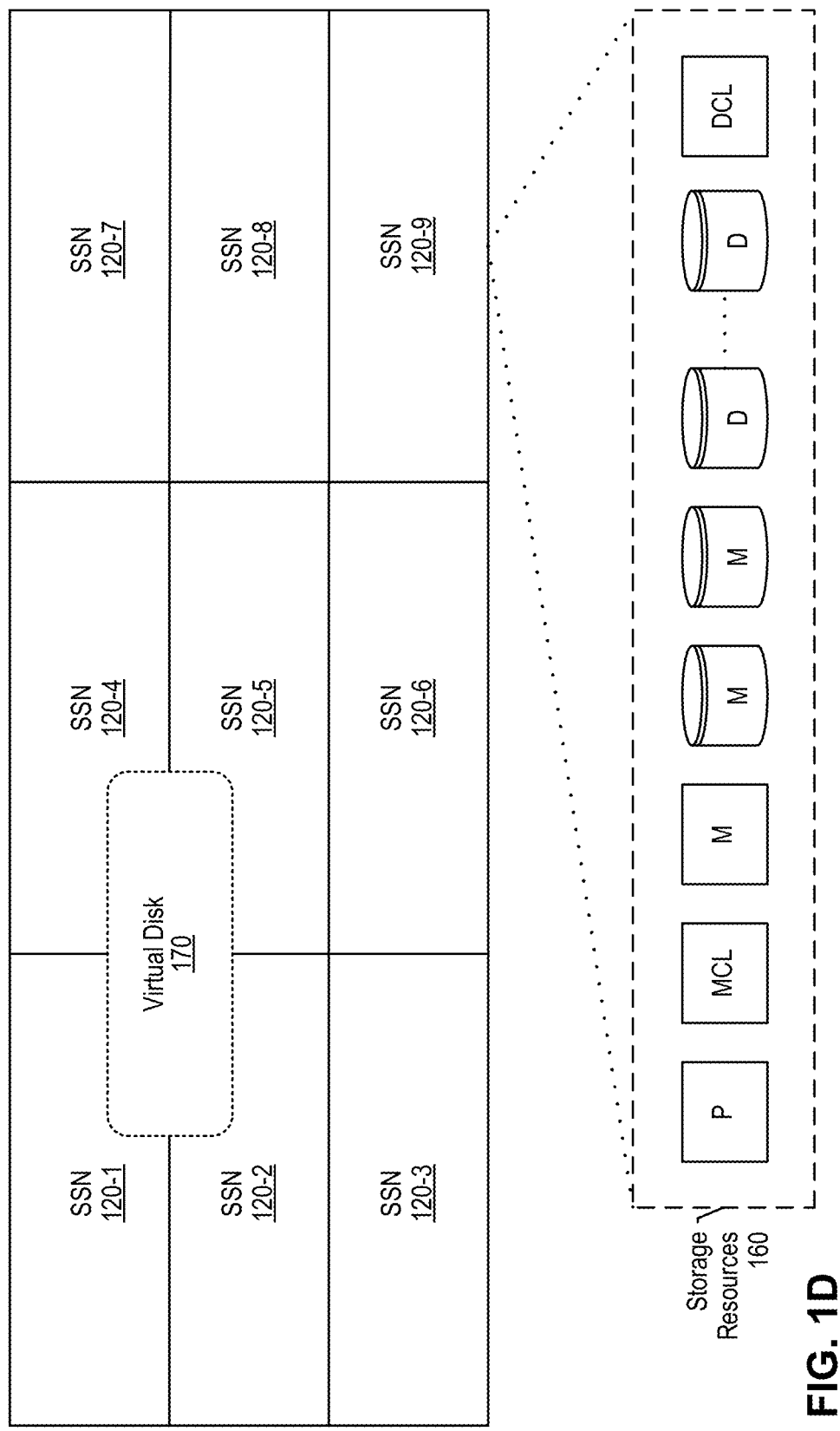
FIG. 1D is a block diagram depicting a virtual disk distributed across a plurality of storage service nodes and also depicting a plurality of storage resources available at each storage service node according to an illustrative embodiment.

FIG. 1D is a block diagram depicting a virtual disk distributed across a plurality of storage service nodes and also depicting a plurality of storage resources available at each storage service node according to an illustrative embodiment. The present figure depicts: nine storage service nodes 120 (120-1 . . . 120-09); a virtual disk 170 that comprises data distributed over four of the storage service nodes—120-1, 120-2, 120-4, and 120-5; and storage resources 160 configured within storage service node 120-9.

Each storage service node 120 (or compute host 121) is typically configured with computing resources (e.g., hardware processors and computer memory) for providing storage services and with a number of storage resources 160, e.g., hard disk drives (HDD) shown here as storage disk shapes, solid state storage drives (SSD) (e.g., flash memory technology) shown here as square shapes, etc. The illustrative system uses commit logs, which are preferably stored on SSD before they are flushed to another disk/drive for persistent storage. Metadata commit logs are stored on dedicated metadata-commit-log drives "MCL", whereas payload-data commit logs are stored on distinct dedicated data-commit-log drives "DCL." As an example depicted in the present figure, pod system information is stored in storage resource "P" which is preferably SSD technology for faster read/write performance; the metadata commit log is stored in storage resource "MCL" which is preferably SSD technology; metadata is then flushed from the commit log to persistent storage "M" (SSD and/or HDD); the data commit log is stored in storage resource "DCL" which is preferably SSD technology; payload data is then flushed from the data commit log to persistent storage "D" (typically HDD). The storage resources 160 depicted in the present figures are shown here as non-limiting examples to ease the reader's understanding; the numbers and types of storage technologies among storage resources 160 will vary according to different implementations.

To accelerate read operations, client-side caching of data is used on SSDs accessible by the storage proxy 106. Data is also cached on SSDs at storage service nodes. For caching, the system supports the use of Peripheral Component Interconnect Express (PCIe) and Non-Volatile Memory Express (NVMe) SSDs. All writes are executed in memory and flash (SSD/NVMe) and flushed sequentially to persistent storage. Persistent storage uses flash technology (e.g., multi-level cell (MLC) and/or 3D NAND SSD) and/or spinning disk technology (e.g., HDD)). Options are administrable at the virtual disk level.

Virtual disk ("vdisk") 170 is the data storage representation of system 100 that is visible to and accessible by applications 132 as data storage resources. In other words, each application 132 will use one or more virtual disks 170 for data storage without having knowledge of how system 100 as a whole is organized and configured. Every virtual disk 170 provisioned on the system is partitioned into fixed size chunks, each of which is called a storage container. Different replicas are assigned for each storage container. Since replica assignment occurs at the storage container level—not at a virtual disk level—the data for a virtual disk is distributed across a plurality of storage service nodes, thus allowing increased parallelism during I/Os and/or disk rebuilds. Thus, the virtual disks are distributed and fault-tolerant. Notably, the replication factor alone (e.g., RF3) does not limit how many storage service nodes 120 may comprise payload data of a given virtual disk 170. Thus, different containers of the virtual disk may be stored and replicated on different storage service nodes, adding up to more total storage service nodes associated with the virtual disk than the replication factor of the virtual disk.

Any number of virtual disks 170 may be spun up, each one thinly provisioned and instantly available. Illustrative user-configurable attributes for virtual disk 170 include without limitation: Name—a unique name to identify the virtual disk. Size—to set the desired virtual disk size. System 100 supports single block and NFS virtual disks of unlimited size. Disk Type—to specify the type of storage protocol to use for the virtual disk: block or file (NFS). Object containers/buckets are provisioned directly from OpenStack via Swift, via the Amazon S3 API, etc. Workload Type—for NFS disk type, options include default, proprietary, or object storage target (OST) workload types. For proprietary and OST, if Enable Deduplication is selected, a Retention Policy can be added as well. For block disk type, the only option is default. Retention Policy—specifies a duration for proprietary and OST workloads, e.g., two weeks, one month, etc. Encryption—to encrypt both data at rest and data in flight for the virtual disk. Enable Deduplication—to enable inline global deduplication. Clustered File System—to indicate that the virtual disk will be used with a clustered file system. When selected, system 100 enables concurrent read/write operations from multiple VMs or hosts. Description—to provide an optional brief description of the virtual disk. Compressed—to enable virtual disk compression to reduce data size. Client-Side Caching—to cache data to local SSD or PCIe devices at the application tier to accelerate read performance. CSV—to enable Cluster Shared Volumes for failover (or high availability) clustering.

A CSV is a shared disk containing a Windows NT File System (NTFS) or Resilient File System (ReFS) volume that is made accessible for read and write operations by all nodes within a Windows Server failover cluster. Replication Policy—to set the policy for how data will replicate across the storage cluster: Agnostic, Rack Aware, or Data Center Aware. Replication Factor (RF)—to designate the number of replicas for each virtual disk. Replication factor is tunable, typically ranging from one to six, without limitation. Block Size—to set a block virtual disk size to 512 bytes, 4 k or 64 k. File (NFS)-based virtual disks have a standard 512 size, and object-based virtual disks have a standard 64K size. Residence—to select the type of media on which the data is to reside: HDD, SSD. The present figure depicts only one virtual disk 170 for illustrative purposes, but system 100 has no limits on how many virtual disks it may support.

Figure 1E:
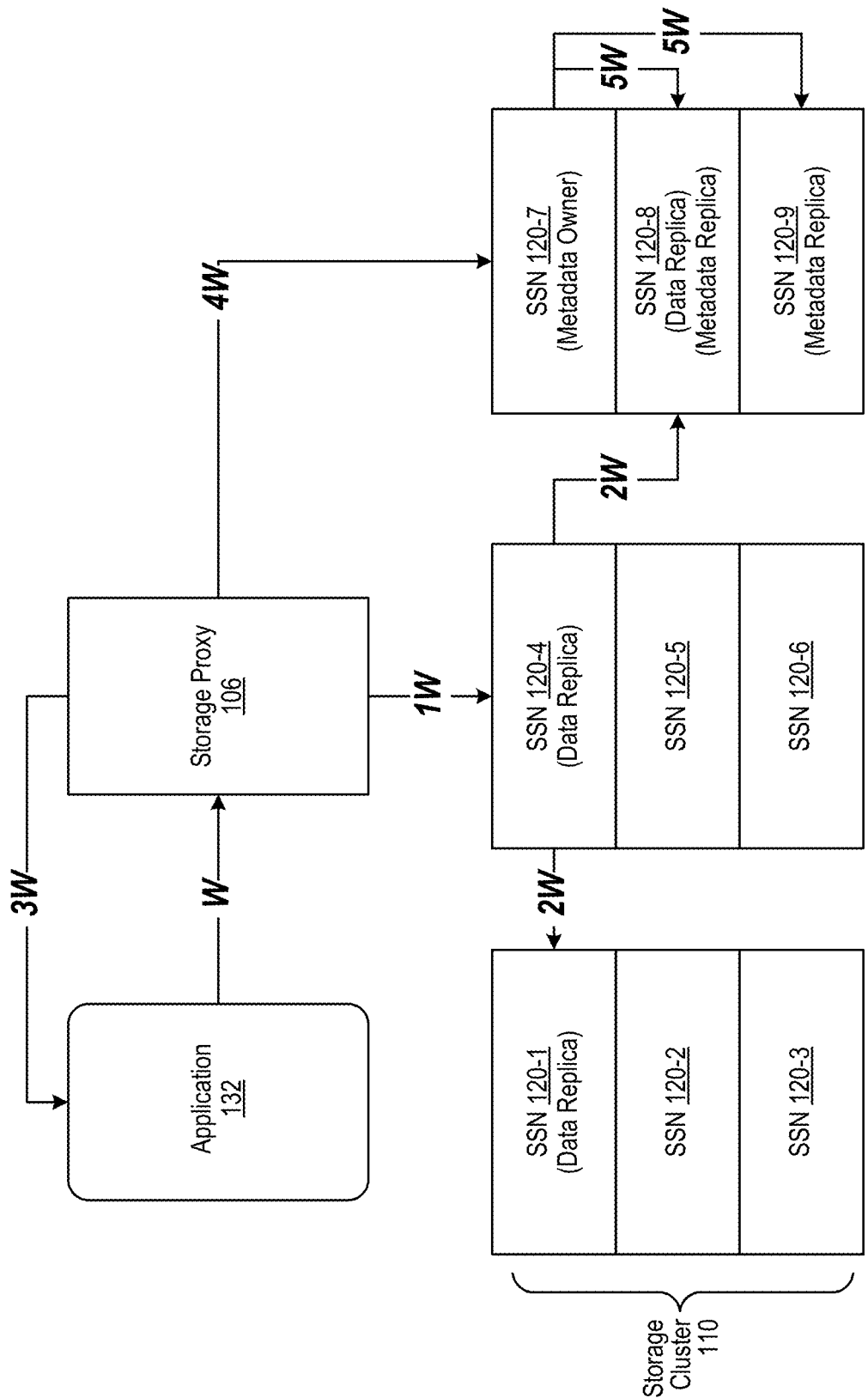
FIG. 1E is a block diagram depicting a typical I/O workflow for write operations originating with an application.

FIG. 1E is a block diagram depicting a typical I/O workflow for write operations originating with an application. This figure depicts an application 132 writing to storage cluster 110, illustratively writing to a virtual disk 170 configured with Replication Factor=3 (RF3).

At step W, storage proxy 106 intercepts a write command issued by application 132, comprising one or more payload data blocks to be written to a virtual disk 170 in storage cluster 110. At step 1W, storage proxy 106 determines the replica nodes 120 for the data blocks to be written and transmits the data blocks to one of the replica nodes 120, e.g., 120-4. If the virtual disk is enabled for deduplication, the storage proxy 106 calculates a data block fingerprint, queries the dedupe cache and, if necessary, further queries metadata subsystem 140 (at the virtual disk's metadata owner node, e.g., 120-7), and either makes a metadata update or proceeds with a new write. At step 2W, the data storage subsystem 150 on replica node 120-4 receives and writes the data blocks locally and forwards them to other designated replica nodes, e.g., 120-1 and 120-8. At step 3W, storage proxy 106 sends a write acknowledgment back to the originating application 132 after a quorum of data storage subsystem 150 replicas have completed step 2W. For RF3, two acknowledged successful writes are needed from the three (RF3) replicas to satisfy the quorum (RF/2+1=3/2+1=2). Two of the three replicas are written synchronously, and one may be written asynchronously. At step 4W, storage proxy 106 causes an atomic write to be made into metadata subsystem 140 at metadata owner node 120-7, after which the write is deemed successful. At step 5W, the metadata subsystem 140 replicates the metadata from node 120-7 to designated metadata replica nodes, e.g., 120-8 and 120-9.

Figure 1F:
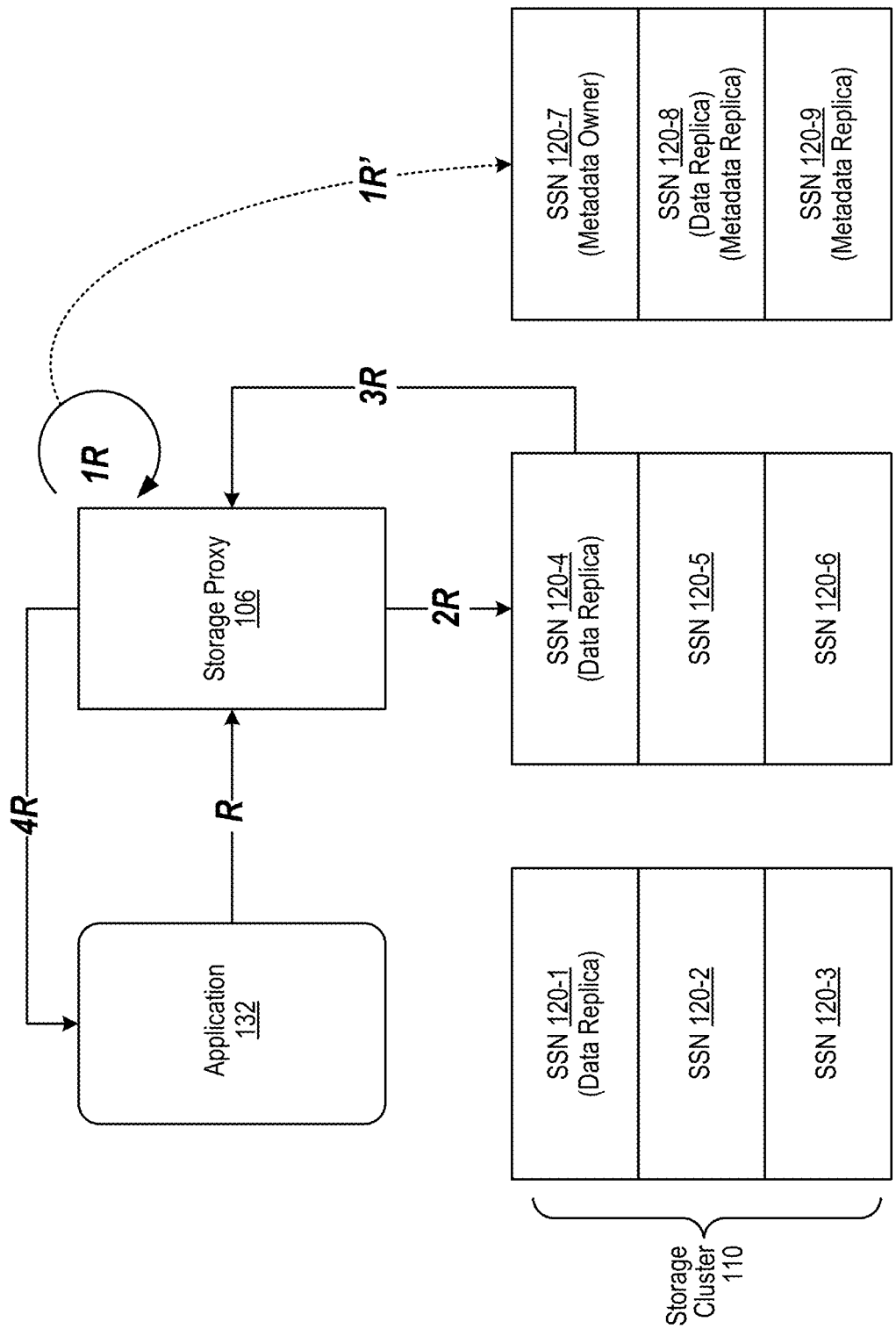
FIG. 1F is a block diagram depicting a typical I/O workflow for read operations originating with an application.

FIG. 1F is a block diagram depicting a typical I/O workflow for read operations originating with an application. This figure depicts an application 132 reading from storage cluster 110, illustratively reading from a virtual disk 170 configured with RF3.

At step R, storage proxy 106 intercepts a read request issued by application 132 for one or more data blocks from a virtual disk 170 in storage cluster 110. At step 1R, storage proxy 106 queries the local metacache for a particular data block to be read and if the information is not found in the local metacache, at step 1R' storage proxy 106 consults metadata subsystem 140 (e.g., at the vdisk's designated metadata owner node 120-7). At step 2R, storage proxy 106 sends the data block details to one of the closest data storage subsystems 150, based on observed latency, e.g., storage service node 120-4. At step 3R, the data storage subsystem 150 reads the data block(s) and transmits the block(s) back, if found, to storage proxy 106. If the read operation fails due to any error, the read is attempted from another replica. At step 4R, storage proxy 106 serves the requested data block(s) to application 132. If client-side caching is enabled for the targeted virtual disk 170 during provisioning, the storage proxy 106 queries the local block cache at step 1R to fetch the data block(s), and if found therein serves the data block(s) to application 132 at step 4R, thereby bypassing the data storage subsystem 150 at the storage service nodes(s) and eliminating the need to traverse the network to reach storage cluster 110.

System Resiliency. System 100 is designed to survive disk, node, rack, and data center outages without application downtime and with minimal performance impact. These resiliency features include: high availability, non-disruptive upgrades (NDU), disk failures, replication, and snapshots and clones.

High availability. A preferable minimum of three storage service node should be provisioned for an implementation of the illustrative system. Redundancy can be set as agnostic, at the rack level, or at data center level. The system initiates transparent failover in case of failure. During node, rack, or site failures, reads and writes continue as usual from/to remaining operational replicas. To protect against a single point of failure, storage proxies 106 install as a high availability active/passive pair ("HA pair," not shown). A virtual IP address (VIP) assigned to the HA pair redirects traffic automatically to the active storage proxy 106 at any given time. If one storage proxy 106 instance is lost or interrupted, operations fail over seamlessly to the passive instance to maintain availability. This happens without requiring intervention by applications, administrators, or users. During provisioning, administrators can indicate that an application host 102/121 will use a clustered file system. This automatically sets internal configuration parameters to ensure seamless failover when using VM migration to a secondary physical host running its own storage proxy 106. During live VM migration, such as VMware vMotion or Microsoft Hyper-V, any necessary block and file storage "follows" guest VMs to another host.

Non-disruptive upgrades (NDUs). The illustrative system supports non-disruptive software upgrades by staging and rolling the upgrade across individual components using the highly available nature of the system to eliminate any downtime or data unavailability. Storage service nodes 120 and storage services 122 undergo upgrades first one node at a time. Meanwhile, any I/O continues to be serviced from alternate available nodes, e.g., replicas. Storage proxies 106 are upgraded next, starting with the passive storage proxy in HA pairs. After the passive storage proxy upgrade is complete, it is made active, and the formerly active storage proxy 106 is upgraded and resumes service as the passive of the HA pair. This process eliminates any interruption to reads or writes during the upgrade procedure.

Disk Failures. The illustrative system supports efficient data and metadata rebuilds that are initiated automatically when there is a disk failure. Payload data is rebuilt from other data replicas and using information in the metadata subsystem. The metadata rebuild self-heals within the metadata service.

Replication. The illustrative system uses a combination of synchronous and asynchronous replication processes to distribute and protect data across the storage cluster and provide near-zero recovery point objectives (RPO) and recovery time objectives (RTO). For example, two of three replicas are written synchronously, and one is written asynchronously. The system supports any number of active data centers in a single storage cluster 110, using a tunable replication factor and replication policy options. The replication factor designates the number of replicas to create for each virtual disk, and the replication policy defines the destination for the replicas across the storage cluster. Replicas occur at the storage container level of a virtual disk 170. For example, if a 100 GB virtual disk with RF3 is created, the entire 100 GBs are not stored as contiguous chunks on three storage service nodes. Instead, the 100 GBs are divided among several storage containers, and replicas of each storage container are spread across different storage pools on different storage service nodes within the storage cluster. For additional disaster recovery protection against rack and data center failures, the illustrative system supports replication policies that span multiple racks or data centers using structured IP addressing, DNS naming/suffix, and/or customer-defined snitch endpoints. For "agnostic" replication policies, data is spread across the storage cluster using a best-effort to improve availability. For "rack aware" replication policies, data is spread across as many physically distinct racks as possible within in a single data center. For "data center aware" replication policies, data replicates to additional physical sites, which can include private and/or hosted data centers and public clouds. In a disaster recovery example, where the Replication Policy=Data Center Aware and the Replication Factor=3, the illustrative system divides the data into storage containers and ensures that three copies (RF3) of each storage container are spread to geographically dispersed physical sites, e.g., Data Centers A, B, and C. At any time, if a data copy fails, re-replication is automatically initiated from replicas across the data centers.

Snapshots And Clones. In addition to replication policies, data management tasks include taking snapshots and making "zero-copy" clones of virtual disks. There is no limit to the number of snapshots or clones that can be created. Snapshots and clones are space-efficient, requiring capacity only for changed blocks.

Encryption. The illustrative system provides software-based encryption with the Encrypt360 feature. This enables encryption of data at the point of ingestion (at the storage proxy 106). Data encrypted in this way remains protected in flight between storage proxy 106 and storage service nodes 120/storage service 122, in flight among storage service nodes as part of replication, in-use at storage proxy 106, and at rest while in storage. Any encryption scheme may be implemented, preferably 256-bit AES. Additionally, any third-party key management system can be attached.

Ecosystem Integration. The illustrative system works with and provides a secure data storage system for a variety of data-generating platforms, including systems that generate primary (production) data and systems that generate backup data from primary sources. VMware. The illustrative system features a vCenter plug-in that enables provisioning, management, snapshotting, and cloning of virtual disks 170 directly from the vSphere Web Client. Additionally, the system incorporates support for the VMware vSphere Storage APIs Array Integration (VAAI). Docker. The illustrative system provides persistent storage for Docker software containers through a volume plugin. The volume plugin enables a user to create a persistent Docker volume backed by a virtual disk 170. Different options, such as deduplication, compression, replication factor, and/or block size, may be set for each Docker volume, using "volume options" in the Docker Universal Control Plane (UCP) or using the "docker volume" command line. The virtual disk can then be attached to any host. The volume plugin also creates a file system on this virtual disk and mounts it using the path provided by the user. The file system type can also be configured by the user. All I/O to the Docker volume goes to virtual disk 170. As the software container moves in the environment, virtual disk 170 will automatically be made available to any host, and data will be persisted using the policies chosen during volume creation. For container orchestration platforms (a/k/a application orchestrator environments), such as Kubernetes and OpenShift, the illustrative system 100 provides persistent storage for software containers through a proprietary dynamic provisioner and via other technologies that interoperate with the orchestration platform(s). OpenStack. The illustrative system delivers block, file, and object storage for OpenStack all from a single platform via native Cinder and Swift integration. The system supports granular administration, per-volume (Cinder) or per-container (Swift), for capabilities such as compression, deduplication, snapshots, and/or clones. OpenStack administrators can provision the full set of storage capabilities of system 100 in OpenStack Horizon via OpenStack's QoS functionality. As with VMware, administrators need not use system 100's native web user interfaces and/or RESTful API, and storage can be managed from within the OpenStack interface.

Multitenancy. The illustrative system supports the use of rack-aware and data center-aware replication policies for customers who must satisfy regulatory compliance and restrict certain data by region or site. These capabilities provide the backbone of a multitenant architecture, which is supported with three forms of architectural isolation: LUN masking, dedicated storage proxies, and complete physical isolation. Using the LUN masking option, different tenants are hosted on a shared infrastructure with logical separation. Logical separation is achieved by presenting virtual disks only to a certain VM and/or physical application host (IP range). Quality of Service (QoS) is delivered at the VM level. Using the dedicated storage proxies option, storage access is provided with a dedicated storage proxy 106 per tenant. Storage proxies can be deployed on a dedicated physical host or a shared host. This provides storage as a shared infrastructure, while compute is dedicated to each tenant. Quality of Service (QoS) is at the VM level. Using the complete physical isolation option, different tenants are hosted on dedicated storage clusters (each running their own storage service and storage proxies) to provide complete logical and physical separation between tenants. For all of these multitenant architectures, each tenant can have unique virtual disks with tenant-specific storage policies, because the illustrative system configures policies at the virtual disk level. Policies can be grouped to create classes of service.

Thus, the illustrative distributed data storage system scales seamlessly and linearly from a few nodes to thousands of nodes using virtual disks as the user-visible storage resource provided by the system. Enterprise storage capabilities are configurable at the virtual disk level. The storage service nodes can be configured in a plurality of physical computing environments, e.g., data centers, private clouds, and/or public clouds without limitation. The embodiments and components thereof disclosed in FIGS. 1A-1F, may be implemented in any combination and permutation to satisfy data storage management and information management needs at one or more locations and/or data centers.

FIG. 2A depicts provisioning, scheduling, and migration activation at the distributed data storage system using a proprietary container storage interface (CSI), according to an illustrative embodiment. The figure depicts: Application orchestrator node 102-4 comprising storage proxy 106 and application 132 and proprietary CSI driver 201; and storage cluster 110 comprising a plurality of storage service nodes 120, including a virtual disk 170. Illustratively, provisioning of persistent volumes as virtual disks, scheduling of snapshots, and enabling changed data migration is performed via the proprietary CSI driver 201, whereas data I/O and accompanying metadata I/O is performed via storage proxy 106.

Payload data is stored in virtual disks 170 configured in the storage cluster, which are consumed as application orchestrator (e.g., Kubernetes) persistent volumes. Each virtual disk 170 is partitioned and replicated across a number of storage service nodes 120—the partitioning taking the form of storage containers. Usually, a certain metadata node is the assigned "owner" of the virtual disk and is therefore responsible for certain aspects of the disclosed container data mover feature.

Container Storage Interface (CSI).

CSI is a community-driven project for standardizing persistent volume workflows across different application orchestrators such as Kubernetes. In general, a CSI driver comprises:

Node Server—is a gRPC (remote procedure call) server that enables access to persistent volumes. For a Kubernetes cluster with three worker nodes, the node server should be running on each of these three worker nodes, since stateful applications can be scheduled on any of these nodes. It is noted here that the term "Kubernetes cluster" has a different meaning than the illustrative storage cluster(s) 110 depicted herein. See, e.g., FIG. 1B.

Controller Server—is a gRPC server that manages the lifecycle (e.g., creation, deletion, etc.) of persistent volumes. It is not necessary to run this on all worker nodes.

Proprietary CSI driver 201 is particularly designed by the present inventors for operating within the illustrative distributed data storage system. Furthermore, the proprietary CSI driver 201 also enables data migration between distinct storage clusters as shown in FIG. 3. The proprietary CSI driver supports v1.0.0 of the CSI specification.

Kubernetes Example Using Hedvig Embodiment of the Distributed Data Storage System In an example Kubernetes configuration, a Controller Server is installed as a deployment and is responsible for provisioning CSI volumes. It is also responsible for other operations, such as attaching and snapshotting volumes, which need not be executed on the node where the volume is consumed. The Node Server is installed as a Daemonset and is responsible for mounting and unmounting CSI volumes on Kubernetes nodes where the volumes will be consumed by applications. Storage proxy 106 is deployed as a Daemonset and is responsible for handling I/O requests for all CSI volumes attached locally. The following sequence of events occurs when a Kubernetes user issues a request to provision Hedvig storage using the proprietary CSI driver 201. These events explain how the illustrative distributed data storage system components interact with Kubernetes and utilize the Kubernetes constructs to let end users seamlessly manage storage resources within a Kubernetes cluster:

1. The administrator creates one or more storage classes (StorageClass) for Hedvig. See FIG. 2D. 2. The user creates a PersistentVolumeClaim by specifying the StorageClass to use and the size of the PersistentVolume requested. See FIG. 2D. 3. The Controller Server provisions a virtual disk 170 on the underlying distributed data storage system (e.g., Hedvig Storage cluster) with the size requested and the attributes specified in the StorageClass. The virtual disk 170 may be configured with compression and deduplication enabled, as specified in the storage class. 4. In response to the newly provisioned virtual disk 170, a new PersistentVolume is created in Kubernetes. Kubernetes then binds the PersistentVolumeClaim to the PersistentVolume created. 5. The Controller Server presents the virtual disk 170 as a logical unit number (LUN) to the Storage Proxy 106 on the Kubernetes node 102-4 where the application 132 is scheduled. 6. The Node Server (running on the node 102-4 where the application is scheduled) mounts the persistent volume, which is then consumed by the application 132. In order to consume the persistent volume, create an application pod using the aforementioned persistent volume claim.

FIGS. 2B-2H depict some example specifications, commands, and/or configuration choices for configuring data migration between storage clusters according to some illustrative embodiments. The example specifications, commands, scripts, and/or nomenclature herein are provided for a Kubernetes framework to help the reader's understanding of the present disclosure, but the invention is not limited to embodiments in a Kubernetes framework. Likewise, the examples herein include references to the Hedvig Distributed Data Storage Platform from Commvault Systems, Inc., but the invention is not limited to Hedvig embodiments.

Policy Driven Container Data Mover.

Data migration can be seamlessly enabled through policies assigned to application orchestrators such as Kubernetes constructs. Snapshot schedules provided through the proprietary CSI driver have been enhanced to allow users to configure data migration based on a snapshot retention period. FIG. 2B depicts a list of steps for configuring data migration for CSI volumes, verifying a CRD for a migration location, and creating a migration location.

A list of steps for configuring data migration includes without limitation:

(1) Create a migration location. Migration location is implemented as a CustomResourceDefinition (CRD) and is managed by the proprietary CSI driver 201. A migration location can be created on the source application orchestration cluster by specifying the name of the destination storage cluster and the seeds. An example is shown in the bottom block of the present figure. The migration location is implemented as a CustomResourceDefinition (CRD) and is cluster scoped. After the CSI driver 201 has been deployed, verify the existence of the CRD by running the following command: #kubectl get crd migrationlocations.hedvig.io (2) Create a snapshot schedule and snapshot class. This example, shown in FIG. 2C, creates an interval schedule that creates a new snapshot every hour and retains it for two hours. The snapshot scheduler expects a snapshot class with name "snc-hedvig-block" to be present for creating snapshots of persistent volume claims. A default snapshot class is created in the example in the middle block of FIG. 2C. Snapshot schedules are implemented as a CRD and are created by the CSI controller server. After the CSI driver 201 has been deployed, verify the existence of the CRD by running the following command: #kubectl get crd schedulepolicies.hedvig.io as depicted in the bottom block of FIG. 2C. Scheduled Snapshots. With scheduled snapshots, users can create snapshot schedules for their persistent volumes and the built-in snapshot scheduler of the proprietary CSI driver does the job of taking consistent snapshots as specified. These form a basis for data migration. Kubernetes (and the CSI Spec) does not provide a native type for creating snapshot schedules. Therefore, according to one or more illustrative embodiments, schedules are implemented as a CRD (CustomResourceDefinition) and are created by the proprietary CSI driver. After the CSI driver has been deployed, a user can create snapshot schedules by specifying the periodicity and the retention period depicted in FIG. 2C. The example of FIG. 2C configures an interval schedule that creates a new snapshot every hour and deletes the snapshot after two hours. Snapshot schedules can be easily customized to meet application needs.

(3) Create a storage class with migration location and snapshot schedule. An example appears in FIG. 2D. After the migration location(s) and snapshot schedule have been created, create a new storage class by setting the following parameters: migrationEnable—Set to "true"; migrationLocations—Comma-separated list of one or more migration location names; and schedulePolicy—Snapshot schedule name.

(4) Create a persistent volume claim using the storage class. An example appears in FIG. 2D. Any persistent volume provisioned using this storage class will have migration enabled. Based on the snapshot schedule (FIG. 2C) associated with the storage class, a new snapshot will be created for the persistent volume every hour and upon the expiration of that snapshot (every two hours), changed data blocks will be migrated to the target cluster. Any new persistent volume provisioned using this storage class will be protected according to the snapshot schedule.

(5) Access the migrated persistent volume on the target (destination) storage cluster. See, e.g., FIGS. 2E-2H. When the migration is successful, the target (destination) storage cluster should have a virtual disk with the same name as that in the source storage cluster corresponding to the persistent volume. Some of the steps needed to mount the persistent volume on the target application orchestrator cluster include without limitation operations 5A-5E below.

(5A) Register the migrated virtual disk to the app-orchestrator cluster (e.g., Kubernetes cluster). See an example command in FIG. 2E. Then the migrated persistent volume may be accessed on the target (destination) cluster. (5B) Create a PersistentVolume corresponding to the migrated virtual disk from the source storage cluster. See an example in FIG. 2F. (5C) Create a PersistentVolumeClaim corresponding to the PersistentVolume. See an example in FIG. 2G. (5D) Snapshot the PersistentVolumeClaim. See an example in FIG. 2H, which depicts an example workflow for creating on-demand snapshots, according to an illustrative embodiment. (5E) Create a clone from the volume snapshot. See the bottom block of FIG. 2H.

FIG. 3 depicts a configuration comprising two distributed data storage systems having virtual disks that may migrate between them, according to an illustrative embodiment. This figure illustrates the multi-directional aspect of the disclosed container data mover feature. In some embodiments, data migrates from one storage cluster (e.g., 110S) to another (e.g., 110D) and vice-versa. The source comprises node 102-4, application 132S, storage proxy 106S, proprietary CSI driver 201S, storage cluster 110S, and virtual disk 170S. The destination comprises node 102-5, application 132D, storage proxy 106D, proprietary CSI driver 201D, storage cluster 110D, and virtual disk 170D. In some embodiments, there may be more than one migration destination. Through the use of snapshots and clones, the migration can continue while users at the destination are given access to the latest data received from the source cluster. See also FIG. 11.

Figure 4:
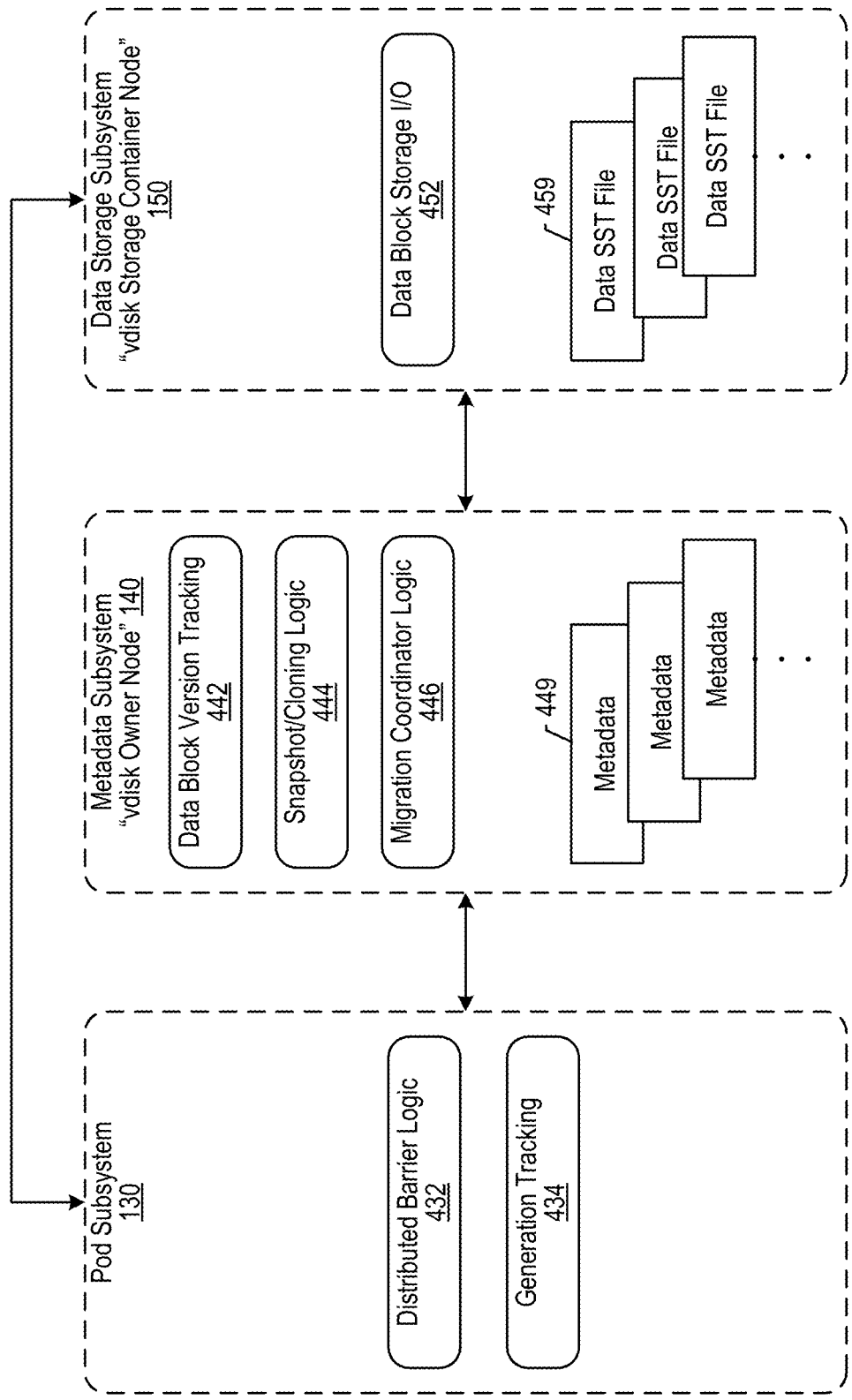
FIG. 4 is a block diagram that depicts certain details of certain components of the distributed data storage system, according to an illustrative embodiment.

FIG. 4 is a block diagram that depicts certain details of certain components of the distributed data storage system, according to an illustrative embodiment. As noted, the pod, metadata, and data storage subsystems communicate with one or more of the other subsystems within the storage cluster, but need not be running on the same physical storage service node. The pod subsystem 130 comprises an illustrative distributed barrier logic 432 and further comprises logic 434 for tracking snapshot/migration generations needed for the illustrative container data mover feature; data structures stored at and maintained by the pod subsystem 130 are not shown here. See also FIG. 12 for more details on the distributed barrier logic 432. The metadata subsystem 140 comprises illustrative logic 442 for data block version tracking, snapshot and cloning logic 444, and migration coordinator logic 446, and also stores and maintains numerous metadata structures 449. The data storage subsystem 150 comprises illustrative logic 452 for payload data storage I/O and also stores and maintains payload data 459 of the storage cluster. Illustratively, in the data storage subsystem 150, after it is flushed from commit logs (not shown here), payload data is persisted in string-sorted-tables (SST) files 459 which also carry a version or generation number to help identify timeframes (e.g., generations) when they were added to the system. This aspect of associating every data SST file 459 with a generation number (see, e.g., FIG. 5) inherently tracks changed blocks written to the storage cluster in a given generation timeframe and thus enables a granular scheme for migrating data generation by generation.

Figure 5:
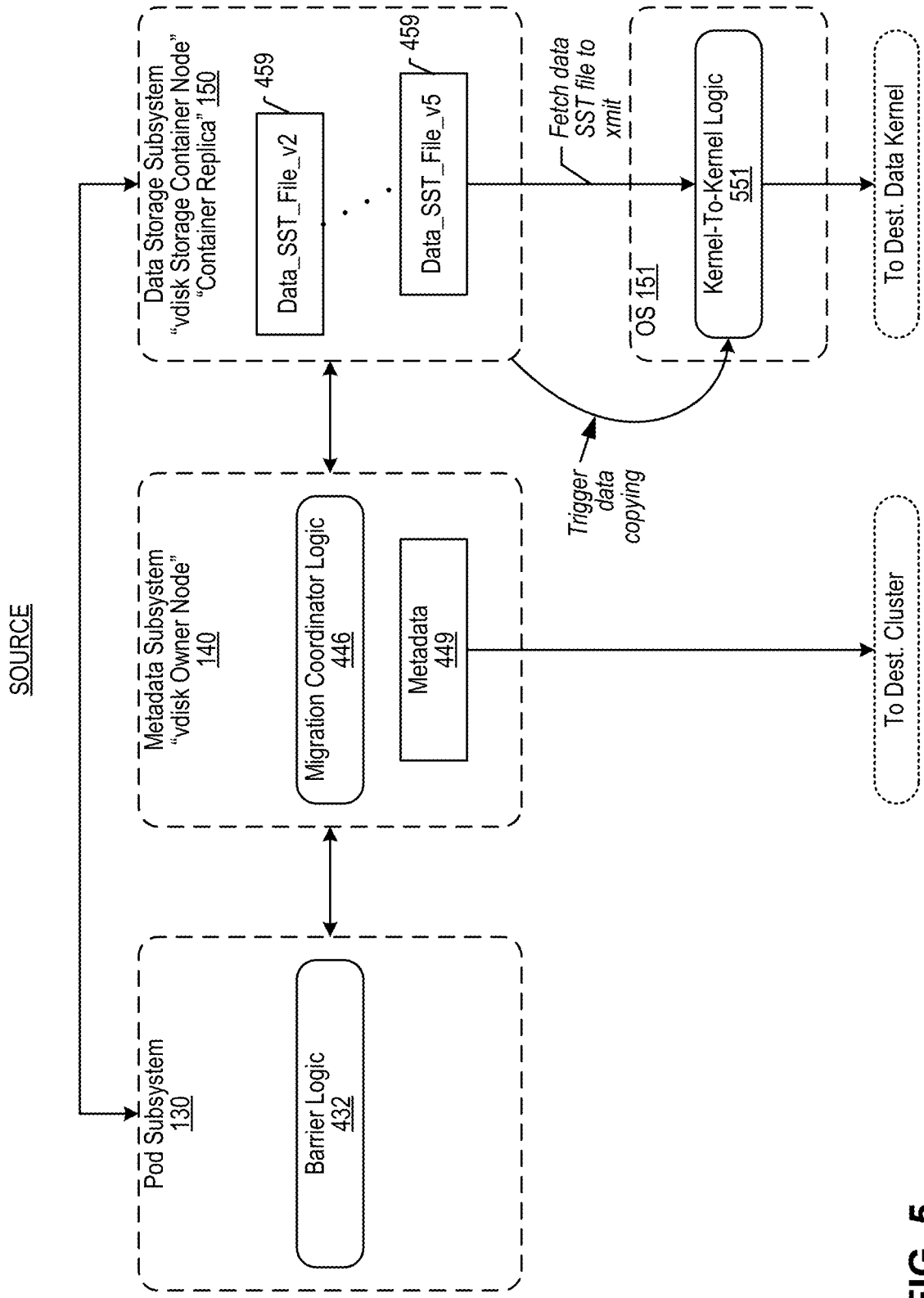
FIG. 5 is a block diagram that depicts some of the components and data structures that enable storage container migration at the source storage cluster, according to an illustrative embodiment.

FIG. 5 is a block diagram that depicts some of the components and data structures that enable storage container migration at the source storage cluster, according to an illustrative embodiment. In addition to previously depicted components, the present figure depicts kernel-to-kernel logic 551 operating within OS 151 at the source storage service node that hosts data storage subsystem 150. In general, the illustrative migration coordinator logic 446 at the metadata node 140 (the designated owner of the virtual disk being migrated) initiates migration periodically. The metadata node 140 signals to the data storage subsystem 150 hosting a storage container belonging to the virtual disk to set up a kernel-to-kernel connection with and a copy operation to a corresponding host node at the destination. When the data migration operation is triggered, only certain payload data SST files having a certain version/generation (e.g., Data_SST_File_v5) qualify for migration, i.e., those data SST files 459 that are new since an older generation. For example, after generation v4 data SST files 459 are successfully migrated, only generation v5 currently qualify for migration, thus implementing a changed block migration policy. Once they are properly identified (i.e., having the correct generation number) these payload data SST files 459 are streamed in their entireties via the kernel-to-kernel connection to the destination data storage node. See also FIGS. 6 and 7. Accordingly, changed payload data is moved en masse through kernel-to-kernel copying of payload data files from source to destination. As noted earlier, kernel-to-kernel copying provides a fast data transfer channel between storage clusters, because it does not rely on block-by-block application-level reads and writes between clusters. Payload data migration is orchestrated through snapshots and versioned change block tracking, which is native to the system. Data blocks are stored in sorted string tables (SSTs), which are files in the data storage subsystem of every storage service node. When a migration job is initiated, the exact SST files containing the changed blocks are identified (e.g., by migration coordinator logic 446) at the source and streamed to the target via kernel-to-kernel copying. The kernel-to-kernel approach circumvents the ordinary block-by-block reads and writes performed by the data storage subsystem, which runs in user space at the storage service node. With kernel-to-kernel streaming, the payload data "does not go through" the data storage subsystem in user space, and instead travels en masse in kernel space, which provides a faster transport mechanism.

In contrast to the approach taken for payload data migration, metadata is transferred to the destination using ordinary metadata write operations, not kernel-to-kernel, though the invention is not so limited. Thus, metadata subsystem 140, which runs in user space at the storage service node, analyzes metadata 449 at the source metadata node to identify the appropriate payload data SST files 459 that need to be migrated. The metadata subsystem 140 reads metadata blocks 449 and transmits them to the destination cluster after all the identified payload data SST files 459 have been successfully written at the destination. At the destination storage cluster, the metadata intake is an ordinary metadata write. Thus, even if entire metadata SST files are migrated to the destination, the migration takes the form of ordinary metadata write operations, in user space, at the appropriate storage service nodes. In contrast to the payload data transmitted in kernel-to-kernel copy operations as described above, the metadata "goes through" the metadata subsystem 140 at source and destination storage service nodes. See also FIGS. 1E, 6, and 7.

Figure 6:
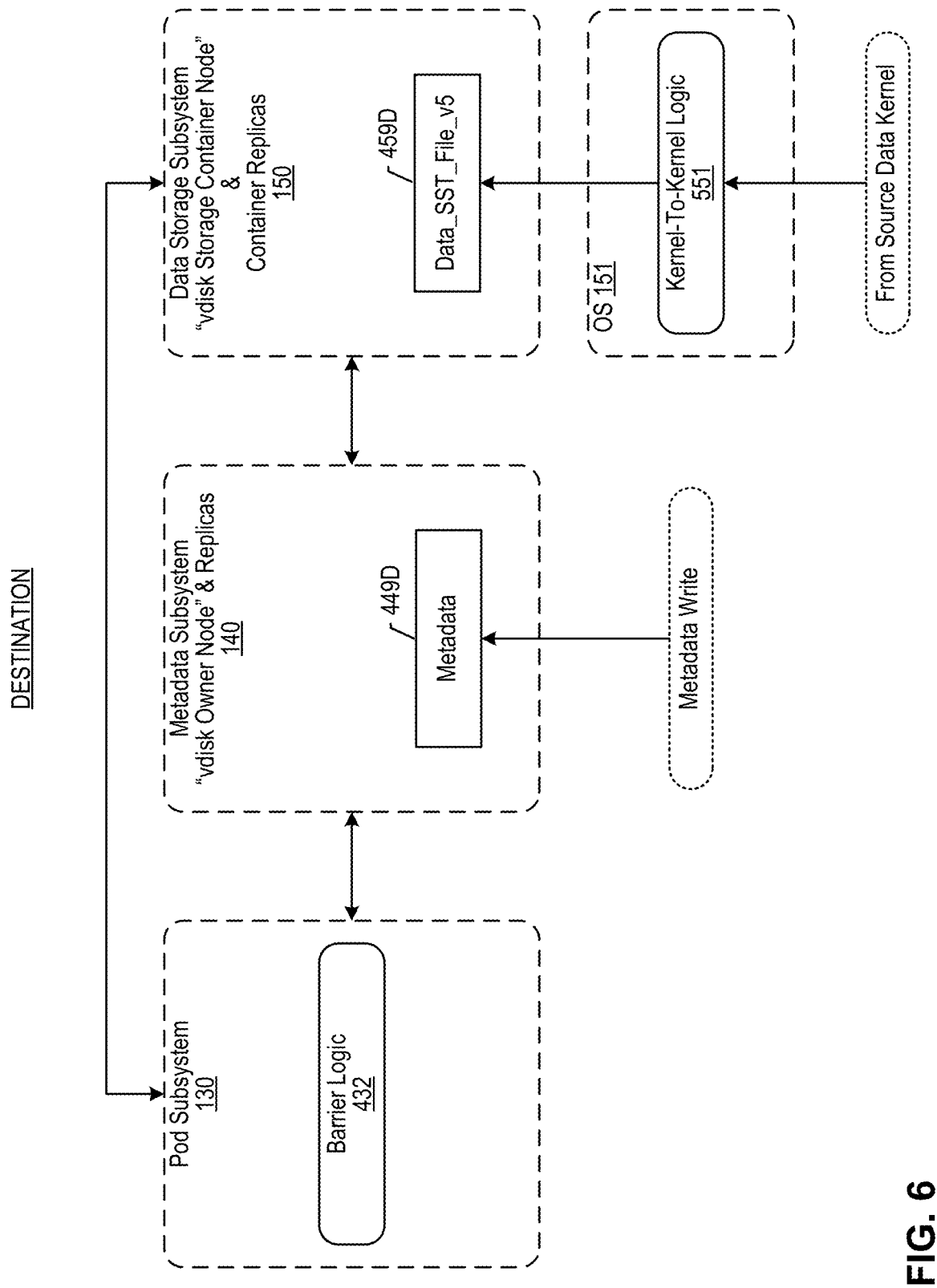
FIG. 6 is a block diagram that depicts some of the components and data structures that enable storage container migration at the destination storage cluster, according to an illustrative embodiment.

FIG. 6 is a block diagram that depicts some of the components and data structures that enable storage container migration at the destination storage cluster, according to an illustrative embodiment. As noted in the preceding figure, data SST files 459D come into the destination data storage subsystem from the source data kernel via kernel-to-kernel copy operations, received by a kernel-to-kernel logic 551 operating in the OS 151 of the data service node at the destination storage cluster that hosts the receiving data storage subsystem 150. The destination comprises the storage service node replicas that host the storage container in which the payload data SST files 459D belong. As noted in the preceding figure and in FIG. 12, the barrier logic 432 allows metadata migration only after all the data SST files have successfully migrated. Because the metadata migration uses ordinary metadata write operations, the source metadata node transmits the metadata to a storage service node at the destination storage cluster, which may or may not be the metadata node that owns the subject virtual disk. If not the owner, the receiving node identifies the proper owner metadata node and transmits the metadata thereto. The owner metadata node stores the received metadata 449D locally and then transmits the metadata 449D to the other metadata replica nodes. See also FIGS. 7 and 12.

Figure 7:
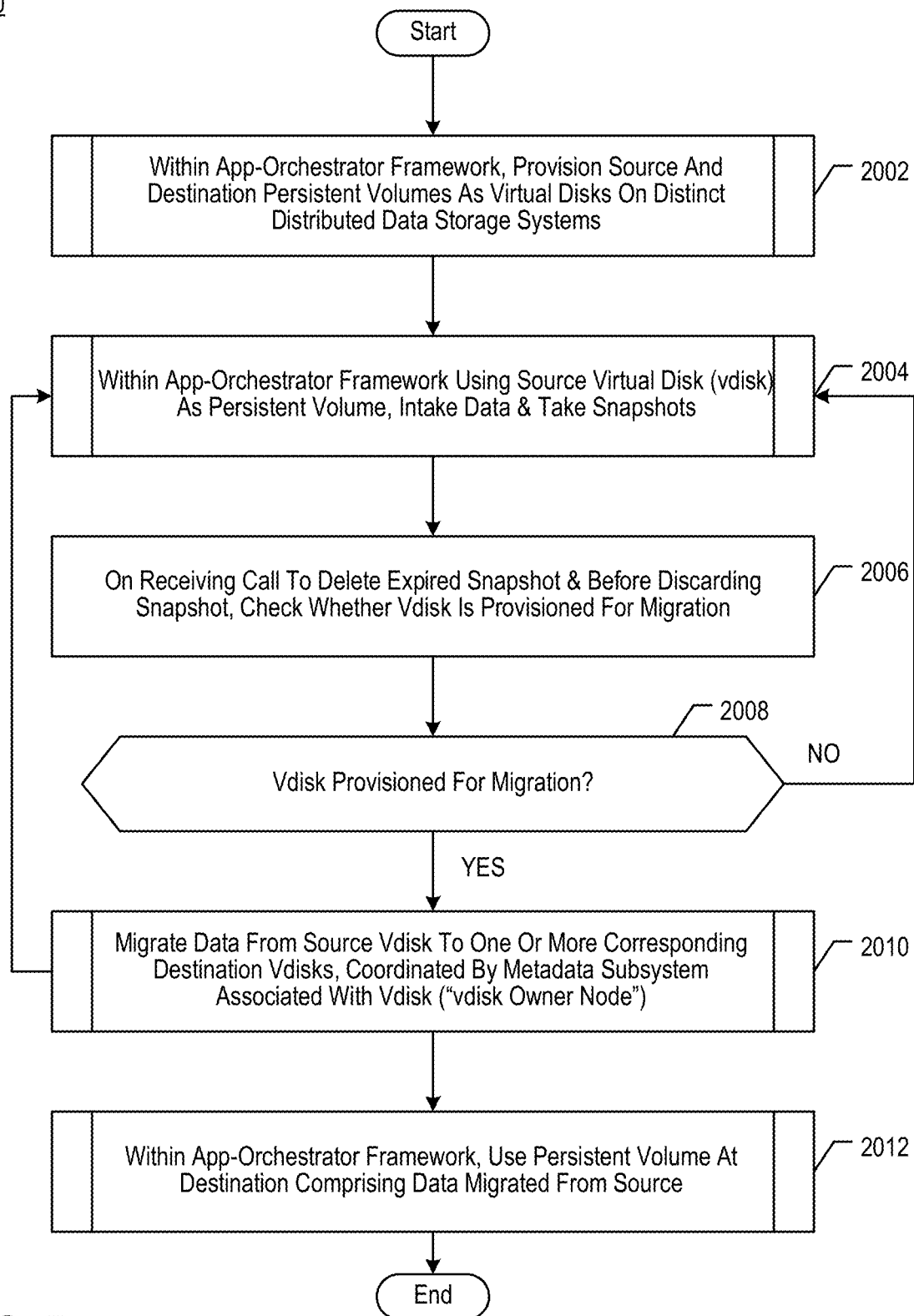
FIG. 7 depicts a flow chart of a method 2000 for migrating data between distinct storage clusters, according to an illustrative embodiment.

FIG. 7 depicts a flow chart of a method 2000 for migrating data between distinct storage clusters, according to an illustrative embodiment. At block 2002, method 2000 includes, within an application orchestration environment (e.g., within a Kubernetes framework), provisioning of source and destination persistent volumes as virtual disks on distinct distributed data storage systems (e.g., storage clusters 110S and 110D). More details are given in FIG. 8.

At block 2004, within the application orchestration environment (e.g., Kubernetes framework), using the source virtual disk (e.g., 170S) as a persistent volume, data is received and stored therein, e.g., from an application 132S. Snapshots of metadata associated with the virtual disk are taken at the source storage cluster 110S, typically on a schedule and having a pre-defined retention period. More details are given in FIG. 9.

At block 2006, on receiving a call to delete an expired snapshot at the source, the metadata owner 140 of the virtual disk 170S determines whether the virtual disk 170S is provisioned with migration enabled. The illustrative method allows for conditional migration decision-making (block 2008) since it may be undesirable to migrate every virtual disk 170 of the storage cluster 110S. If the virtual disk 170S is not migration-enabled, the snapshot is deleted and control passes back to data intake at the virtual disk at block 2004. However, if the virtual disk 170S is migration-enabled, control passes to a migration operation at block 2010. The metadata node 140 at the source that is the designated owner of the virtual disk acts as coordinator of this migration operation. For other virtual disks 170, their migration is coordinated by their respective owner metadata nodes. Notably, the migration involves the illustrative barrier logic 432, which executes in the pod subsystem 130. More details are given in FIGS. 10 and 12.

At block 2012, after the migration has successfully completed, a persistent volume at the destination comprises the migrated payload data and accompanying metadata and is available for use within the destination's application orchestrator environment (e.g., destination Kubernetes framework). More details are given in FIG. 11.

Figure 8:
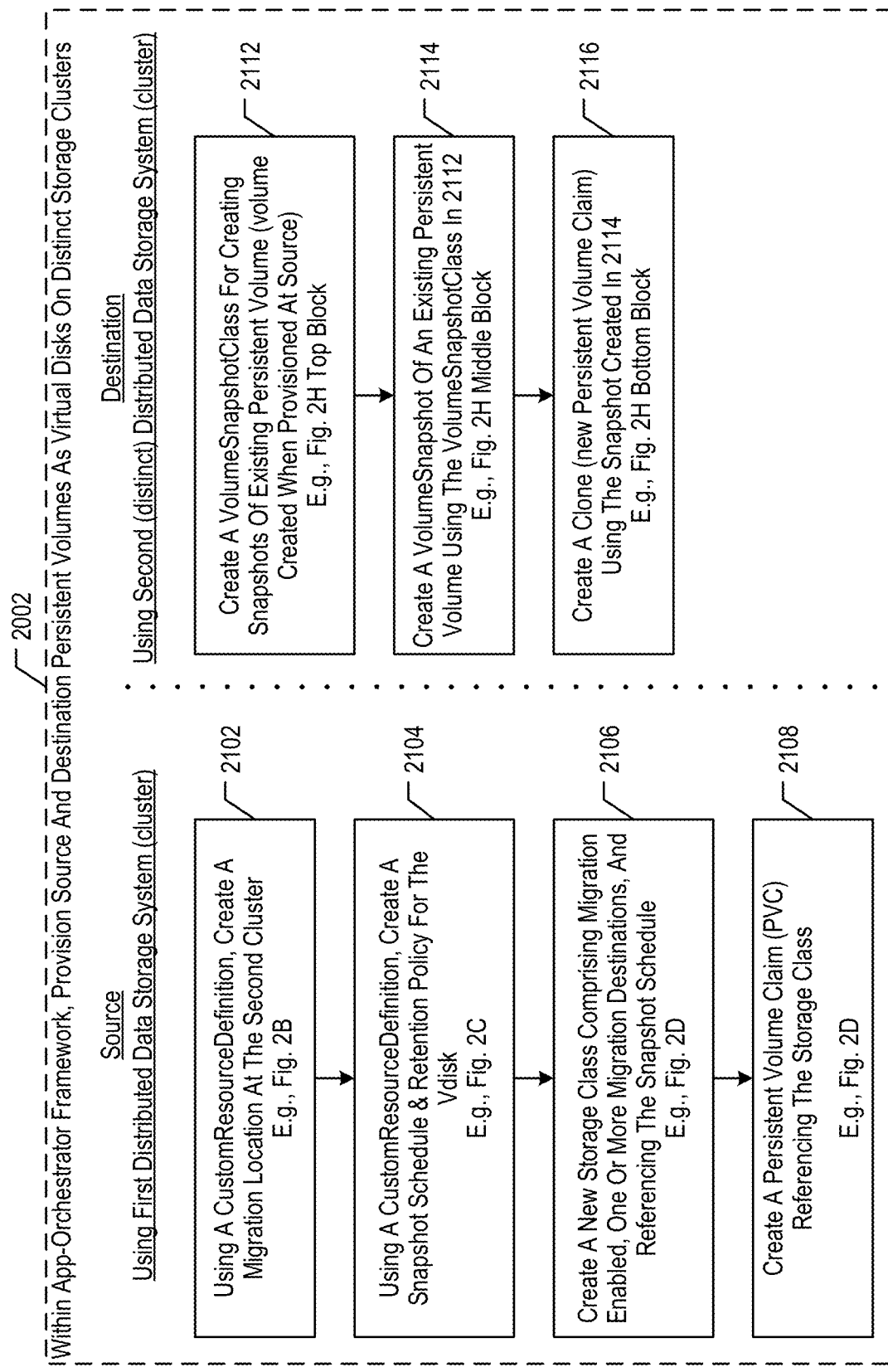
FIG. 8 depicts certain operations of block 2002 of method 2000.

FIG. 8 depicts certain operations of block 2002 of method 2000. At the source, in blocks 2102-2108, one or more migration locations are defined, a snapshot schedule is defined, a retention policy is defined, a new migration-enabled storage class is created referencing the one or more migration locations and the snapshot schedule, and finally a persistent volume claim is created referencing the storage class. Accordingly, source set-up is complete within the application orchestrator environment (e.g., source Kubernetes framework). See also FIGS. 2B, 2C, and 2D for illustrative examples.

At the destination, in blocks 2112-2116, a volume snapshot class is created for the destination volume. After a migration cycle has delivered payload data to the destination volume, snapshots are taken of the destination volume based on the volume snapshot class, and afterwards these snapshots are cloned. The clone/PersistedVolumeClaim created here is presented to the application in the destination storage cluster to access/retrieve the payload data migrated over from the source storage cluster. See also FIG. 2H.

Figure 9:
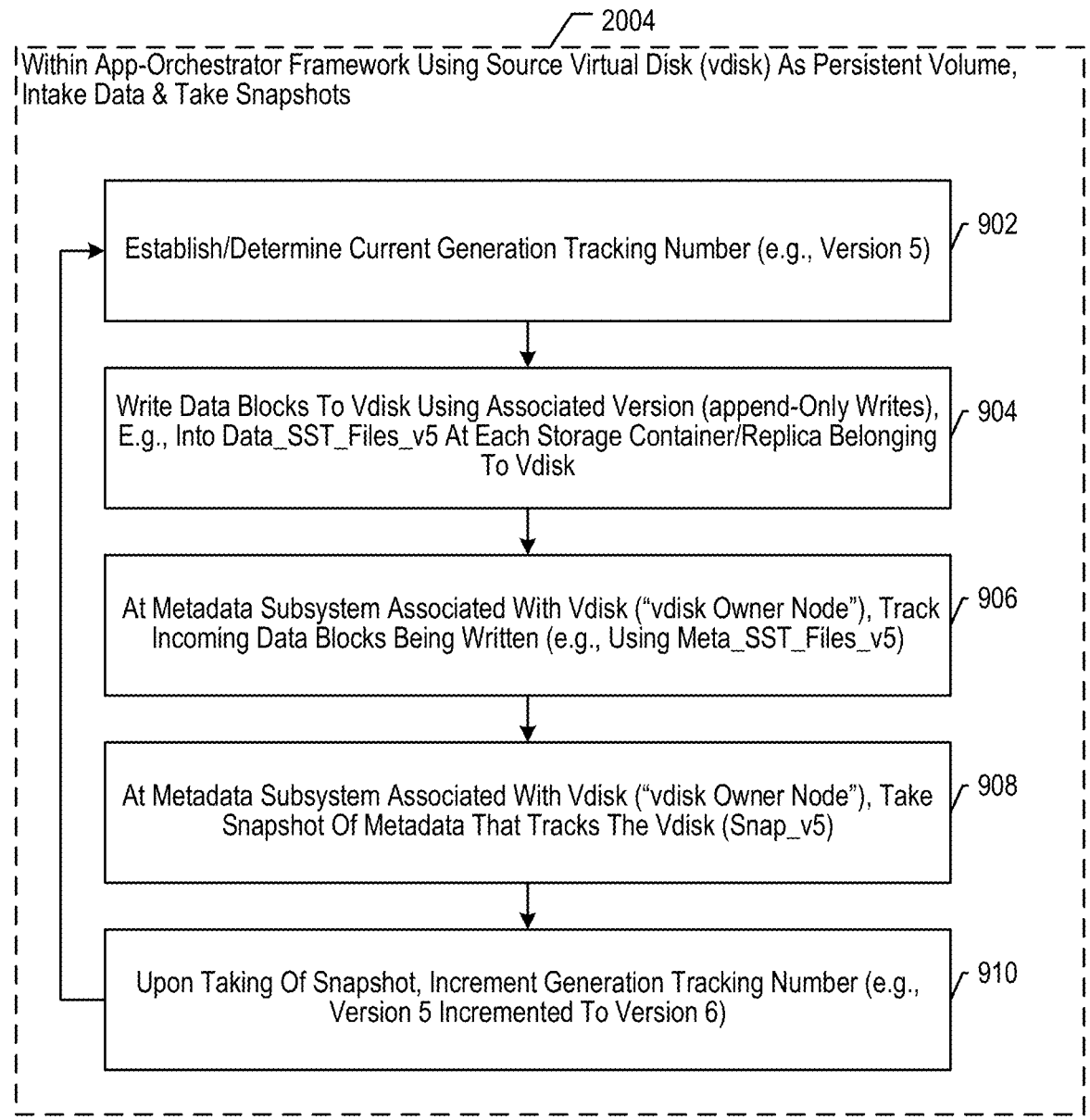
FIG. 9 depicts certain operations of block 2004 of method 2000.

FIG. 9 depicts certain operations of block 2004 of method 2000. Generation tracking (e.g., using generation tracking logic 434) is illustratively done at the pod subsystem 130 and is based on snapshots being taken. On taking a snapshot, the generation (or version) counter is incremented (block 910, block 902). This means that all data blocks stored to the distributed data storage system after the snapshot belong to the new incremented generation number, which is affixed to or otherwise associated with the payload data SST files 459. This scheme enables the storage system to know which data blocks have been written to the storage system from generation to generation. The distributed data storage system has an append-only scheme, and therefore no previously-stored data blocks change in a later generation. Rather, a "changed" block is written as a new data block in another SST file 459 with another generation number (block 904) and the metadata node associated with the virtual disk that took in the data block tracks incoming data blocks being written to the virtual disk (block 906). Illustratively, the pod subsystem 130 maintains the generation count. On schedule, the "owner" metadata 449S is snapshotted at the metadata owner node 140, specifically metadata that is associated with the present generation of payload data (block 906, 908). This snapshot has a retention period (see e.g., FIG. 2C). The snapshot triggers the pod subsystem 130 to increment the generation (or version) counter (block 910). Now the payload data (data SST files 459) identified by the snapshotted metadata can be found when needed in the various storage containers belonging to the virtual disk.

Figure 10:
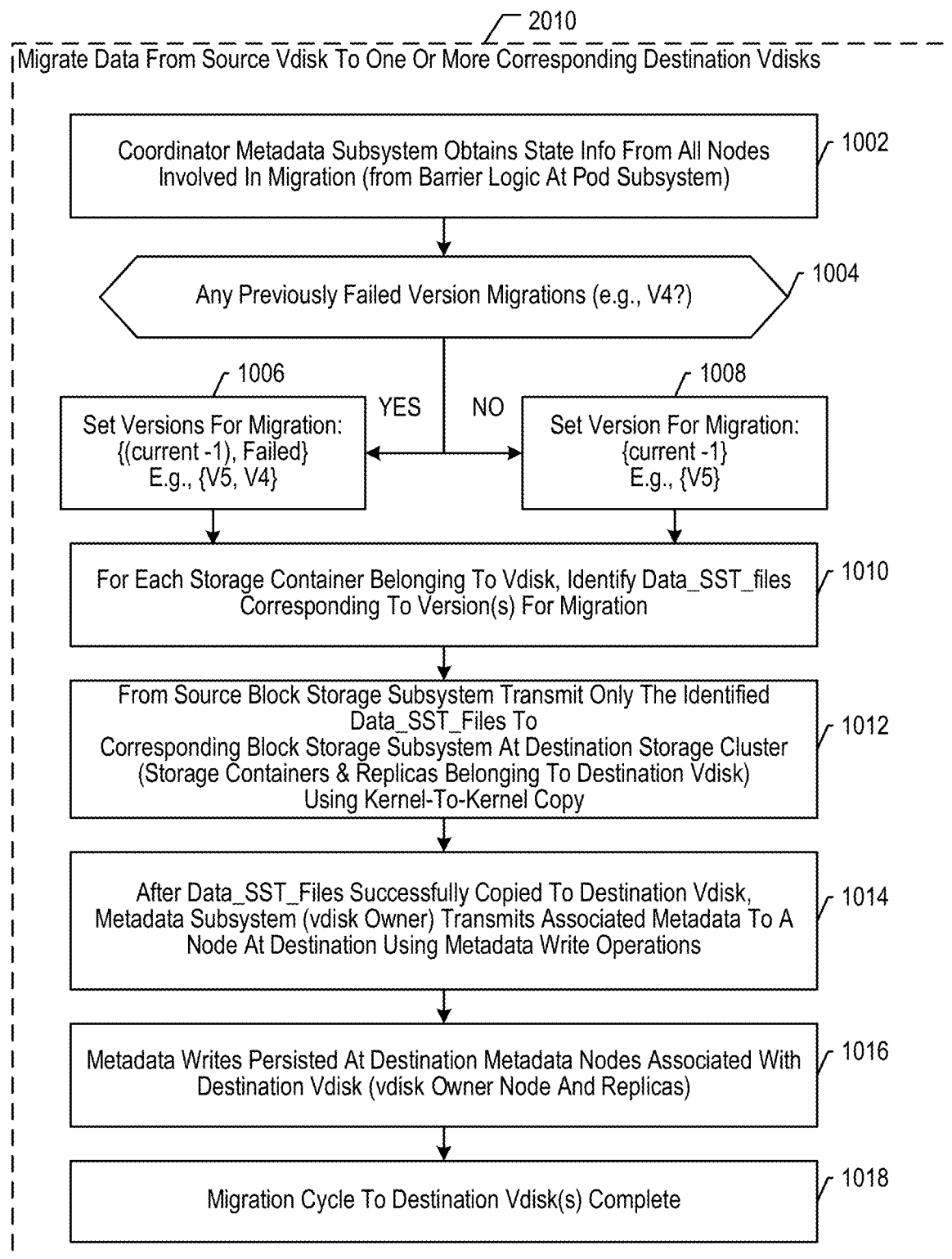
FIG. 10 depicts certain operations of block 2010 of method 2000.

FIG. 10 depicts certain operations of block 2010 of method 2000. Block 2010 occurs only for migration-enabled virtual disks. At block 1002, by accessing the barrier logic 432 at the pod subsystem 130, the owner metadata node 140 obtains state information from all nodes involved in the migration of the particular virtual disk, e.g., metadata node replicas, data storage nodes that host the storage containers of the virtual disk. If there were previously failed migration cycles of the virtual disk (block 1004), those generation counters are identified and coupled to the immediately preceding generation counter to form the set of generations to be migrated at block 1006. Otherwise, the version for migration is only the current-minus-1 generation as shown in block 1008. At block 1010, for each storage container belonging to the virtual disk, payload data SST files 459S are identified having the generation(s) in the identified migration set (i.e., current-minus-1 and possibly one or more older versions).

At block 1012, the owner metadata node 140 signals the data storage subsystems 150 hosting these data SST files 459S to send these files to their corresponding destination storage nodes via kernel-to-kernel file copy operations. See also FIG. 6. Successful receipt of these files is reported to the barrier logic. At block 1014, after all the payload data SST files 459D have been successfully received at the destination, it is okay to now migrate the associated metadata from the source—permission is given by the barrier logic 432 to do so. At block 1016, metadata is now written (using ordinary metadata write operations between metadata nodes) to the destination owner metadata node 140 and replicas 140 associated with the destination vdisk. At block 1018, after the metadata writes are successfully completed at the destination, the migration cycle to the destination vdisk is complete. See also FIG. 12.

Figure 11:
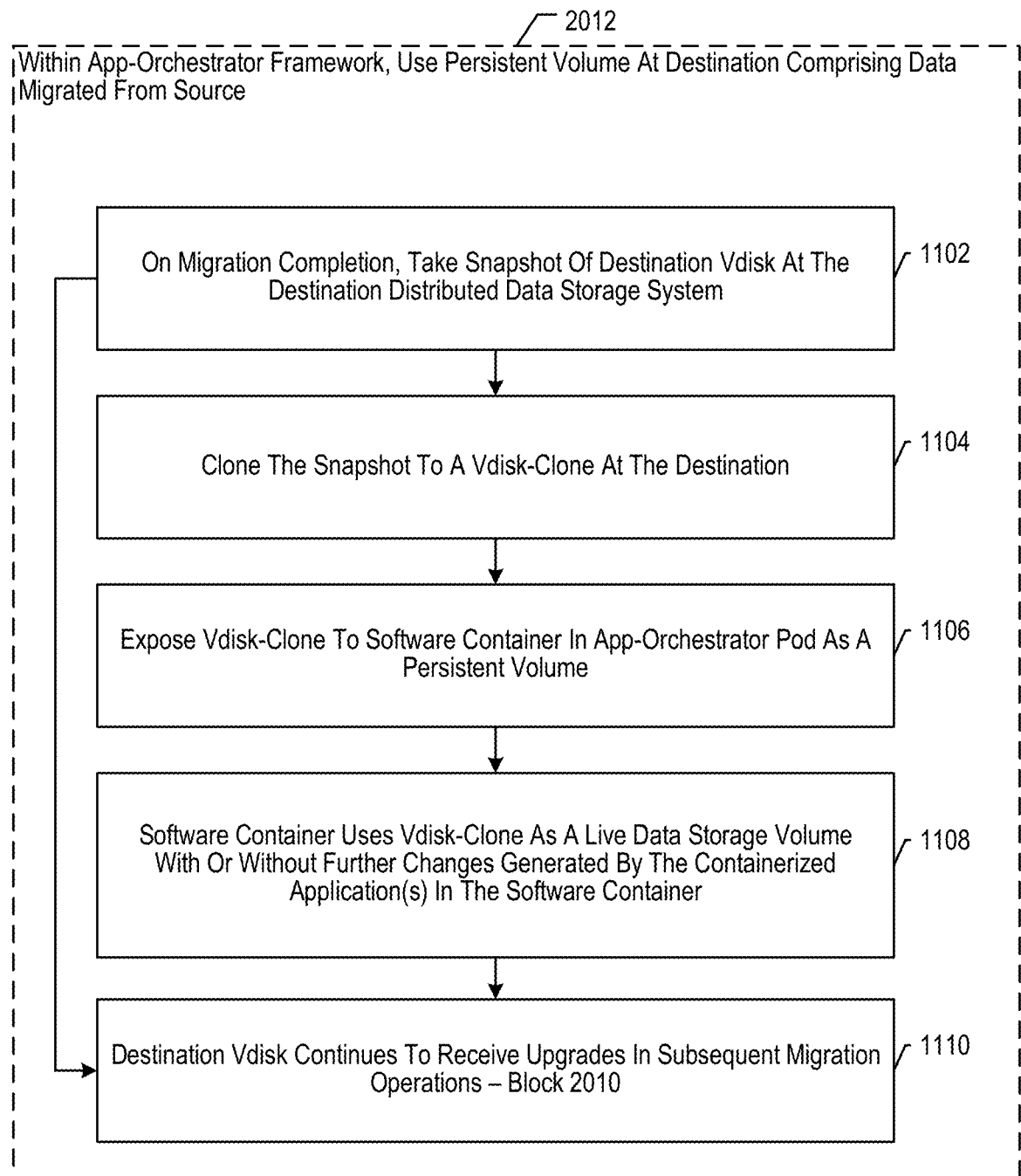
FIG. 11 depicts certain operations of block 2012 of method 2000.

FIG. 11 depicts certain operations of block 2012 of method 2000. At block 1102, at the destination, after a migration has successfully completed, the destination virtual disk is snapshotted and at block 1104 the snapshot is cloned so that it can be used as a distinct virtual disk. At block 1106, the clone is exposed to a software container in a Kubernetes pod (or equivalent component of an application orchestrator environment at the destination) as a persistent volume. At block 1108, the destination software container (e.g., applications executing therein) now uses this persistent volume as a live data storage resource, with or without further changes to the data migrated in from the source. This clone is independent of the destination virtual disk that received and will continue to receive migrated data from the source. Any number of such clones can be generated and used without limitation at the destination distributed data storage system. Meanwhile, at block 1110, the destination virtual disk 170D continues to receive updates in subsequent migration operations as described in block 2010 of method 2000. See also FIG. 10.

FIG. 12 depicts a flow chart of a method 2500 for performing barrier logic at the source storage cluster, according to an illustrative embodiment. The barrier logic 432 executes at the source pod subsystem 130 and monitors and controls the progress of each migration cycle. At block 2502, the pod subsystem 130 at the source storage cluster (e.g., using barrier logic 432) maintain the generation tracking number. At block 2504, when block 2010 of method 2000 triggers a migration operation, pod subsystem 130 activates the barrier logic 432. At block 2506 the barrier logic monitors the data transfers of data SST files 459S to the destination virtual disk and awaits receipt conformation from the destination data storage subsystem(s) 150.

When operations are not successfully completed (block 2508), the barrier logic aborts the migration (block 2516), e.g., if there is a network failure that prevents further data transfers. When completion criteria are met (block 2508) for a certain migration stage (e.g., all payload data SST files have been successfully received at the destination), the barrier logic permits the migration to proceed to the next stage (e.g., transmitting associated metadata at block 2510). After determining that all metadata has been successfully received at the destination (block 2512), the barrier logic 432 is de-activated (block 2514) and the migration cycle is considered complete. The barrier logic 432 is re-activated again when the next migration cycle is triggered (block 2504). However, if the metadata is not successfully received at the destination (block 2512), the barrier logic causes the present migration to abort at block 2516. See also FIGS. 7 and 10. As noted earlier (see block 1006 in FIG. 10), when a migration operation is aborted, the generation numbers that were identified for the migration are picked up in a later migration operation, thus avoiding gaps appearing in the migrated data.

As noted, the distributed barrier logic 432 operates at the pod subsystem 130 in the source storage cluster and acts as a controller and overseer over the migration of payload data and metadata from source to destination.

In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an example embodiment, a distributed data storage system for out-migrating data therefrom comprises: a first storage service node; a second storage service node executing a metadata subsystem that (i) is designated an owner of a first virtual disk configured as a persistent volume in a framework of an application orchestrator, and (ii) comprises metadata associated with the first virtual disk; third storage service nodes executing a data storage subsystem and comprising payload data of the first virtual disk, wherein one or more containerized applications of the application orchestrator generate the payload data. The above-recited embodiment wherein the second storage service node is configured to: take a first snapshot of at least part of the metadata associated with the first virtual disk, wherein a custom resource definition within the framework of the application orchestrator defines a schedule-and-retention policy applicable to the first snapshot; on taking the first snapshot, cause the first storage service node to increment a generation counter from a first value to a second value. The above-recited embodiment wherein the second storage service node is further configured to: based on determining that the first virtual disk is migration-enabled, identify at the third storage service nodes a first set of payload data files that are associated with the first value of the generation counter; cause the third storage service nodes comprising one or more payload data files of the first set to transmit respective payload data files, using kernel-to-kernel communications, to corresponding storage service nodes at an other distributed data storage system, which is distinct from the distributed data storage system comprising the first, second, and third storage service nodes, and wherein the other distributed data storage system comprises a second virtual disk that corresponds to the first virtual disk. The above-recited embodiment wherein the second storage service node is further configured to: based on receiving permission from the first storage service node, transmit metadata captured in the first snapshot to a storage service node at the other distributed data storage system using metadata-write operations, which are distinct from and exclusive of the kernel-to-kernel write operations; and wherein after the metadata captured in the first snapshot is successfully received at the other distributed data storage system, payload data associated with the first value of the generation counter has been successfully migrated from the first virtual disk to the second virtual disk at the other distributed data storage system.

The above-recited embodiment wherein each storage service node comprises one or more processors and data storage resources. The above-recited embodiment wherein the application orchestrator is based on Kubernetes technology. The above-recited embodiment wherein the second storage service node is configured to determine, on expiration of the first snapshot, whether the first virtual disk is migration-enabled. The above-recited embodiment wherein the first set of payload data files at the third storage service nodes also includes third payload data files associated with a third value of the generation counter that preceded the first value, and wherein a migration of the third payload data files to the other distributed data storage system previously failed. The above-recited embodiment wherein within the framework of the application orchestrator: a storage class is configured with migration enabled and makes reference to the schedule-and-retention policy, and a persistent volume claim makes reference to the storage class. The above-recited embodiment wherein a proprietary container storage interface (CSI) driver is used for provisioning a persistent volume claim that references the first virtual disk. The above-recited embodiment wherein a proprietary container storage interface (CSI) driver within the framework of the application orchestrator is used (a) for provisioning a persistent volume claim that references the first virtual disk, (b) for creating the custom resource definition that defines the schedule-and-retention policy for the first snapshot, and (c) for enabling payload data migration from the first virtual disk to the second virtual disk. The above-recited embodiment wherein the distributed data storage system is configured to migrate payload data from the first virtual disk to the second virtual disk at the other distributed data storage system. The above-recited embodiment wherein a data mover system comprises the distributed data storage system and the other distributed data storage system. The above-recited embodiment wherein a barrier logic executing at the first storage service node ensures that migration from the distributed data storage system to the other distributed data storage system follows a controlled progression of operations. The above-recited embodiment wherein a barrier logic executing at the first storage service node ensures that migration from the distributed data storage system to the other distributed data storage system follows a controlled progression of operations, and wherein metadata is migrated only after all payload data files are migrated. The above-recited embodiment wherein a barrier logic executing at the first storage service node ensures that migration from the distributed data storage system to the other distributed data storage system follows a controlled progression of operations, and wherein metadata is not migrated and the migration is aborted if some payload data files are not successfully received at the second virtual disk. The above-recited embodiment wherein the first and second storage service nodes are the same storage service node. The above-recited embodiment wherein payload data from the one or more containerized applications of the application orchestrator are written to the first virtual disk via commit logs before being persisted. The above-recited embodiment wherein at least one of the distributed data storage system and the other distributed data storage system operates in a cloud computing environment. The above-recited embodiment wherein at least one of the distributed data storage system and the other distributed data storage system operates in a non-cloud computing environment. The above-recited embodiment wherein the one or more containerized applications are cloud-native to a cloud computing environment that hosts the framework of the application orchestrator.

According to another example embodiment, a first cloud computing environment hosting a first distributed data storage system for out-migrating data therefrom, wherein the first distributed data storage system comprises: a first storage service node configured in the first cloud computing environment; a second storage service node, which is configured in the first cloud computing environment and comprises metadata associated with a first virtual disk, wherein the first virtual disk is configured as a persistent volume in a framework of an application orchestrator hosted by the first cloud computing environment; third storage service nodes, which are configured in the first cloud computing environment and comprise payload data of the first virtual disk, wherein one or more containerized applications of the application orchestrator generate the payload data. The above-recited embodiment wherein the second storage service node is configured to: take a first snapshot of at least part of the metadata associated with the first virtual disk, wherein a custom resource definition within the framework of the application orchestrator defines a schedule-and-retention policy applicable to the first snapshot; on taking the first snapshot, cause the first storage service node to increment a generation counter from a first value to a second value. The above-recited embodiment wherein the second storage service node is configured to: based on determining that the first virtual disk is migration-enabled, identify at the third storage service nodes a first set of payload data files that are associated with the first value of the generation counter. The above-recited embodiment wherein the second storage service node is configured to: migrate the first set of payload data files associated with the first value of the generation counter to a second virtual disk at a second distributed data storage system, which is distinct from the first distributed data storage system, wherein the second virtual disk is configured to correspond to the first virtual disk, comprising: (i) cause the third storage service nodes comprising the one or more payload data files of the first set to transmit, via kernel-to-kernel copy operations, respective payload data files to corresponding storage service nodes at a second distributed data storage system, which is distinct from the first distributed data storage system, and (ii) based on receiving permission from the first storage service node, transmit metadata captured in the first snapshot to a storage service node at the second distributed data storage system using metadata-write operations, which are distinct from and exclusive of the kernel-to-kernel write operations.

The above-recited embodiment wherein a proprietary container storage interface (CSI) driver within the framework of the application orchestrator is used (a) for provisioning a persistent volume claim that references the first virtual disk, (b) for creating the custom resource definition that defines the schedule-and-retention policy for the first snapshot, and (c) for enabling payload data migration from the first virtual disk to the second virtual disk.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A distributed data storage system comprising:
   a first storage service node, which is configured to execute a metadata subsystem, wherein the first storage service node comprises metadata associated with a first virtual disk of the distributed data storage system, wherein the first virtual disk is configured as a persistent volume in a framework of an application orchestrator; and
   a second storage service node executing a data storage subsystem that comprises payload data of the first virtual disk, wherein a containerized application of the application orchestrator generates the payload data;
   wherein the first storage service node is configured to:
   generate a first snapshot based on the metadata associated with the first virtual disk;
   based on taking the first snapshot, increment a generation counter from a first value to a second value;
   identify, at the second storage service node, a first set of payload data files that are associated with the first value of the generation counter;
   cause the second storage service node to transmit the first set of payload data files, using kernel-to-kernel communications, to a corresponding storage service node at an other distributed data storage system, which is distinct from the distributed data storage system comprising the first storage service node and the second storage service node, and wherein the other distributed data storage system comprises a second virtual disk that corresponds to the first virtual disk; and after the first set of payload data files have been successfully stored at the second virtual disk of the other distributed data storage system, receive permission to transmit metadata captured in the first snapshot to a storage service node at the other distributed storage system, wherein the permission is received from a barrier logic executing at one or more of: the second storage service node and an other storage service node of the distributed data storage system.

2. The distributed data storage system of claim 1, wherein each storage service node of the distributed data storage system comprises one or more hardware processors and data storage resources; and further wherein each storage service node of the other distributed data storage system comprises one or more hardware processors and data storage resources.

3. The distributed data storage system of claim 1, wherein the barrier logic is configured to control a migration of payload data and associated metadata from the distributed data storage system to the other distributed data storage system.

4. The distributed data storage system of claim 1, wherein the barrier logic executes at one or more storage service nodes of the distributed data storage system, and wherein the barrier logic is configured to transmit the permission to the first storage service node based on determining that the first set of payload data files have been successfully stored at the second virtual disk of the other distributed data storage system.

5. The distributed data storage system of claim 4, wherein the barrier logic controls a migration from the distributed data storage system to the other distributed data storage system according to a controlled progression of operations, and wherein, according to the controlled progression of operations, metadata is transmitted to the other distributed data storage system only after corresponding payload data files are successfully stored at the other distributed data storage system; and wherein the barrier logic is further configured to abort the migration to the other distributed data storage system, based on determining that the corresponding payload data files are not successfully stored at the other distributed data storage system.

6. The distributed data storage system of claim 1, wherein the first set of payload data files at the second storage service node also includes third payload data files associated with a third value of the generation counter that preceded the first value, and wherein a migration of the third payload data files to the other distributed data storage system previously failed.

7. The distributed data storage system of claim 1 wherein within the framework of the application orchestrator:
a custom resource definition defines a schedule-and-retention policy applicable to the first snapshot,
a storage class is configured with migration enabled and makes reference to the schedule-and-retention policy, and
a persistent volume claim makes reference to the storage class.

8. The distributed data storage system of claim 1 configured to implement a container storage interface (CSI) within the framework of the application orchestrator, wherein the distributed data storage system is further configured to use the CSI for one or more of: (a) provisioning a persistent volume claim that references the first virtual disk of the distributed data storage system, (b) creating a custom resource definition within the framework of the application orchestrator that defines a schedule-and-retention policy applicable to the first snapshot, and (c) enabling payload data migration from the first virtual disk to the second virtual disk.

9. The distributed data storage system of claim 1, wherein the application orchestrator is based on Kubernetes technology.

10. The distributed data storage system of claim 1, wherein at least one of the distributed data storage system and the other distributed data storage system operates in a cloud computing environment.

11. The distributed data storage system of claim 1, wherein the containerized application is cloud-native to a cloud computing environment that hosts the framework of the application orchestrator.

12. A computer-implemented method comprising:
at a first storage service node of a distributed data storage system, executing a metadata subsystem that comprises metadata associated with a first virtual disk of the distributed data storage system, wherein the first virtual disk is configured as a persistent volume in a framework of an application orchestrator;
at the first storage service node, further executing a barrier logic;
at a second storage service node of the distributed data storage system, executing a data storage subsystem that comprises payload data of the first virtual disk, wherein a containerized application of the application orchestrator generates the payload data;
by the first storage service node: generating a first snapshot based on the metadata associated with the first virtual disk, and based on taking the first snapshot, incrementing a generation counter from a first value to a second value;
by the second storage service node: identifying a first set of payload data files that are associated with the first value of the generation counter, and
transmitting the first set of payload data files, using kernel-to-kernel communications, to a corresponding storage service node at an other distributed data storage system, which is distinct from the distributed data storage system comprising the first storage service node and the second storage service node, wherein the other distributed data storage system comprises a second virtual disk that corresponds to the first virtual disk; and
after the first set of payload data files have been successfully stored at the second virtual disk of the other distributed data storage system, issuing permission, by the barrier logic to the metadata subsystem, to transmit metadata captured in the first snapshot to a storage service node at the other distributed data storage system, wherein the barrier logic is configured to transmit the permission only if it determines that the first set of payload data files have been successfully stored at the second virtual disk of the other distributed data storage system; and
wherein each storage service node of the distributed data storage system, including the first storage service node and the second storage service node, comprises one or more hardware processors and data storage resources, and further wherein each storage service node of the other distributed data storage system comprises one or more hardware processors and data storage resources.

13. The computer-implemented method of claim 12, wherein the application orchestrator is based on Kubernetes technology.

14. The computer-implemented method of claim 12, further comprising:
- by the barrier logic, controlling migration from the distributed data storage system to the other distributed data storage system according to a controlled progression of operations, and wherein, according to the controlled progression of operations, metadata is transmitted to the other distributed data storage system only after corresponding payload data files are successfully stored at the other distributed data storage system; and
- by the barrier logic, aborting the migration to the other distributed data storage system, based on determining that the corresponding payload data files are not successfully stored at the other distributed data storage system.

15. The computer-implemented method of claim 12, wherein the first set of payload data files at the second storage service node also includes third payload data files associated with a third value of the generation counter that preceded the first value, and wherein a migration of the third payload data files to the other distributed data storage system previously failed.

16. The computer-implemented method of claim 12, wherein within the framework of the application orchestrator:
- a custom resource definition defines a schedule-and-retention policy applicable to the first snapshot,
- a storage class is configured with migration enabled and makes reference to the schedule-and-retention policy, and
- a persistent volume claim makes reference to the storage class.

17. The computer-implemented method of claim 12, further comprising: using a container storage interface (CSI) within the framework of the application orchestrator for one or more of: (a) provisioning a persistent volume claim that references the first virtual disk of the distributed data storage system, (b) creating a custom resource definition within the framework of the application orchestrator that defines a schedule-and-retention policy applicable to the first snapshot, and (c) enabling payload data migration from the first virtual disk to the second virtual disk.

18. The computer-implemented method of claim 12, wherein at least one of the distributed data storage system and the other distributed data storage system operates in a cloud computing environment.

19. The computer-implemented method of claim 12, wherein the containerized application is cloud-native to a cloud computing environment that hosts the framework of the application orchestrator.

20. The computer-implemented method of claim 12, further comprising: by the first storage service node, on expiration of the first snapshot, determining whether the first virtual disk is migration-enabled.

* * * * *